(12) United States Patent
Kaechi

(10) Patent No.: US 10,396,603 B2
(45) Date of Patent: Aug. 27, 2019

(54) POWER RECEIVING APPARATUS THAT WIRELESSLY RECEIVES POWER, CONTROL METHOD OF THE SAME, AND STORAGE MEDIUM

(71) Applicant: CANON KABUSHIKI KAISHA, Tokyo (JP)

(72) Inventor: Shuya Kaechi, Hashimoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 145 days.

(21) Appl. No.: 15/648,969

(22) Filed: Jul. 13, 2017

(65) Prior Publication Data

US 2018/0041075 A1 Feb. 8, 2018

(30) Foreign Application Priority Data

Jul. 14, 2016 (JP) ................................. 2016-139694

(51) Int. Cl.
*H02J 50/80* (2016.01)
*H02J 7/02* (2016.01)
*H04B 5/00* (2006.01)
*H02J 50/12* (2016.01)

(52) U.S. Cl.
CPC ............. *H02J 50/80* (2016.02); *H02J 7/025* (2013.01); *H02J 50/12* (2016.02); *H04B 5/0037* (2013.01)

(58) Field of Classification Search
CPC .. H02J 50/40; H02J 50/80; H02J 50/12; H02J 7/025; H02J 5/0037
See application file for complete search history.

(56) References Cited

U.S. PATENT DOCUMENTS

2017/0331333 A1* 11/2017 Clark ...................... H02J 50/80

FOREIGN PATENT DOCUMENTS

JP 2006-353042 A 12/2006

\* cited by examiner

*Primary Examiner* — Robert L Deberadinis
(74) *Attorney, Agent, or Firm* — Cowan, Liebowitz & Latman, P.C.

(57) ABSTRACT

A power receiving apparatus that is capable of communicating with a power transmitting apparatus with wireless power transmission capability, the power receiving apparatus comprises: a detection unit configured to detect a state of the power receiving apparatus; a communication unit configured to, in order to establish connection to other apparatuses including the power transmitting apparatus, transmit information indicating an existence of the power receiving apparatus to the other apparatuses, or receive information indicating an existence of the other apparatuses from the other apparatuses; and a control unit configured to control transmission and reception of the information, wherein in order to enable establishment of connection to the power transmitting apparatus, the control unit switches between transmission and reception of the information based on whether the state of the power receiving apparatus is a predetermined state.

13 Claims, 36 Drawing Sheets

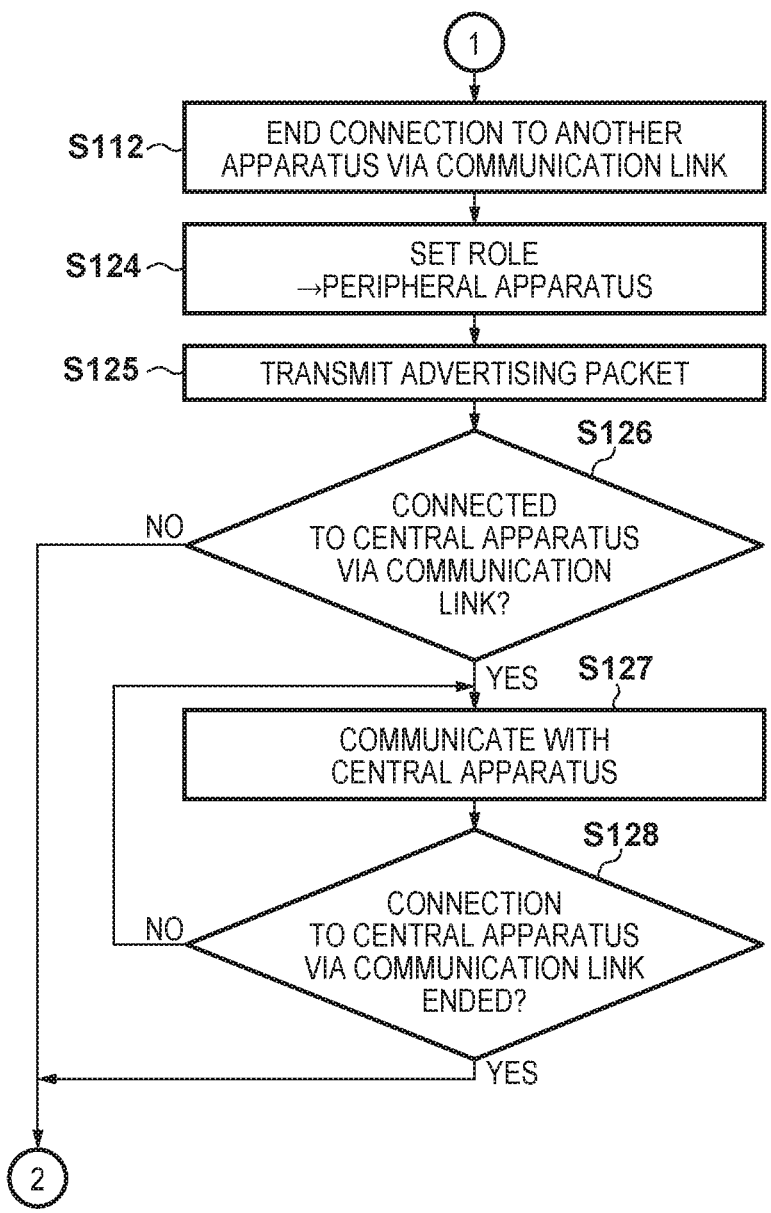

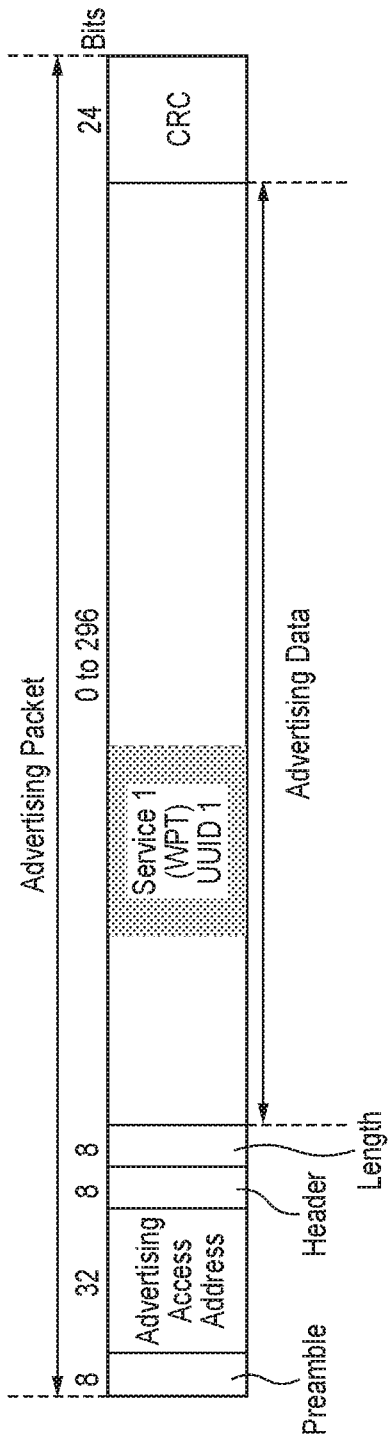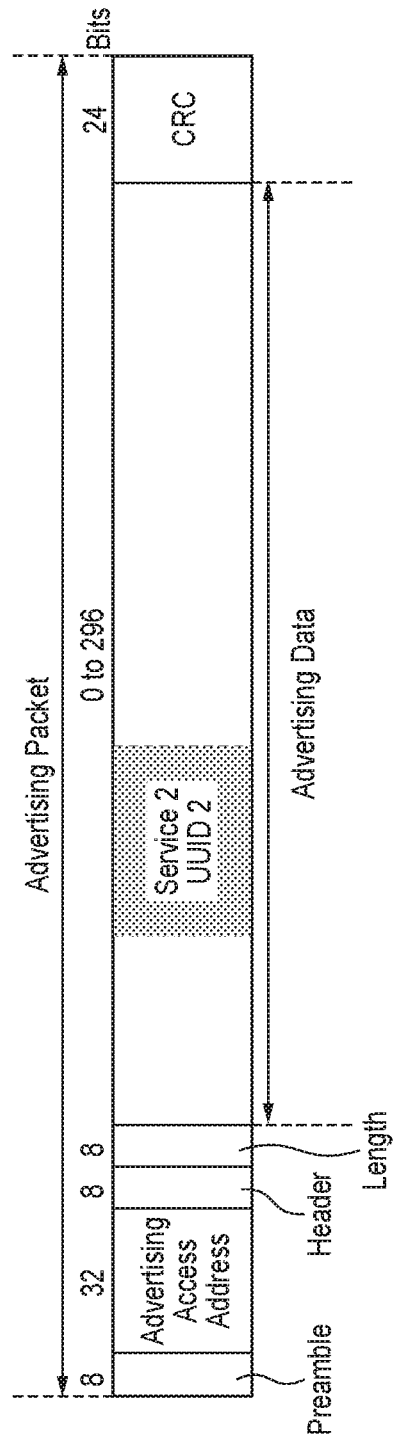

FIG. 5C

Service 1 (WPT)
UUID 1

| Service 2 Characteristic UUID 1 | APPARATUS NAME | VALUE |
|---|---|---|
| Service 2 Characteristic UUID 2 | WHETHER POWER CAN BE RECEIVED | VALUE |
| Service 2 Characteristic UUID 3 | BATTERY VOLTAGE | VALUE |
| Service 2 Characteristic UUID 4 | COMPLETION OF CHARGING | VALUE |
| Service 2 Characteristic UUID 5 | CHARGE COMPLETION VOLTAGE | VALUE |
| Service 2 Characteristic UUID 6 | REMAINING BATTERY LEVEL | VALUE |
| Service 2 Characteristic UUID 7 | MAXIMUM RECEIVED POWER | VALUE |
| Service 2 Characteristic UUID 8 | POWER REQUESTED TO BE TRANSMITTED/RECEIVED | VALUE |

Service 2
UUID 2

| Service 4 Characteristic UUID 1 | MANUFACTURER NAME | VALUE |
|---|---|---|
| Service 4 Characteristic UUID 2 | MODEL NAME | VALUE |
| Service 4 Characteristic UUID 3 | SERIAL NO. | VALUE |
| Service 4 Characteristic UUID 4 | HARDWARE REV | VALUE |
| Service 4 Characteristic UUID 5 | FIRMWARE REV | VALUE |
| Service 4 Characteristic UUID 6 | SYSTEM ID | VALUE |

Service 3
UUID 3

| Service 3 Characteristic UUID 1 | BATTERY VOLTAGE | VALUE |
|---|---|---|

F I G. 5D

| Service 2 UUID 2 | | |
|---|---|---|
| Service 4 Characteristic UUID 1 | MANUFACTURER NAME | VALUE |
| Service 4 Characteristic UUID 2 | MODEL NAME | VALUE |
| Service 4 Characteristic UUID 3 | SERIAL NO. | VALUE |
| Service 4 Characteristic UUID 4 | HARDWARE REV | VALUE |
| Service 4 Characteristic UUID 5 | FIRMWARE REV | VALUE |
| Service 4 Characteristic UUID 6 | SYSTEM ID | VALUE |

| Service 3 UUID 3 | | |
|---|---|---|
| Service 3 Characteristic UUID 1 | BATTERY VOLTAGE | VALUE |

| Service 1 (WPT) UUID 1 | | |
|---|---|---|
| Service 2 Characteristic UUID 1 | APPARATUS NAME | VALUE |
| Service 2 Characteristic UUID 2 | WHETHER POWER CAN BE RECEIVED | VALUE |
| Service 2 Characteristic UUID 3 | BATTERY VOLTAGE | VALUE |
| Service 2 Characteristic UUID 4 | COMPLETION OF CHARGING | VALUE |
| Service 2 Characteristic UUID 5 | CHARGE COMPLETION VOLTAGE | VALUE |
| Service 2 Characteristic UUID 6 | REMAINING BATTERY LEVEL | VALUE |
| Service 2 Characteristic UUID 7 | MAXIMUM RECEIVED POWER | VALUE |
| Service 2 Characteristic UUID 8 | POWER REQUESTED TO BE TRANSMITTED/RECEIVED | VALUE |

F I G. 6A 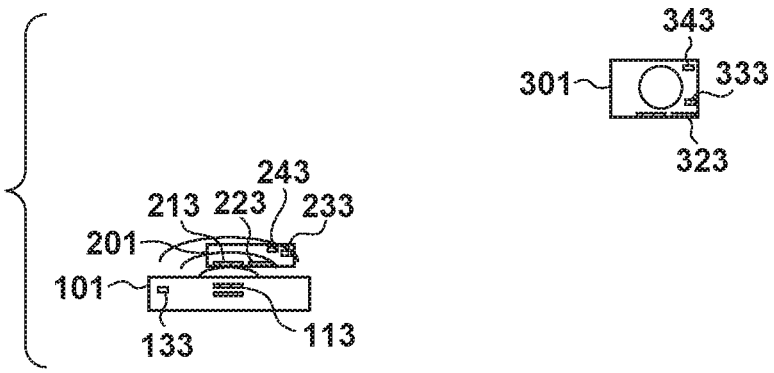
F I G. 6B 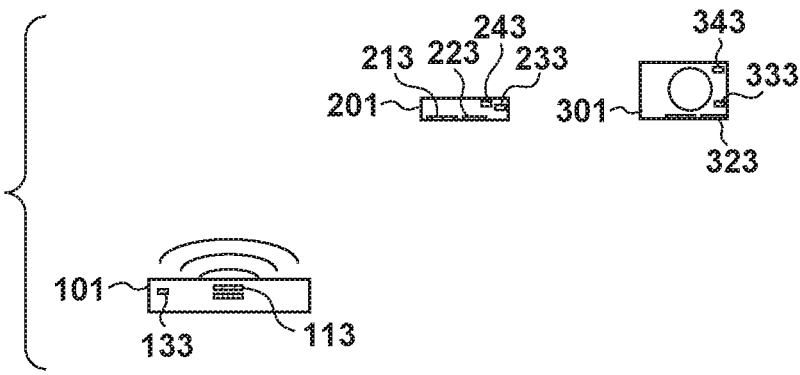
F I G. 6C 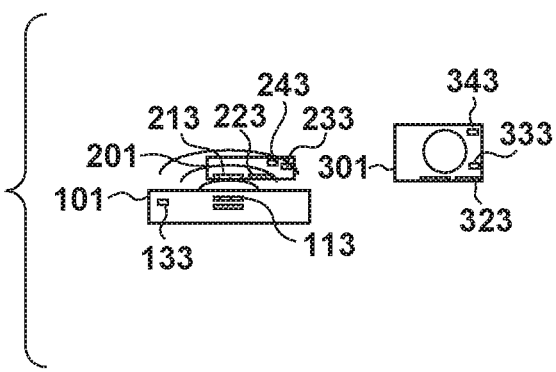

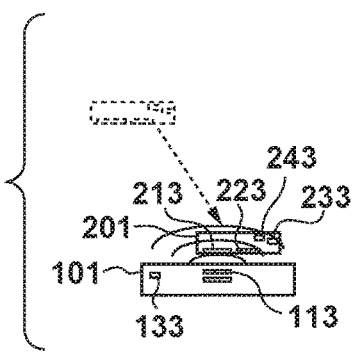
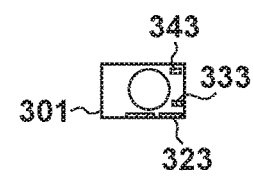
FIG. 6D
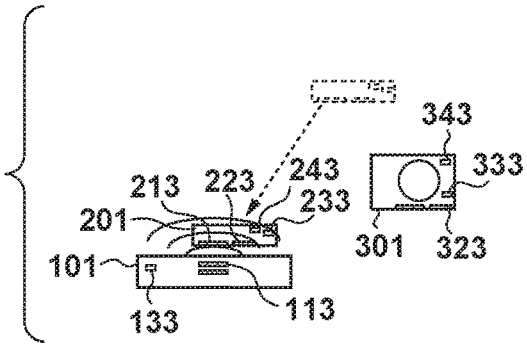
FIG. 6E

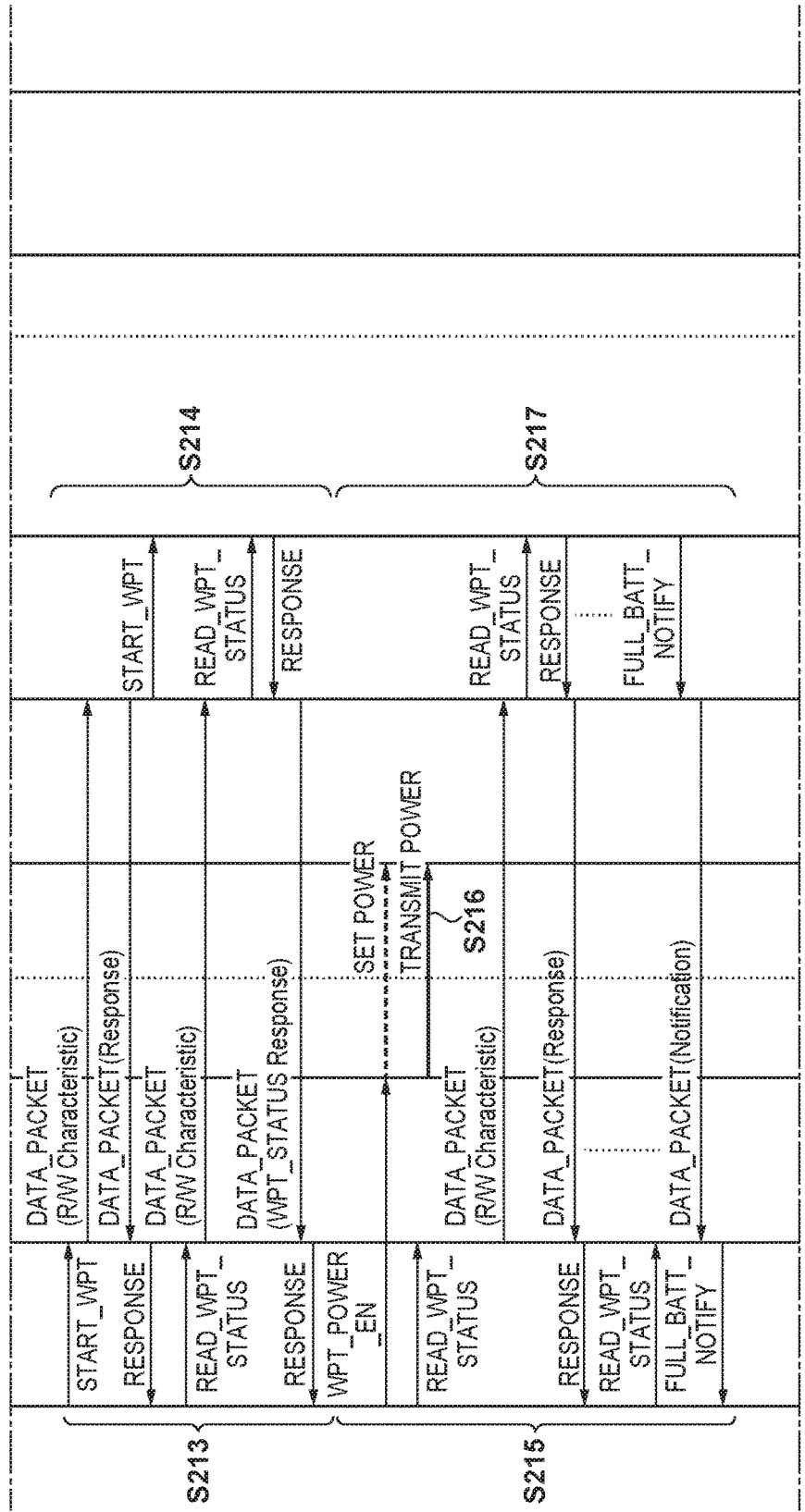

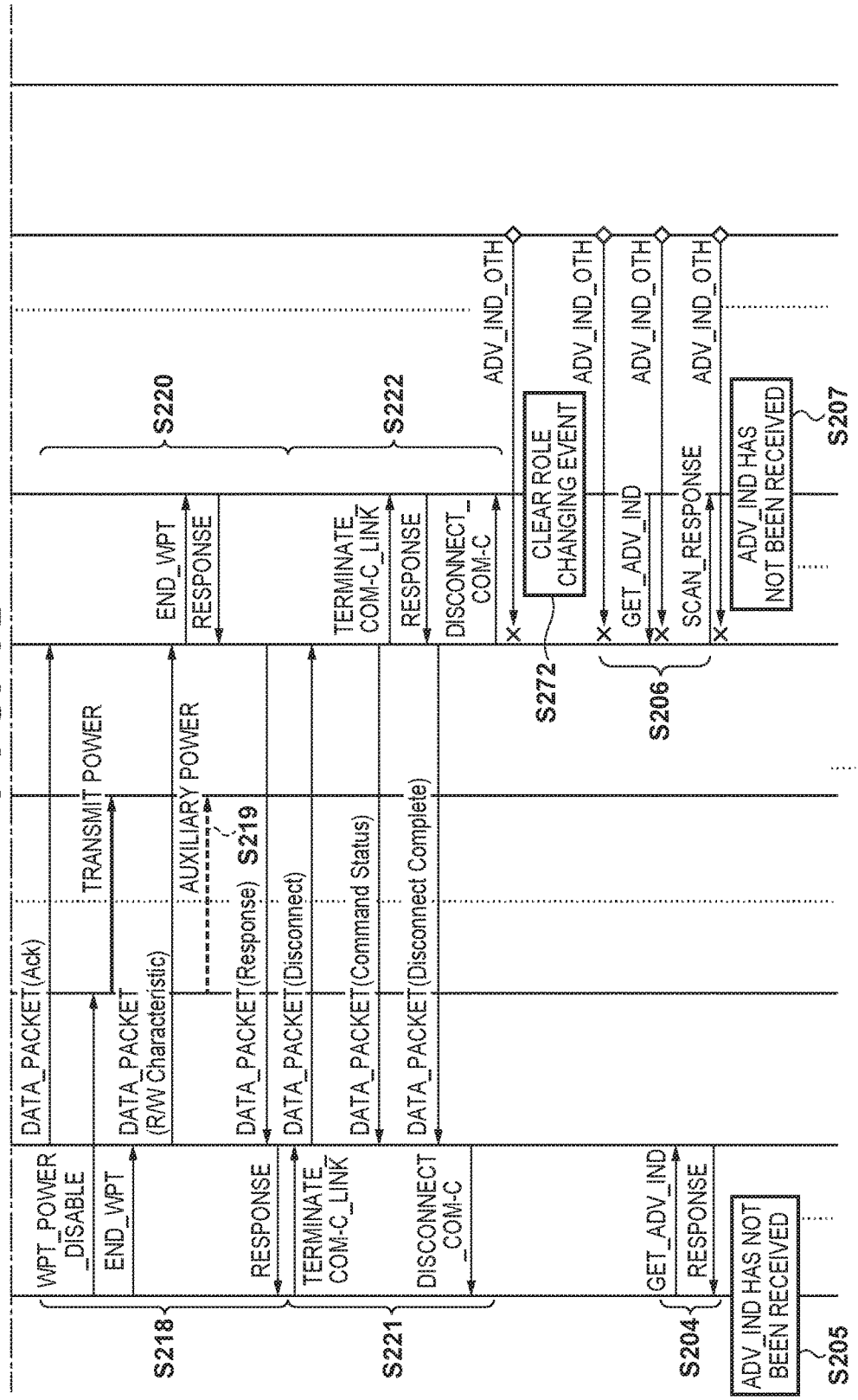

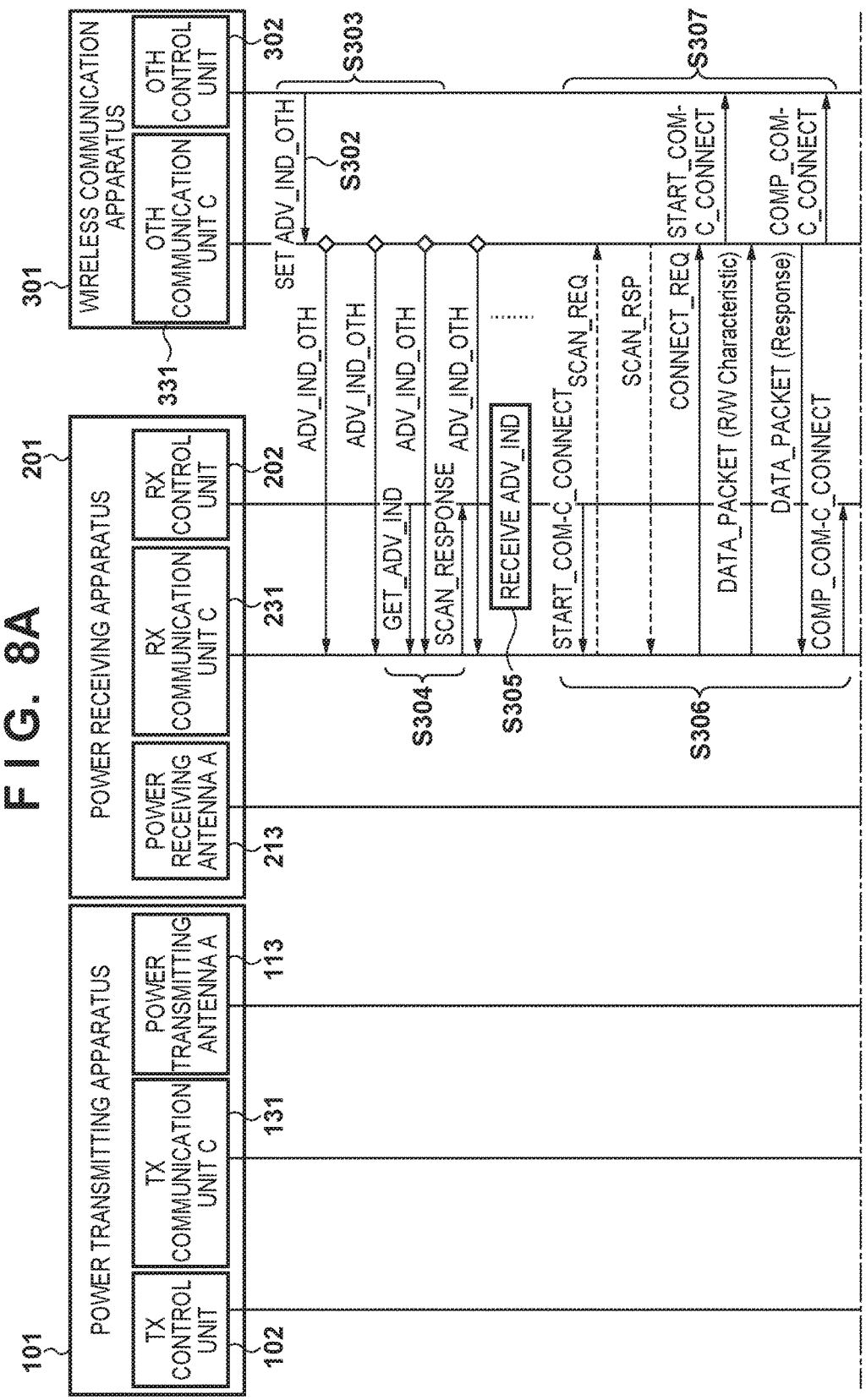

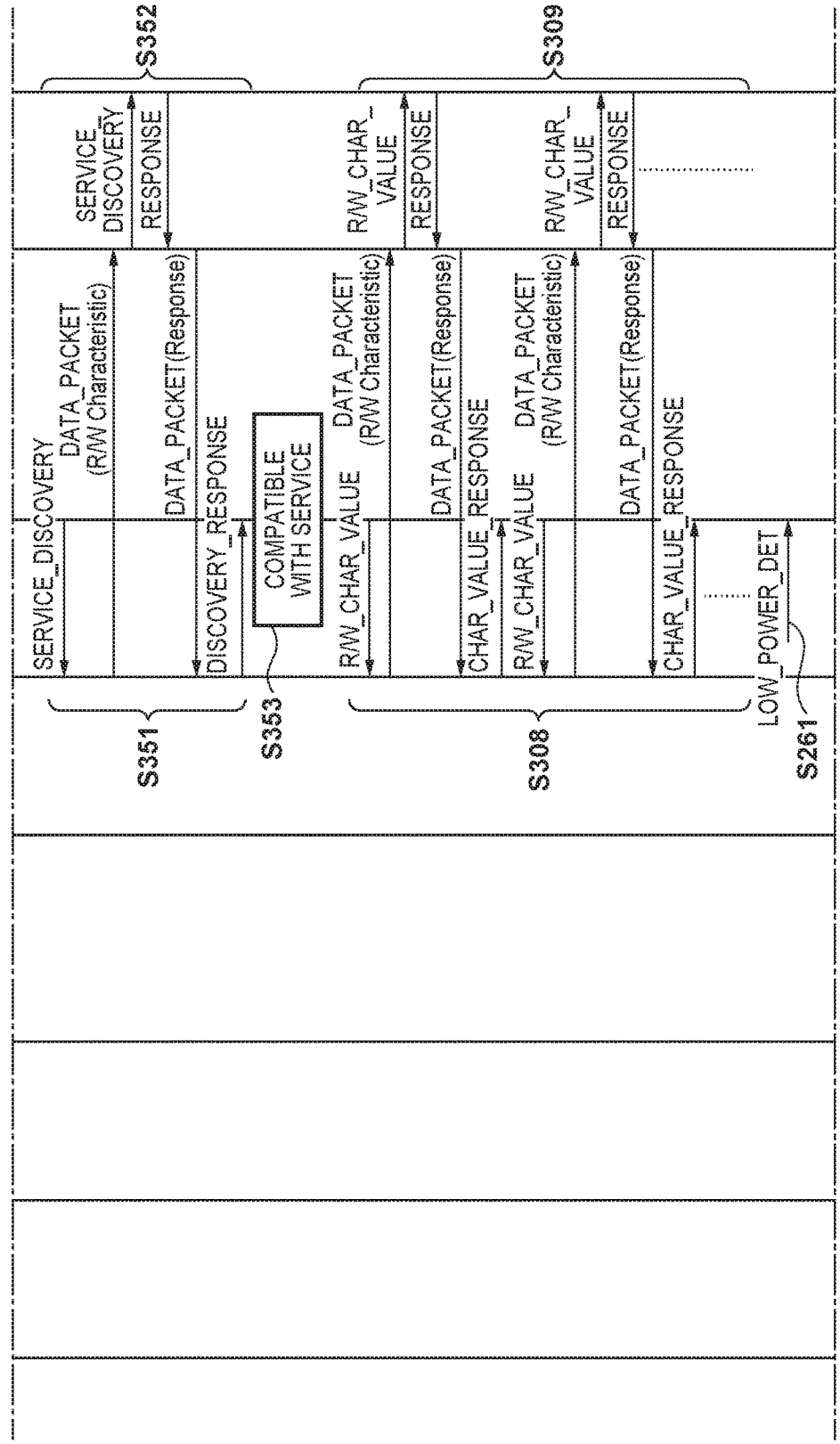

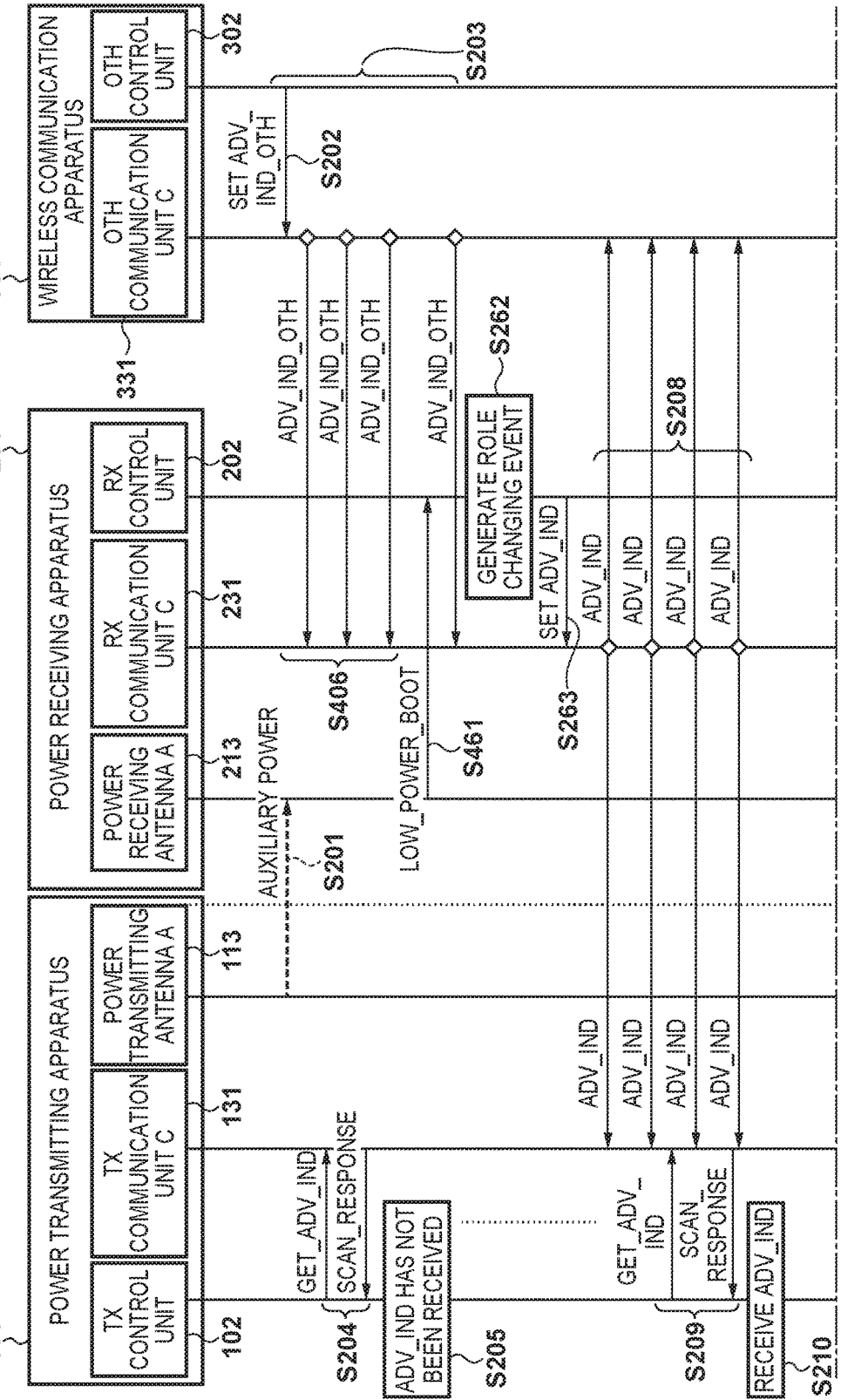

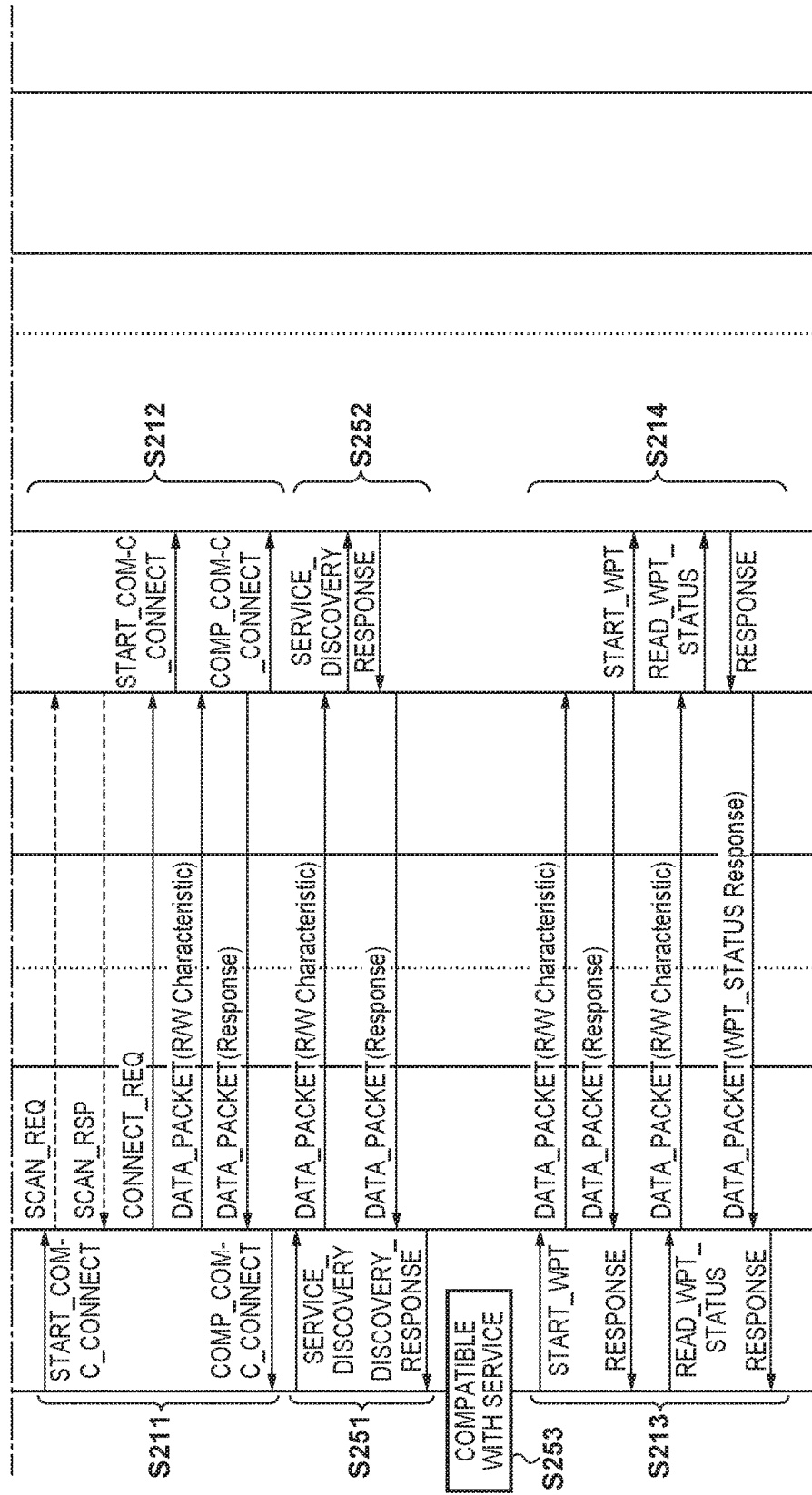

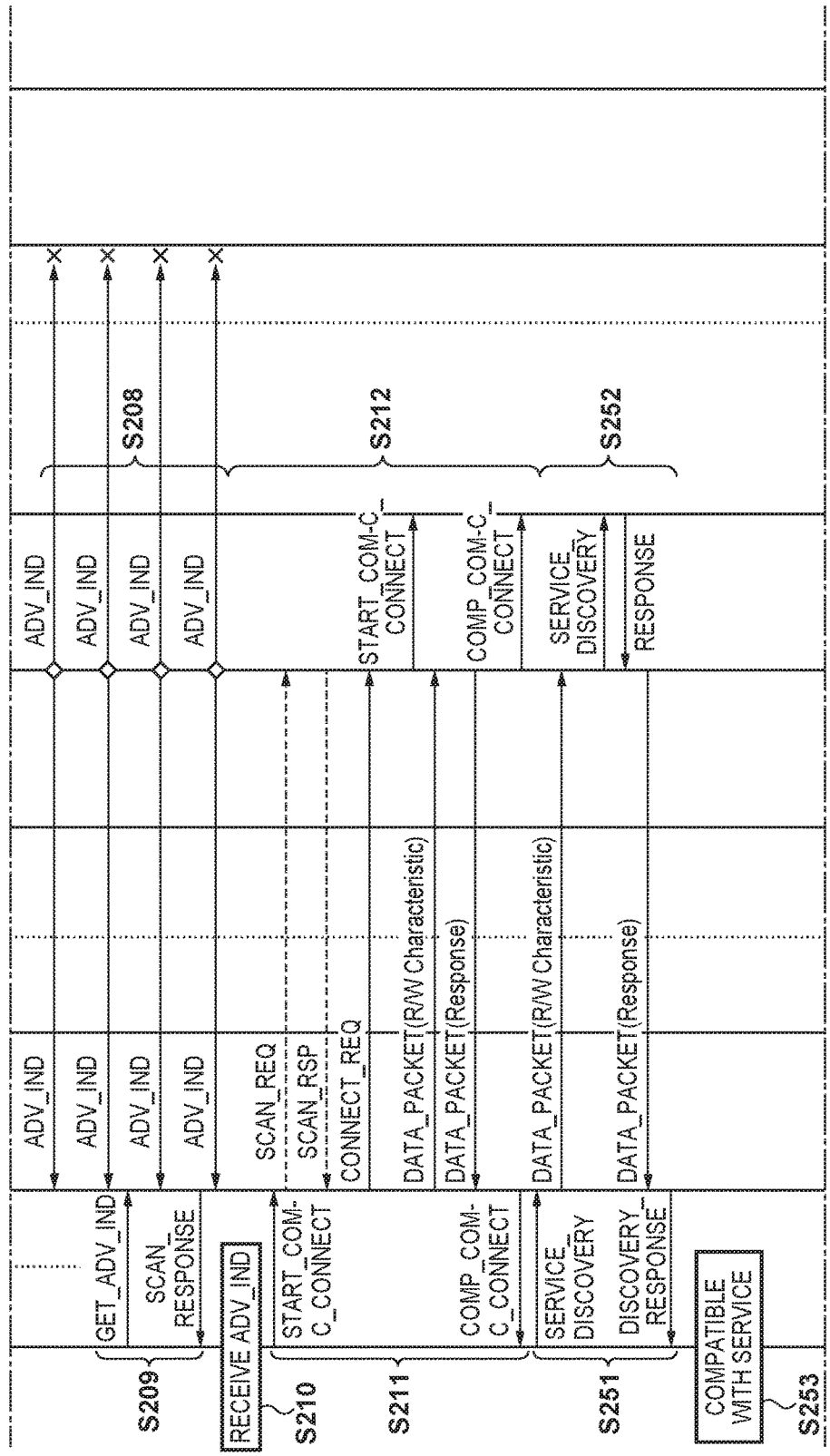

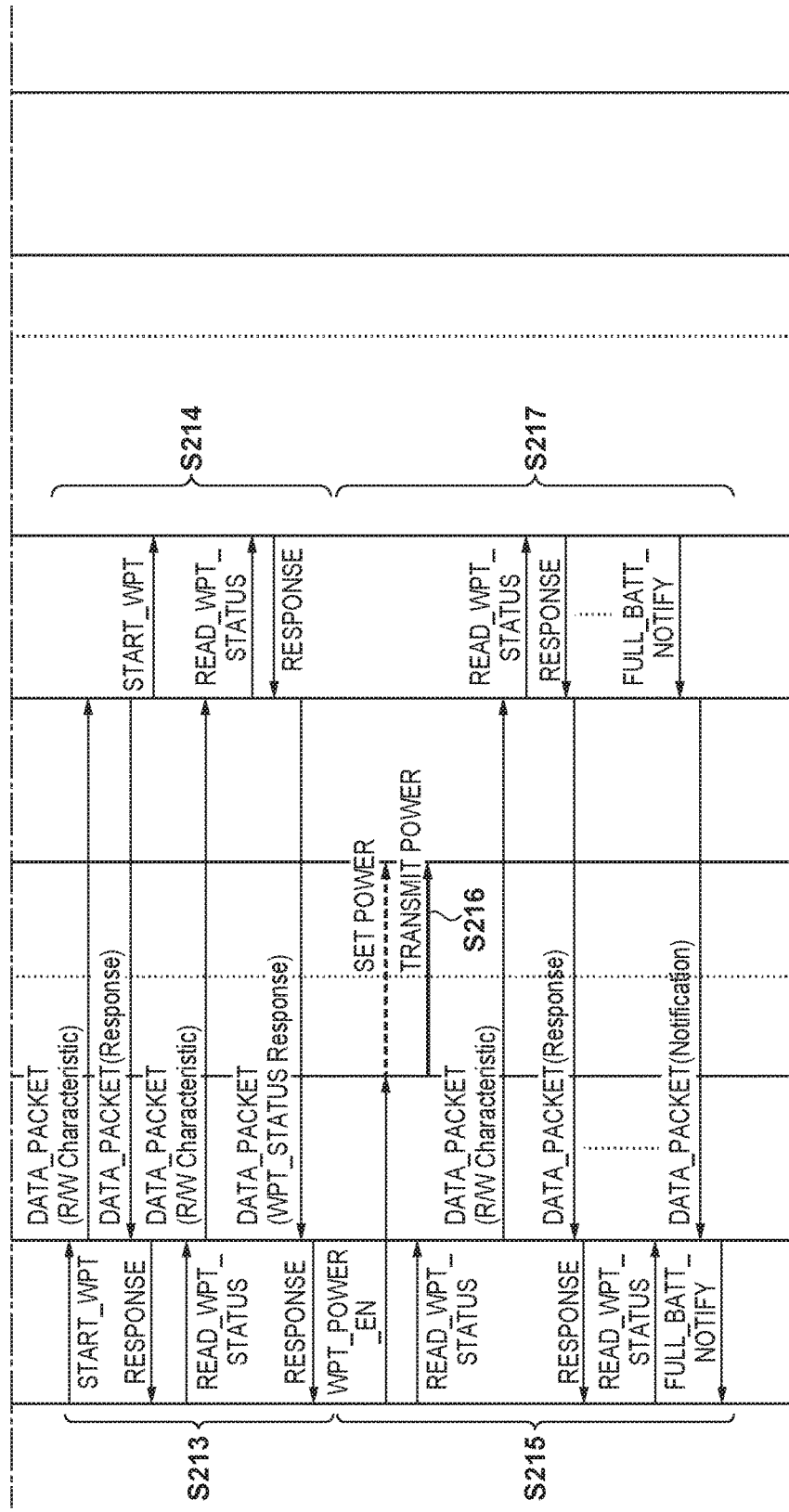

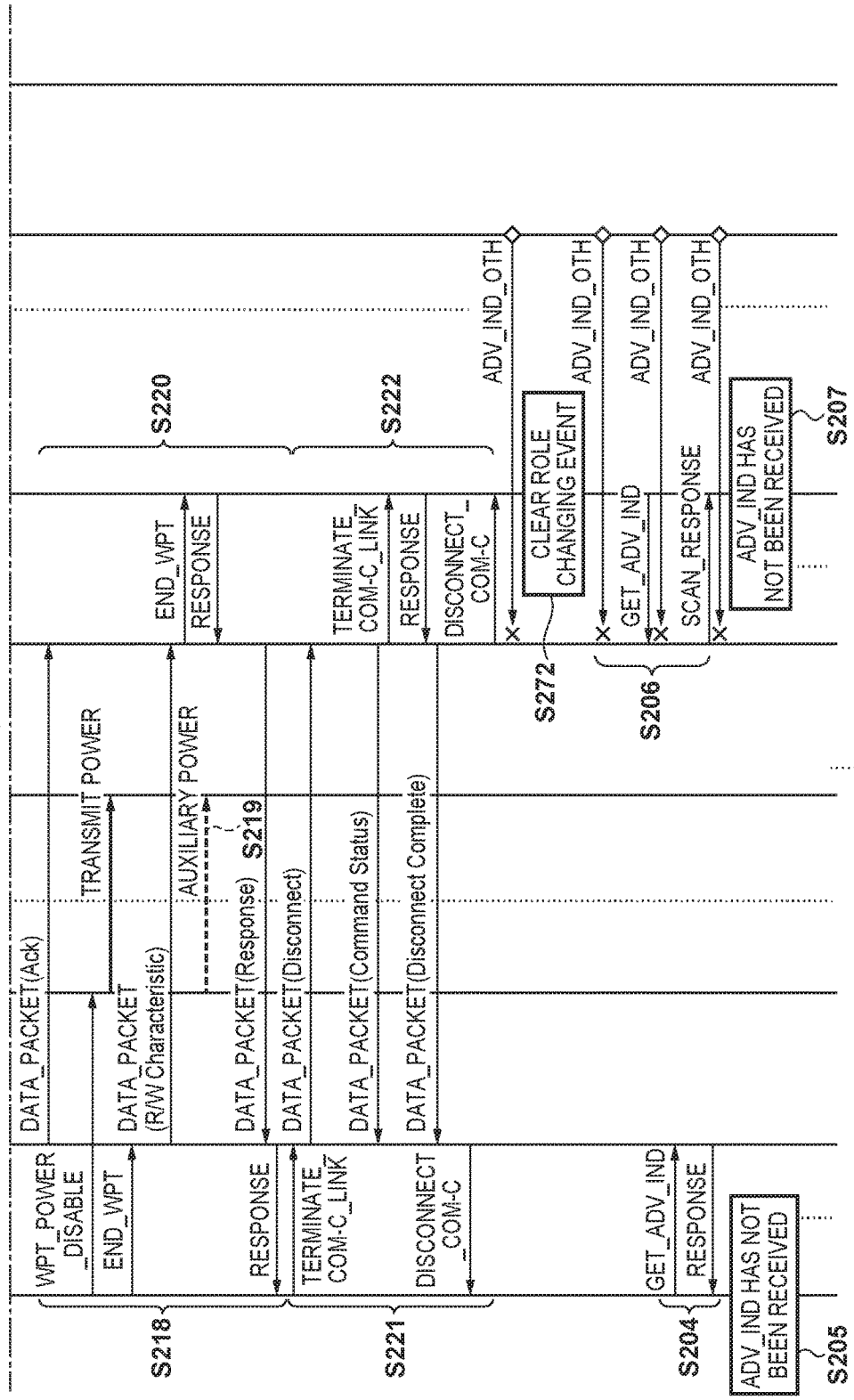

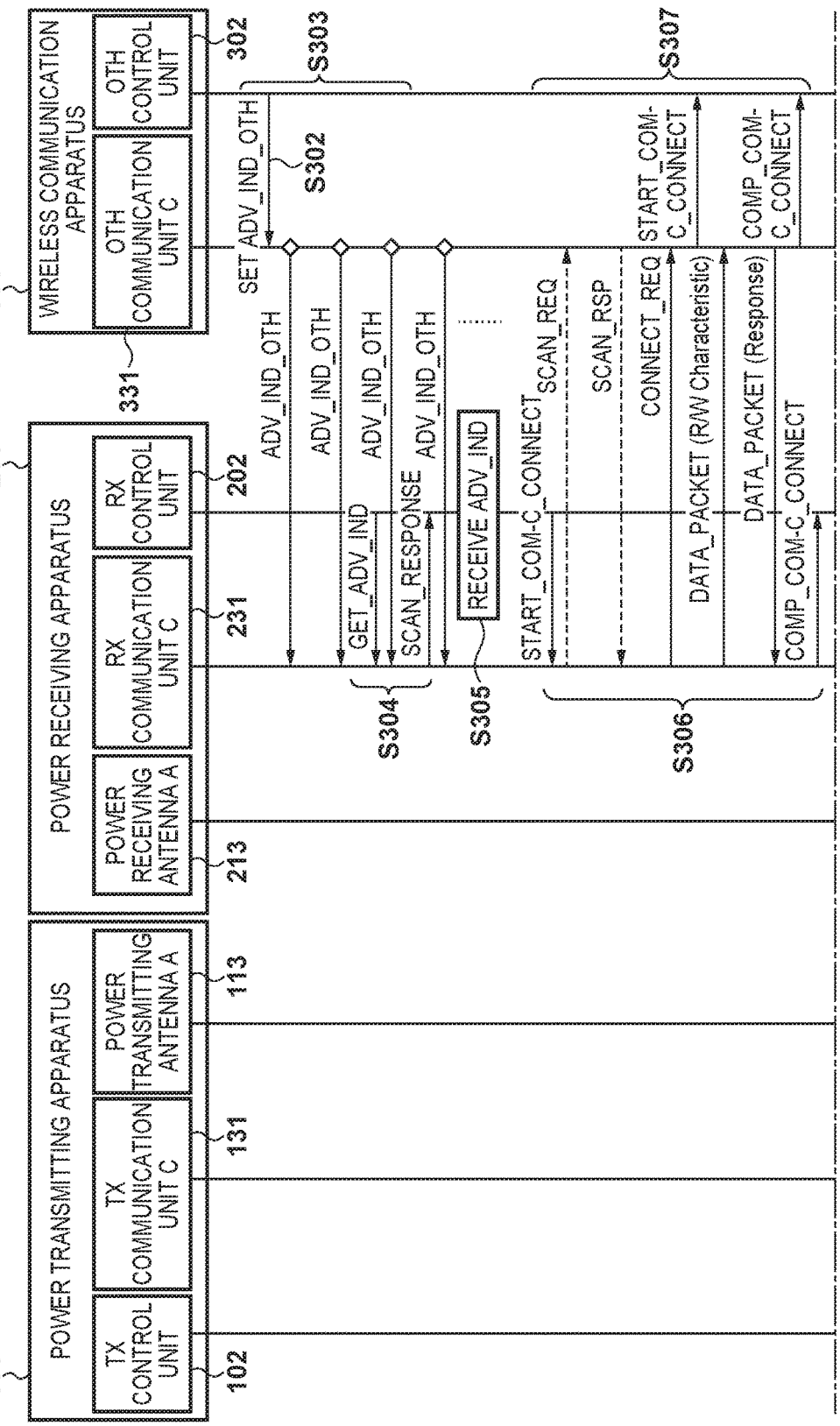

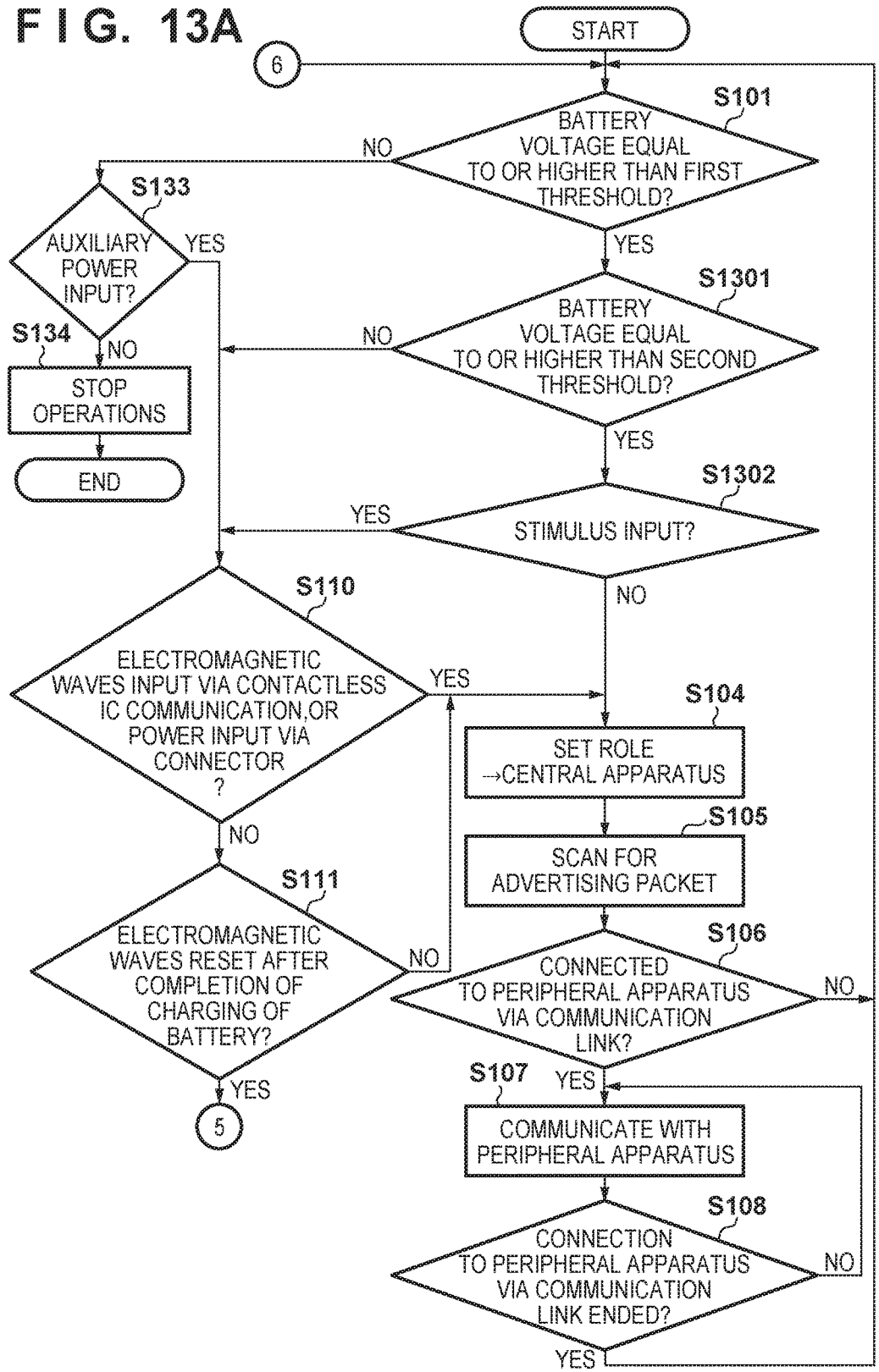

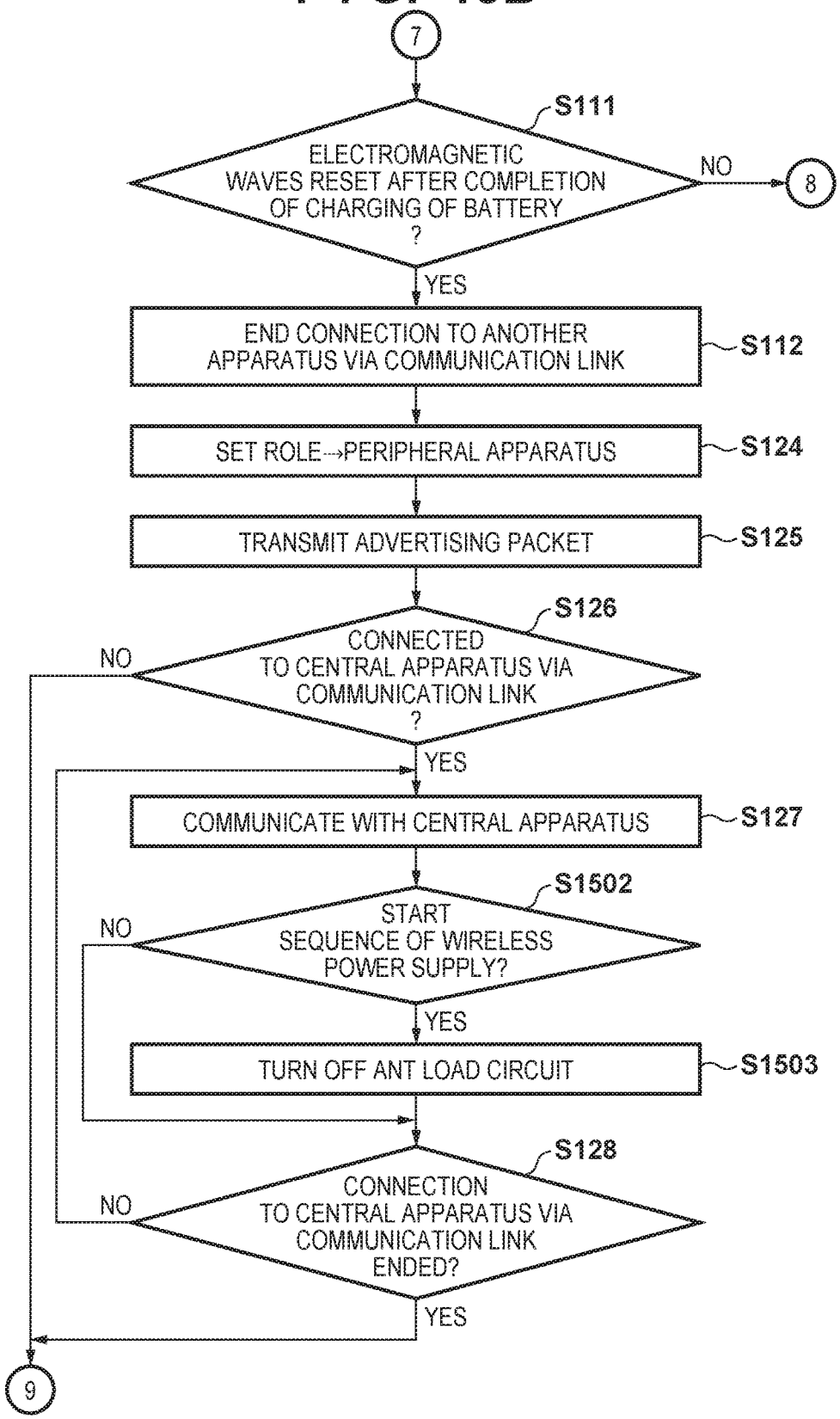

POWER RECEIVING APPARATUS THAT WIRELESSLY RECEIVES POWER, CONTROL METHOD OF THE SAME, AND STORAGE MEDIUM

BACKGROUND OF THE INVENTION

Field of the Invention

The present invention relates to a power receiving apparatus that wirelessly receives power, a control method thereof, and a storage medium.

Description of the Related Art

In recent years, wireless power supply techniques that enable reception of power supplied from an external apparatus via electromagnetic waves without establishing connector-based connection are becoming widespread. Furthermore, there exist techniques to exchange power transmission/reception information by performing predetermined communication between a power transmitting apparatus and a power receiving apparatus in advance, and transmit and receive power that has been decided on based on the information; these techniques enable the power receiving apparatus to appropriately receive electromagnetic waves output from the power transmitting apparatus when using the wireless power supply techniques.

Japanese Patent Laid-Open No. 2006-353042 discloses a technique to, in response to detection of proximity between a power transmitting apparatus and a mobile electronic apparatus, exchange information that is necessary for starting charging between the power transmitting apparatus and the mobile electronic apparatus via near field wireless communication.

Power transmission/reception information can be communicated using, for example, Bluetooth Low Energy® (hereinafter, "BLE"). According to BLE, an apparatus having a peripheral role and an apparatus having a central role are distinguished from each other. As a procedure for establishing BLE-based connection, the peripheral apparatus needs to transmit an advertising packet (information indicating the existence of the peripheral apparatus), and connection needs to be established along with the issuance of a connection request by the central role apparatus in response to the advertising packet.

According to BLE, for example, there may be a case in which connection is constrained depending on the states of a power receiving apparatus and the like, for example, when the number of connected apparatuses is limited, and when connection between central role apparatuses and connection between peripheral role apparatuses are prohibited. For example, when a power receiving apparatus is a central role apparatus, there may be a case in which wireless power supply cannot be started as the power receiving apparatus cannot connect to a power transmitting apparatus that similarly serves as a central role apparatus. On the other hand, when a power receiving apparatus is a peripheral role apparatus, the power receiving apparatus cannot connect to a power transmitting apparatus serving as a central role unless the power receiving apparatus ends connection to another apparatus serving as a central role apparatus.

In view of the above, there is demand for a technique to provide appropriate connection without requiring cumbersome user operations by causing apparatuses to appropriately process a connection procedure (i.e., an advertising packet) depending on the states of the apparatuses in an environment where a power receiving apparatus, a power transmitting apparatus, and another apparatus exist.

SUMMARY OF THE INVENTION

The present invention has been made in consideration of the aforementioned problems, and realizes a technique that can appropriately establish connection between a power supply apparatus and a power receiving apparatus depending on the situation.

In order to solve the aforementioned problems, one aspect of the present invention provides a power receiving apparatus that is capable of communicating with a power transmitting apparatus with wireless power transmission capability, the power receiving apparatus comprising: a detection unit configured to detect a state of the power receiving apparatus; a communication unit configured to, in order to establish connection to other apparatuses including the power transmitting apparatus, transmit information indicating an existence of the power receiving apparatus to the other apparatuses, or receive information indicating an existence of the other apparatuses from the other apparatuses; and a control unit configured to control transmission and reception of the information by the communication unit, wherein in order to enable establishment of connection to the power transmitting apparatus, the control unit switches between transmission and reception of the information based on whether the state of the power receiving apparatus detected by the detection unit is a predetermined state.

Another aspect of the present invention provides a control method of a power receiving apparatus that is capable of communicating with a power transmitting apparatus and includes a communication unit, the power transmitting apparatus having wireless power transmission capability, the control method comprising: detecting a state of the power receiving apparatus; in order to establish connection to other apparatuses including the power transmitting apparatus, performing communication to transmit information indicating an existence of the power receiving apparatus to the other apparatuses, or receive information indicating an existence of the other apparatuses from the other apparatuses; and controlling transmission and reception of the information by the communication unit, wherein in order to enable establishment of connection to the power transmitting apparatus, the controlling switches between transmission and reception of the information based on whether the state of the power receiving apparatus detected in the detecting is a predetermined state.

Still another aspect of the present invention provides a non-transitory computer-readable storage medium storing a program for causing a computer to function as a power receiving apparatus that is capable of communicating with a power transmitting apparatus with wireless power transmission capability, the power receiving apparatus comprising: a detection unit configured to detect a state of the power receiving apparatus; a communication unit configured to, in order to establish connection to other apparatuses including the power transmitting apparatus, transmit information indicating an existence of the power receiving apparatus to the other apparatuses, or receive information indicating an existence of the other apparatuses from the other apparatuses; and a control unit configured to control transmission and reception of the information by the communication unit, wherein in order to enable establishment of connection to the power transmitting apparatus, the control unit switches between transmission and reception of the information based on whether the state of the power receiving apparatus detected by the detection unit is a predetermined state.

According to the present invention, connection between a power supply apparatus and a power receiving apparatus can be appropriately established depending on the situation.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 4A to 4B are flowcharts of a sequence of operations related to role changing processing in the power receiving apparatus according to the first embodiment.

FIGS. 5A to 5D show examples of data of an advertising packet from the power receiving apparatus and examples of a database of a GATT server in the power receiving apparatus according to the first embodiment.

FIGS. 6A to 6E show examples of the arrangement of the power transmitting apparatus, the power receiving apparatus, and the wireless communication apparatus according to the first embodiment.

FIGS. 7A to 7D are sequence diagrams showing processing for performing wireless power supply between the power transmitting apparatus and the power receiving apparatus according to the first embodiment.

FIGS. 8A to 8C are sequence diagrams showing processing for performing data communication between the power receiving apparatus and the wireless communication apparatus according to the first embodiment.

FIGS. 9A to 9D are sequence diagrams showing processing for performing wireless power supply between the power transmitting apparatus and the power receiving apparatus that has shortage of battery capacity according to the first embodiment.

FIGS. 11A to 11D are sequence diagrams showing processing for performing wireless power supply between the power transmitting apparatus and the power receiving apparatus according to the second embodiment.

FIGS. 12A to 12C are sequence diagrams showing processing for performing data communication between the power receiving apparatus and the wireless communication apparatus according to the second embodiment.

FIGS. 13A to 13B are flowcharts of a sequence of operations related to role changing processing in the power receiving apparatus according to a third embodiment.

FIGS. 15A to 15C are flowcharts of a sequence of operations related to role changing processing in the power receiving apparatus according to the fourth embodiment.

DESCRIPTION OF THE EMBODIMENTS

First Embodiment

Exemplary embodiments of the present invention will now be described in detail with reference to the drawings. Note that the following description relates to an example in which an apparatus that can wirelessly receive power (a power receiving apparatus), an apparatus that can wirelessly transmit power (a power transmitting apparatus), and an apparatus that can perform wireless communication (a wireless communication apparatus) are used. Examples of the power receiving apparatus and the wireless communication apparatus include a smartphone, a digital camera, a game console, a tablet terminal, a watch-type or an eyeglass-type information terminal, a head-mounted display, and a device related to a monitoring system or an onboard system. Examples of the power transmitting apparatus according to the embodiments include a mobile apparatus and an apparatus built in a facility.

Furthermore, the dimensions, shapes, relative positions, and the like of the constituents that are exemplarily described in the following embodiments should be changed as appropriate in accordance with the configurations of apparatuses to which the present invention is applied and with various conditions, and the present invention is not limited to these exemplary dimensions, shapes, relative positions, and the like.

The following describes a first embodiment using exemplary processing in which a power receiving apparatus 201 switches the role of the power receiving apparatus 201 between a peripheral role and a central role in accordance with a change in the voltage of a battery of the power receiving apparatus 201.

(Configuration of Power Transmitting Apparatus 101)

Figure 1:
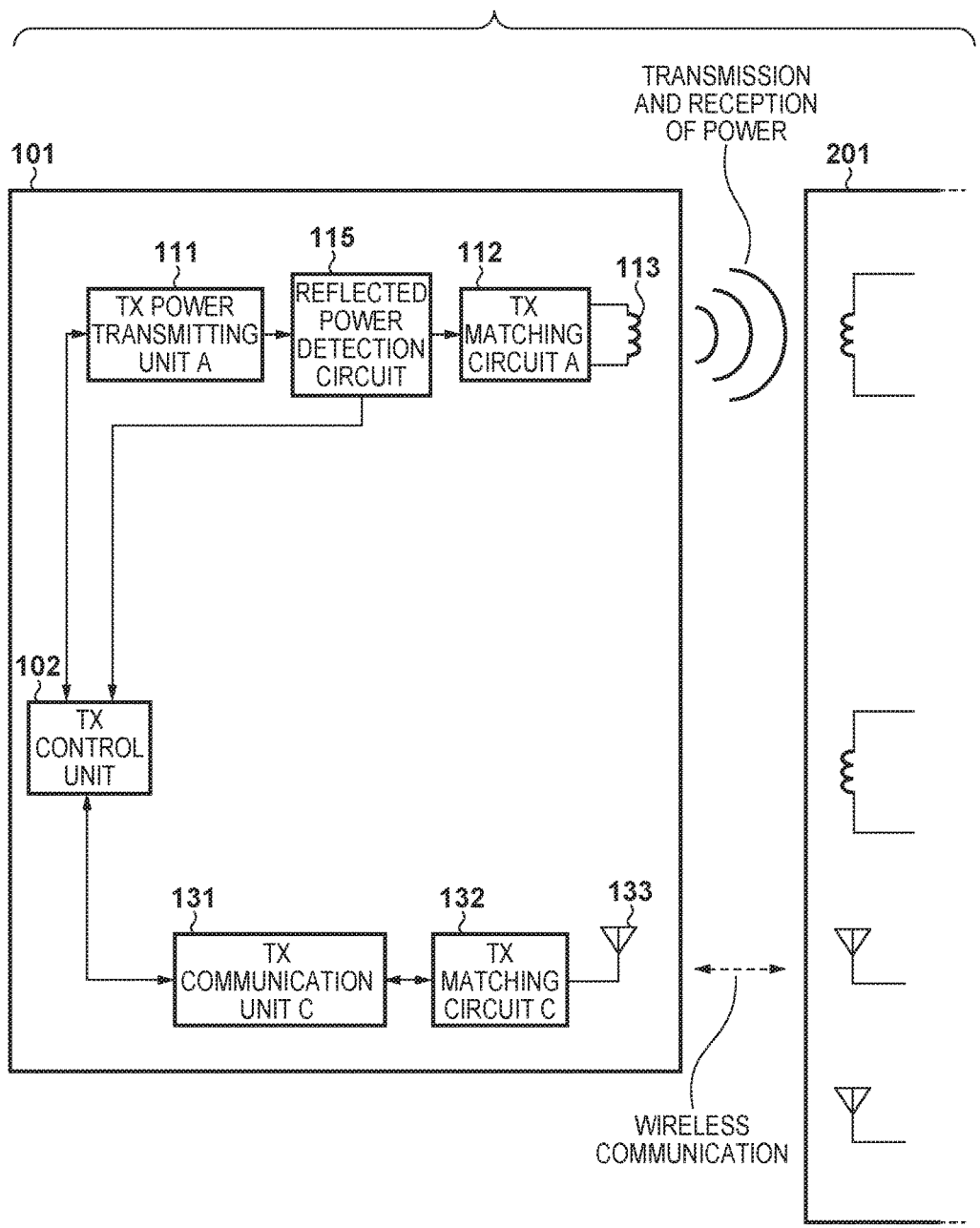
FIG. 1 is a block diagram showing an exemplary functional configuration of a power transmitting apparatus according to a first embodiment.

A description is now given of an exemplary functional configuration of a power transmitting apparatus 101 according to the present embodiment with reference to FIG. 1. With regard to block diagrams that are used in the description of the present embodiment, the description of blocks that are not necessary for the description of the present embodiment, connection between these blocks and power sources, and the operations of these blocks will be omitted. Therefore, each apparatus may include a functional configuration that is not illustrated in the block diagrams.

The power transmitting apparatus 101 shown in FIG. 1 can wirelessly transmit power to the power receiving apparatus 201. A TX control unit 102 includes a CPU, a random-access memory (RAM), and a read-only memory (ROM). The TX control unit 102 controls an entirety of the power transmitting apparatus 101, including wireless power supply control, by deploying programs stored in the ROM to the RAM and using the RAM as a working area.

A TX power transmitting unit A 111 includes circuits for wirelessly transmitting power to the power receiving apparatus 201; for example, it is composed of a transistor amplification circuit, a crystal oscillation circuit, and so forth. A TX matching circuit A 112 is a circuit for matching the impedance of the TX power transmitting unit A 111 and the impedance of a later-described TX power transmitting antenna A 113 to each other. The TX matching circuit A 112 can be adjusted in accordance with control performed by the TX control unit 102. Furthermore, the TX matching circuit A 112 includes a protection circuit that prevents the occurrence of excessive voltage during wireless power transmission.

The TX power transmitting antenna A 113 is an antenna that can wirelessly transmit power to the power receiving apparatus 201. The resonant frequency of the TX power transmitting antenna A 113 is around, for example, 6.78 MHz or 13.56 MHz in the HF band. A reflected power detection circuit 115 includes a reflected power detection circuit that detects travelling waves of power output from the TX power transmitting antenna A 113 as a travelling wave voltage VF, or detects reflected waves as a reflected wave voltage VR. As the reflected power detection circuit 115 can be configured using, for example, a known CM-type directional coupler, a detailed description thereof will be omitted.

A TX communication unit C 131 includes a communication circuit or module that can perform short distance wireless communication with other apparatuses, and can communicate, to the power receiving apparatus 201, control data for performing wireless power supply via short distance wireless communication. The TX communication unit C 131 can perform short distance wireless communication compliant with, for example, Bluetooth Low Energy®, which is a short distance wireless standard. When the power transmitting apparatus 101 wirelessly supplies power to the power receiving apparatus 201, the TX communication unit C 131 operates, for example, as a central role according to BLE.

A TX communication matching circuit C 132 is a circuit for matching the impedance of the TX communication unit C 131 and the impedance of a later-described TX communication antenna C 133 to each other. The TX communication matching circuit C 132 may be a circuit that can be adjusted in accordance with control performed by the TX control unit 102, or may be a circuit with fixed constants. Furthermore, the TX communication matching circuit C 132 includes a protection circuit that prevents the occurrence of excessive voltage.

The TX communication antenna C 133 is an antenna that can perform short distance wireless communication with other apparatuses. The resonant frequency of the TX communication antenna C 133 is around, for example, 2.45 GHz in the UHF band.

(Configuration of Power Receiving Apparatus 201)

Figure 2:
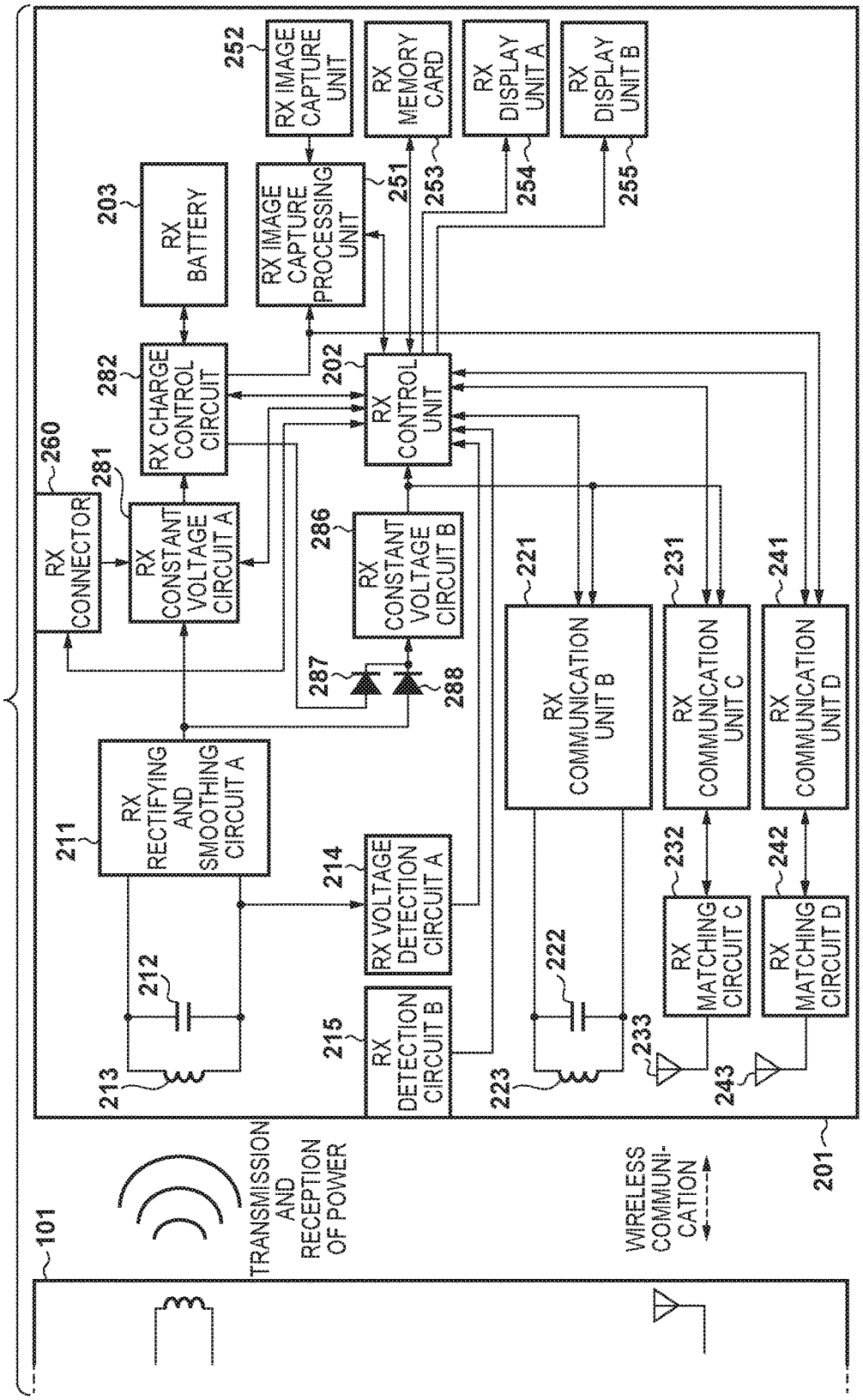
FIG. 2 is a block diagram showing an exemplary functional configuration of a power receiving apparatus according to the first embodiment.

A description is now given of an exemplary functional configuration of the power receiving apparatus 201 according to the present embodiment with reference to FIG. 2. The power receiving apparatus 201 can wirelessly receive power from the power transmitting apparatus 101.

An RX control unit 202 includes a CPU, a RAM, and a ROM, and controls an entirety of the power receiving apparatus 201, including wireless power supply control, by deploying programs stored in the ROM to the RAM and using the RAM as a working area.

An RX power receiving antenna A 213 is an antenna that can wirelessly receive power from the power transmitting apparatus 101. The resonant frequency of the RX power receiving antenna A 213 is around, for example, 6.78 MHz or 13.56 MHz in the HF band. A capacitor 212 constitutes an LC resonant circuit together with the RX power receiving antenna A 213, and is used to decide the antenna resonant frequency.

An RX voltage detection circuit A 214 includes a voltage detection circuit that detects voltage generated in the RX power receiving antenna A 213; it outputs no detection signal when the detected voltage is lower than a voltage detection threshold Vth, and outputs a detection signal when the detected voltage is equal to or higher than the voltage detection threshold Vth. Note that a power source for the operations of the RX voltage detection circuit A 214 may be current generated in the RX power receiving antenna A 213, or may be supplied from another circuit. An RX detection circuit B 215 is a detection circuit than can detect a stimulus from the outside of the power receiving apparatus 201, and is composed of, for example, a mechanical switch, a magnetic sensor, an electrolytic sensor, an acceleration sensor, an angular velocity sensor, a capacitance sensor, a photosensor, and so forth. Note that a power source for the operations of the RX detection circuit B 215 may be supplied from an RX battery 203, or from another circuit.

The RX voltage detection circuit A 214 generates a detection signal when the RX power receiving antenna A 213 receives external electromagnetic waves; thus, for example, when the power transmitting apparatus 101 transmits electromagnetic waves, the power receiving apparatus 201 can detect the electromagnetic waves as an input stimulus. On the other hand, the RX detection circuit B 215 generates a detection signal when the RX detection circuit B 215 experiences an external stimulus, such as mechanical contact, magnetic field irradiation, electric field irradiation, collision between apparatuses, adjacency between apparatuses, and light irradiation. Therefore, for example, when physical operations that achieve these mechanical contact, magnetic field irradiation, electric field irradiation, collision between apparatuses, adjacency between apparatuses, light irradiation, and the like are performed via the power transmitting apparatus 101, the power receiving apparatus 201 can detect these physical operations as input stimuli.

An RX rectifying and smoothing circuit A 211 includes a rectifying and smoothing circuit that rectifies AC voltage generated by power received from the power transmitting apparatus into DC voltage. Once the RX rectifying and smoothing circuit A 211 has rectified the voltage from the RX power receiving antenna A 213 into the DC voltage, an RX constant voltage circuit A 281 transforms the DC voltage into constant voltage and supplies the constant voltage to an RX charge control circuit 282. The RX charge control circuit 282 is a charge control circuit that can charge the RX battery 203. The RX charge control circuit 282 has a function of charging the RX battery 203, and also can output the voltage of the RX battery 203 to other circuits, such as the RX control unit 202 and a later-described RX image capture processing unit 251.

Examples of the RX battery 203 include a secondary battery, such as a single-cell lithium-ion battery. An RX constant voltage circuit B 286 includes a constant voltage circuit, transforms the rectified DC voltage from the RX rectifying and smoothing circuit A 211 into constant voltage, and supplies power to the RX control unit 202, an RX communication unit B 221, and an RX communication unit C 231 in subsequent stages. The RX constant voltage circuit A 281 is a circuit that can supply current with which the RX battery 203 can be charged, and the RX constant voltage circuit B 286 may be composed of a circuit that can supply a smaller amount of current than the RX constant voltage circuit A 281. The RX constant voltage circuit B 286 is OR-connected to diodes 287 and 288 so as to be capable of receiving current from both the RX rectifying and smoothing circuit A 211 and the RX charge control circuit 282. The OR-connection to the diodes 287 and 288 enables the RX control unit 202, RX communication unit B 221, and RX communication unit C 231 to operate using either wireless power received by the RX power receiving antenna A 213 or power from the RX battery 203.

The RX communication unit B 221 is a communication unit that can perform near field wireless communication with an OTH communication unit B321 of a later-described wireless communication apparatus 301 and with another apparatus. The RX communication unit B 221 may be, for example, a contactless IC reader/writer that allows data in a contactless IC to be read and written thereinto and that can perform communication with another contactless IC reader. Near field wireless communication performed by the RX communication unit B 221 complies with, for example, ISO/IEC 21481, which is an international standard.

An RX communication antenna B 223 is an antenna that can perform near field wireless communication with other apparatuses. The resonant frequency of the RX communication antenna B 223 is around, for example, 13.56 MHz in the HF band. A capacitor 222 constitutes an LC resonant circuit together with the RX communication antenna B 223, and is used to decide the antenna resonant frequency.

The RX communication unit C 231 includes a communication circuit or module that can perform short distance wireless communication with other apparatuses, and can communicate, to the power transmitting apparatus 101, control data for performing wireless power supply via short distance wireless communication. The RX communication unit C 231 can perform short distance wireless communication compliant with, for example, BLE, which is a short distance wireless standard. For example, the RX communication unit C 231 operates as a peripheral role and a central role when the power receiving apparatus 201 performs short distance wireless communication with the power transmitting apparatus 101 and the later-described wireless communication apparatus 301, respectively.

An RX communication matching circuit C 232 is a circuit for matching the impedance of the RX communication unit C 231 and the impedance of a later-described RX communication antenna C 233 to each other. The RX communication matching circuit C 232 may be a circuit that can be adjusted in accordance with control performed by the RX control unit 202, or may be a circuit with fixed constants. Furthermore, the RX communication matching circuit C 232 includes a protection circuit that prevents the occurrence of excessive voltage.

The RX communication antenna C 233 is an antenna that can perform short distance wireless communication with other apparatuses. The resonant frequency of the RX communication antenna C 233 is around, for example, 2.45 GHz in the UHF band. An RX communication unit D 241 is a communication unit that can perform wireless communication with other apparatuses. Wireless communication performed by the RX communication unit D 241 complies with, for example, IEEE 802.11, which is a WLAN standard.

An RX communication matching circuit D 242 is a circuit for matching the impedance of the RX communication unit D 241 and the impedance of a later-described RX communication antenna D 243 to each other. The RX communication matching circuit D 242 may be a circuit that can be adjusted in accordance with control performed by the RX control unit 202, or may be a circuit with fixed constants. Furthermore, the RX communication matching circuit D 242 includes a protection circuit that prevents the occurrence of excessive voltage.

The RX communication antenna D 243 is an antenna that can perform wireless communication with other apparatuses. The resonant frequency of the RX communication antenna D 243 is around, for example, 2.45 GHz in the UHF band. An RX image capture unit 252 includes an imaging optical system, which is composed of lenses and driving systems therefor, and an image sensor. The RX image capture processing unit 251 includes a processing circuit or module, and converts an image signal obtained through shooting performed by the RX image capture unit 252 into digital data. An RX memory card 253 is composed of, for example, a rewritable nonvolatile memory, such as a flash memory, and allows the digital data processed by the RX image capture processing unit 251 to be written and read thereinto.

An RX display unit A 254 is composed of, for example, a liquid crystal display (LCD), and can display operation information of the power receiving apparatus 201 and the aforementioned digital data. An RX display unit B 255 is composed of, for example, a light emitting diode (LED), and displays a processing state of the power receiving apparatus 201. An RX connector 260 is a connector for an external interface, typically a USB interface, and the power receiving apparatus 201 can connect to other apparatuses via the RX connector 260. Furthermore, power can be supplied from other apparatuses connected via the RX connector 260 to charge the RX battery 203 via the RX constant voltage circuit A 281 and the RX charge control circuit 282.

(Configuration of Wireless Communication Apparatus 301)

Figure 3:
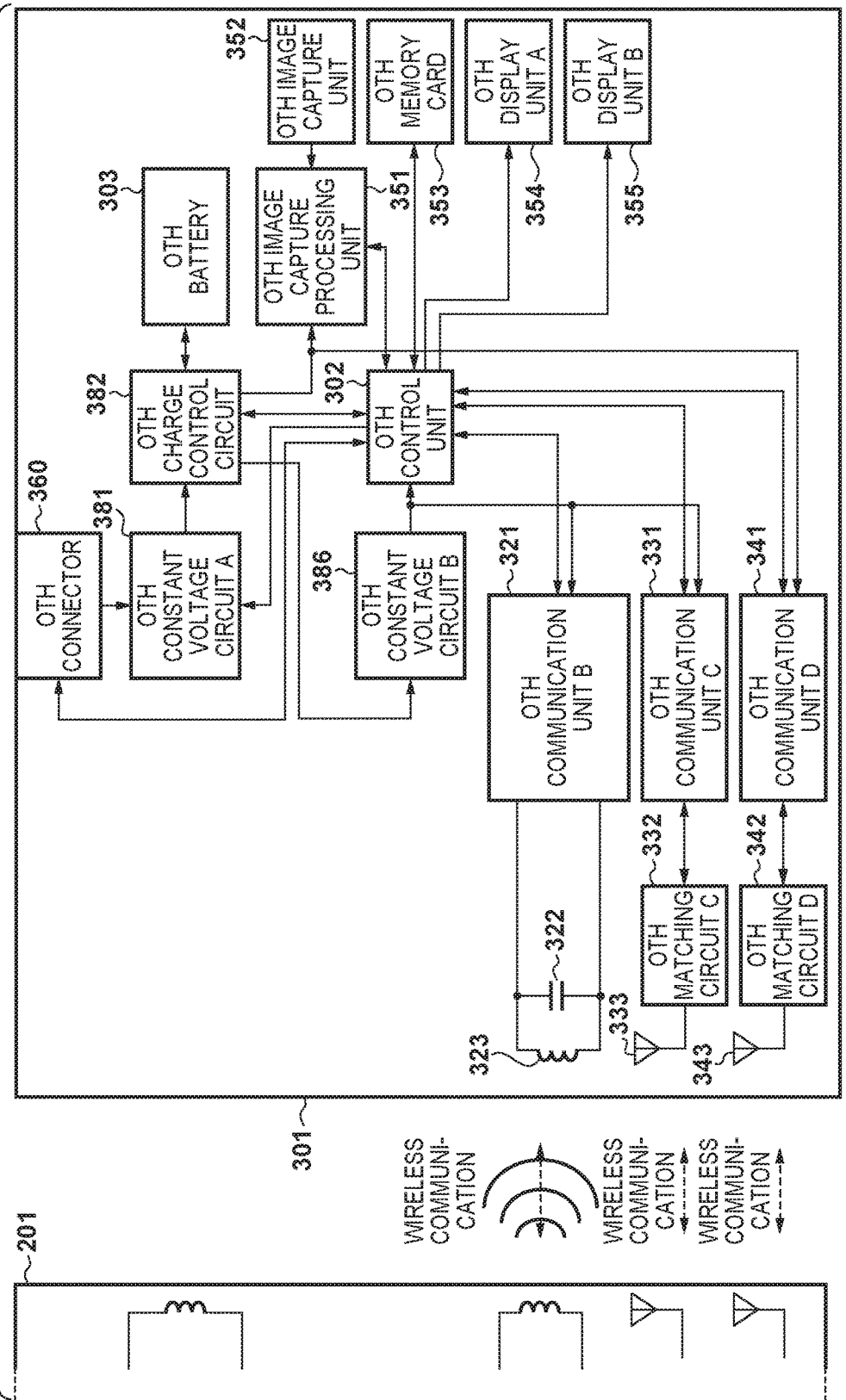
FIG. 3 is a block diagram showing an exemplary functional configuration of a wireless communication apparatus according to the first embodiment.

A description is now given of an exemplary functional configuration of the wireless communication apparatus 301 according to the present embodiment with reference to FIG. 3. The wireless communication apparatus 301 can perform wireless communication with the power receiving apparatus 201. An OTH control unit 302 includes a CPU, a RAM, and a ROM, and controls an entirety of the wireless communication apparatus 301 by deploying programs stored in the ROM to the RAM and using the RAM as a working area.

An OTH connector 360 includes a connector for an external interface, typically a USB interface, and the wireless communication apparatus 301 can connect to other apparatuses via the OTH connector 360. The wireless communication apparatus 301 can also receive power supplied from other apparatuses connected via the OTH connector 360 to charge an OTH battery 303 via an OTH constant voltage circuit A 381 and an OTH charge control circuit 382. The OTH charge control circuit 382 is a charge control circuit that can charge the OTH battery 303. The OTH charge control circuit 382 has a function of charging the OTH battery 303, and a function of outputting the voltage of the OTH battery 303 to other circuits, such as the OTH control unit 302 and a later-described OTH image capture processing unit 351. Examples of the OTH battery 303 include a secondary battery, such as a single-cell lithium-ion battery.

An OTH constant voltage circuit B 386 includes a constant voltage circuit, receives voltage output from the OTH charge control circuit 382, and supplies power to circuits in subsequent stages (i.e., the OTH control unit 302, the OTH communication unit B 321, and an OTH communication unit C 331). The OTH constant voltage circuit B 386 may be composed of a circuit that can supply a smaller amount of current than the OTH constant voltage circuit A 381.

The OTH communication unit B 321 is a communication unit that can perform near field wireless communication with the RX communication unit B 221 of the power receiving apparatus 201 and with other apparatuses. The OTH communication unit B 321 may be, for example, a contactless IC that allows data from a contactless IC reader to be read and written thereinto. Near field wireless communication performed by the OTH communication unit B 321 complies with, for example, ISO/IEC 21481, which is an international standard. An OTH communication antenna B 323 is an antenna that can perform near field wireless communication with the RX communication unit B 221 of the power receiving apparatus 201 and with other apparatuses. The resonant frequency of the OTH communication antenna B 323 is around, for example, 13.56 MHz in the HF band. A capacitor 322 constitutes an LC resonant circuit together with the OTH communication antenna B 323, and is used to decide the antenna resonant frequency. The OTH communication unit C 331 includes a communication circuit or module that can perform short distance wireless communication with the RX communication unit C 231 of the power receiving apparatus 201 and with other apparatuses. Short distance wireless communication performed by the OTH communication unit C 331 complies with, for example, BLE, which is a short distance wireless standard.

The OTH communication unit C 331 operates as a peripheral role according to BLE when performing short distance wireless communication with the power receiving apparatus 201. An OTH communication matching circuit C 332 is a circuit for matching the impedance of the OTH communication unit C 331 and the impedance of a later-described OTH communication antenna C 333 to each other. The OTH communication matching circuit C 332 may be a circuit that can be adjusted in accordance with control performed by the OTH control unit 302, or may be a circuit with fixed constants. Furthermore, the OTH communication matching circuit C 332 includes a protection circuit that prevents the occurrence of excessive voltage. The OTH communication antenna C 333 is an antenna that can perform short distance wireless communication with the RX communication unit C 231 of the power receiving apparatus 201 and with other apparatuses. The resonant frequency of the OTH communication antenna C 333 is around, for example, 2.45 GHz in the UHF band.

An OTH communication unit D 341 includes a communication circuit or module that can perform wireless communication with the RX communication unit D 241 of the power receiving apparatus 201 and with other apparatuses. Wireless communication performed by the OTH communication unit D 341 complies with, for example, IEEE 802.11, which is a WLAN standard. An OTH communication matching circuit D 342 is a circuit for matching the impedance of the OTH communication unit D 341 and the impedance of a later-described OTH communication antenna D 343 to each other. The OTH communication matching circuit D 342 may be a circuit that can be adjusted in accordance with control performed by the RX control unit 202, or may be a circuit with fixed constants. Furthermore, the OTH communication matching circuit D 342 includes a protection circuit that prevents the occurrence of excessive voltage. The OTH communication antenna D 343 is an antenna that can perform wireless communication with the RX communication unit D 241 of the power receiving apparatus 201 and with other apparatuses. The resonant frequency of the OTH communication antenna D 343 is around, for example, 2.45 GHz in the UHF band.

An OTH image capture unit 352 includes an imaging optical system, which is composed of lenses and driving systems therefor, and an image sensor. The OTH image capture processing unit 351 is an image capture processing unit for converting an image shot by the OTH image capture unit 352 into digital data. An OTH memory card 353 includes, for example, a rewritable nonvolatile memory, such as a flash memory, and allows the digital data of the image processed by the OTH image capture processing unit 351 to be written and read thereinto.

An OTH display unit A 354 includes, for example, an LCD, and displays operation information of the wireless communication apparatus 301 and the image shot by the OTH image capture unit 352. An OTH display unit B 355 includes, for example, an LED, and displays a processing state of the wireless communication apparatus 301.

(Sequence of Operations Related to Role Changing Processing in Power Receiving Apparatus 201)

Figure 4A:
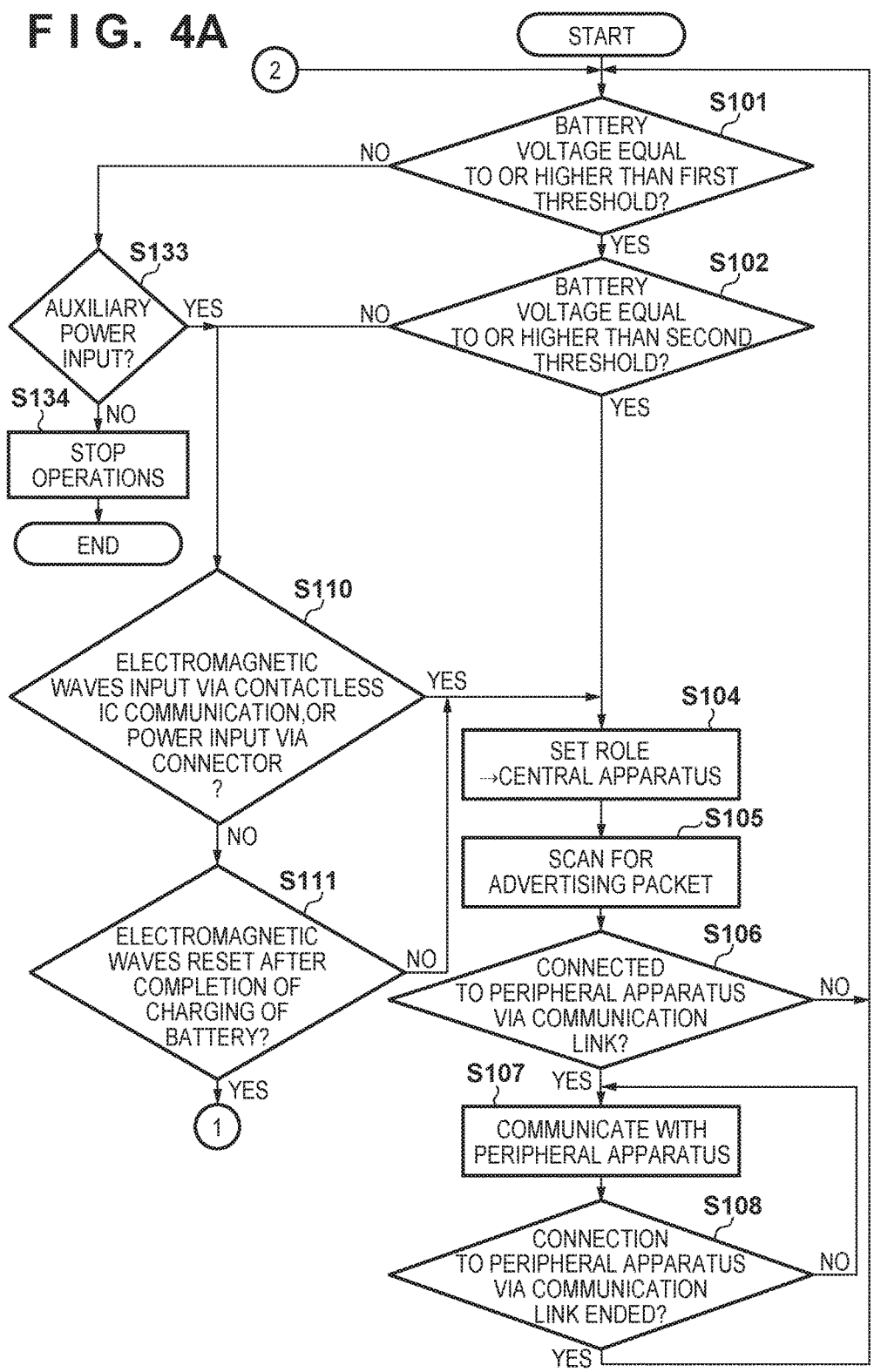
Figure 7A:
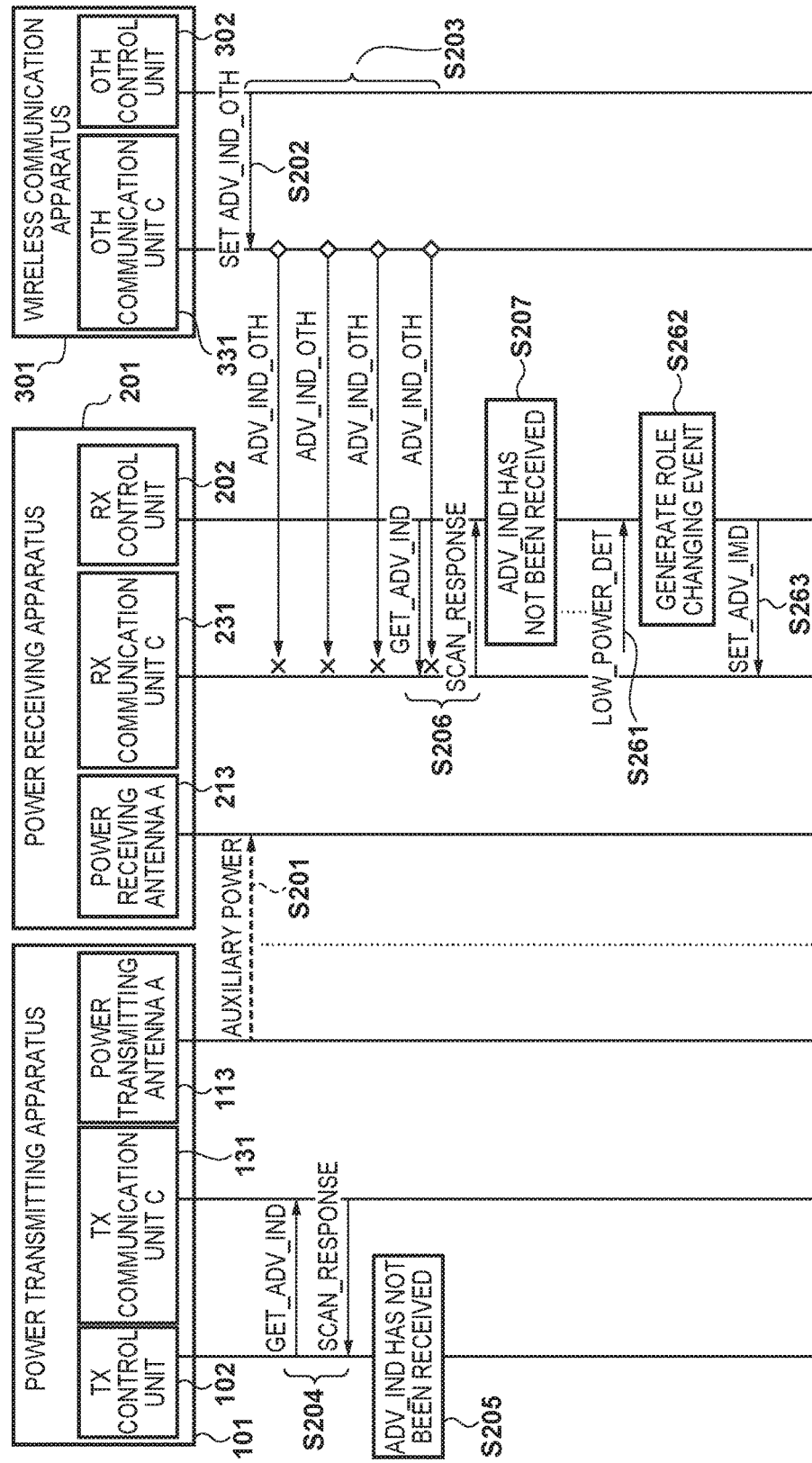
Figure 7B:
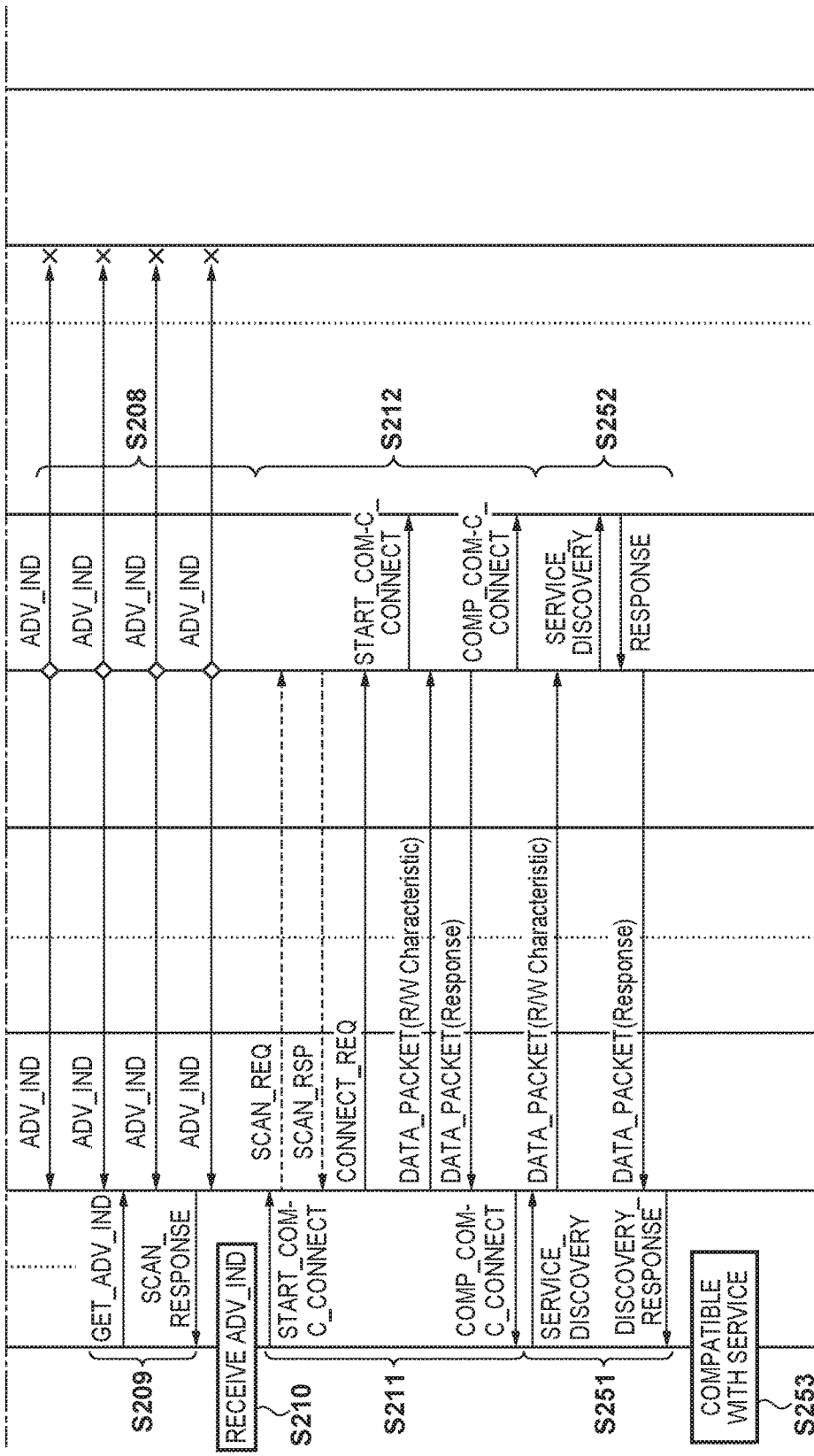

With reference to FIGS. 4A to 4B, the following describes a sequence of operations related to role changing processing in the power receiving apparatus 201. The present processing is achieved as the RX control unit 202 controls various components by deploying programs stored in the non-illustrated ROM into a working space of the non-illustrated RAM and executing the deployed programs, unless otherwise stated. Note that the present sequence of operations is started upon insertion of the RX battery 203 of the power receiving apparatus 201.

In step S101, the RX control unit 202 determines whether the voltage of the RX battery 203 is equal to or higher than a first threshold. The RX control unit 202 proceeds to step S102 if it determines that the voltage of the RX battery 203 is equal to or higher than the first threshold, and proceeds to step S133 otherwise. The first threshold for the RX battery 203 has a value that guarantees normal operations of at least the RX control unit 202 and the RX communication unit C 231 of the power receiving apparatus 201.

In step S102, the RX control unit 202 determines whether the voltage of the RX battery 203 is equal to or higher than a second threshold. The second threshold for the RX battery 203 has a value that is greater than the value of the first threshold and that guarantees normal operations of a part or all of the functions of the power receiving apparatus 201. The RX control unit 202 proceeds to step S104 if it determines that the voltage of the RX battery 203 is equal to or higher than the second threshold, and proceeds to step S110 otherwise.

In step S104, the RX control unit 202 sets a central role as the role of the RX communication unit C 231. Setting a central role as the role of the RX communication unit C 231 makes the power receiving apparatus 201 operate as a central role. Furthermore, in step S105, the RX control unit 202 causes the RX communication unit C 231 to scan for an advertising packet from a peripheral apparatus (information indicating the existence of the peripheral apparatus). If there is an advertising packet from a peripheral role apparatus, a connection request is transmitted.

In step S106, the RX control unit 202 determines whether a communication link has been established with the peripheral role apparatus. If the RX control unit 202 determines that the connection has been established with the peripheral role apparatus, it proceeds to step S107 and communicates with the peripheral role apparatus. If the RX control unit 202 determines that the connection has not been established with the peripheral role apparatus, it returns to step S101.

In step S108, the RX control unit 202 determines whether the connection between the RX communication unit C 231 and the peripheral role apparatus via the communication link has been ended. If the RX control unit 202 determines that the connection to the peripheral role apparatus via the communication link has been ended, it returns to step S101. On the other hand, if it determines that the connection to the peripheral role apparatus via the communication link has not been ended, it returns to step S107 and communicates with the peripheral role apparatus.

A description is now given of the processes that are executed when the power receiving apparatus 201 determines in step S101 that the voltage of the RX battery 203 is not equal to or higher than the first threshold. In step S133, the RX control unit 202 determines whether auxiliary power has been input from another apparatus. Examples of the input auxiliary power include power induced by electromagnetic waves received by the RX power receiving antenna A 213, and power input via the RX connector 260. If the auxiliary power has been input, the RX control unit 202 can operate using the input auxiliary power and executes the processes of step S133 and subsequent steps, even if the voltage of the RX battery 203 of the power receiving apparatus 201 is not equal to or higher than the first threshold. If it is determined that the auxiliary power has not been input from another apparatus, the present processing proceeds to step S134. In step S134, the RX communication unit C 231 stops operating, and the present processing sequence is ended. On the other hand, if the RX control unit 202 determines in step S133 that the auxiliary power has been input from another apparatus, it proceeds to step S110.

In step S110, the RX control unit 202 determines whether communication with the RX communication unit B 221 has taken place, or power is being supplied from another apparatus via the RX connector 260. The RX control unit 202 can determine whether the RX communication unit B 221 has performed communication along with reception of electromagnetic waves from a contactless IC reader by obtaining the status of the RX communication unit B 221. Also, the RX control unit 202 can determine whether power is being supplied from another apparatus via the RX connector 260 based on, for example, data communication between the RX control unit 202 and another apparatus, and the voltage of the RX constant voltage circuit A 281. If the RX control unit 202 determines that communication with the RX communication unit B 221 has taken place or power is being supplied from another apparatus via the RX connector 260, it proceeds to step S104 and executes the above-described process (i.e., sets a central role). On the other hand, if the RX control unit 202 determines that communication with the RX communication unit B 221 of the power receiving apparatus 201 has not taken place and power is not being supplied from another apparatus via the RX connector 260, it proceeds to step S111.

In step S111, the RX control unit 202 determines whether electromagnetic waves from the power transmitting apparatus 101 were reset after the completion of charging of the RX battery 203. For example, based on a detection signal from the RX voltage detection circuit A 214, the RX control unit 202 determines whether the RX power receiving antenna A 213 is receiving electromagnetic waves from the power transmitting apparatus 101. If the RX control unit 202 determines that electromagnetic waves from the power transmitting apparatus 101 are being continuously received, that is to say, electromagnetic waves were not reset, after the completion of charging of the RX battery 203, it proceeds to step S104. On the other hand, if it determines that electromagnetic waves from the power transmitting apparatus 101 cleared, that is to say, electromagnetic waves were reset, after the completion of charging of the RX battery 203, it proceeds to step S112.

In step S112, the RX control unit 202 ends the communication link (connection) that was established with another apparatus using the RX communication unit C 231. In step S124, the RX control unit 202 sets a peripheral role as the role of the RX communication unit C 231. Setting a peripheral role as the role of the RX communication unit C 231 in this way makes the power receiving apparatus 201 operate as a peripheral role apparatus. In step S125, the RX control unit 202 transmits an advertising packet to another apparatus using the RX communication unit C 231. Examples of data of the advertising packet that is transmitted using the RX communication unit C 231 will be described later.

In step S126, the RX control unit 202 determines whether a communication link has been established in response to a connection request transmitted from a central role apparatus to the RX communication unit C 231. If the RX control unit 202 determines that the connection has been established with the central role apparatus, it proceeds to step S127 and communicates with the central role apparatus. On the other hand, if it determines that no connection request has been transmitted from the central role apparatus to the RX communication unit C 231 and the communication link has not been established, it returns to step S101.

In step S128, the RX control unit 202 determines whether the connection between the RX communication unit C 231 and the central role apparatus has been ended. If the connection between the power receiving apparatus 201 and the central role apparatus has been ended, the present processing returns to step S101. On the other hand, if the connection to the central role apparatus via the communication link has not been ended, the present processing returns to step S127, and communication is performed with the central role apparatus. The RX control unit 202 repeats the above-described processes, and then ends the present processing sequence via step S134.

(Examples of Advertising Packet and Related Processing)

The following describes the advertising packet that is transmitted in the aforementioned step S125 with reference to FIGS. 5A to 5C. As shown in FIGS. 5A and 5B, the advertising packet contains packet data that takes up 0 to 296 bits, and the packet data contains a UUID specifying a service that can be executed by the power receiving apparatus 201. UUID is the abbreviation of a universally unique identifier. UUIDs may specify various services, including the following exemplary services.

In the case of an exemplary advertising packet shown in FIG. 5A, UUID 1 indicates that service 1 can be executed. Service 1 represents a wireless power supply service in which wireless power supply and communication of control data are performed in parallel between the power transmitting apparatus 101 and the power receiving apparatus 201. Note that service 1 is designated by communication of control data for wireless power supply between the RX communication unit C 231 of the power receiving apparatus 201 and the TX communication unit C 131 of the power transmitting apparatus 101.

In the case of an exemplary advertising packet shown in FIG. 5B, UUID 2 indicates that service 2 can be executed. Service 2 represents a mutual status confirmation service in which the RX communication unit C 231 of the power receiving apparatus 201 and the TX communication unit C 131 of the power transmitting apparatus 101 confirm the state of the power receiving apparatus 201 with each other at a regular time interval.

As stated earlier, the power receiving apparatus 201 operates as a peripheral role in step S124, and then transmits the advertising packet to the power transmitting apparatus 101 serving as a central role apparatus in step S125 (the power transmitting apparatus 101 scans for this packet). The power transmitting apparatus 101 transmits a connection request to the power receiving apparatus 201, establishes BLE-based connection, and executes a corresponding service if the service-specific UUID contained in the advertising packet transmitted from the power receiving apparatus 201 is effective for the combination of these apparatuses.

That is to say, if the advertising packet transmitted from the power receiving apparatus 201 contains UUID 1, the power transmitting apparatus 101 transmits a connection request to the power receiving apparatus 201, establishes BLE-based connection, and executes the wireless power supply service. On the other hand, if the advertising packet transmitted from the power receiving apparatus 201 contains a UUID other than UUID 1, for example, UUID 2, the power transmitting apparatus 101 transmits a connection request to the power receiving apparatus 201 and establishes BLE-based connection. Then, it executes the wireless power supply service if it confirms that the power receiving apparatus 201 is compatible with the wireless power supply service by performing service discovery.

The service discovery performed by the power transmitting apparatus 101 refers to, for example, a database of a GATT server in the RX communication unit C 231 of the power receiving apparatus 201, which stores services and characteristics as shown in FIG. 5C. FIG. 5C shows an exemplary database of a GATT server for a case in which the power receiving apparatus 201 transmits an advertising packet containing UUID 1 that designates the wireless power supply service. More specifically, it will be assumed that the following three types of services are stored in this database.

Service 1: UUIDs of a plurality of characteristics corresponding to UUID 1, and values corresponding to the UUIDs.

Service 2: UUIDs of a plurality of characteristics corresponding to UUID 2, and values corresponding to the UUIDs.

Service 3: UUIDs of a plurality of characteristics corresponding to UUID 3, and values corresponding to the UUIDs.

Service 1 represents, for example, the aforementioned wireless power supply service. For example, service 1 has the following characteristic values: "apparatus name," "flag indicating whether power can be received," "battery voltage," "flag indicating the completion of charging," "charge completion voltage," "remaining battery level," "maximum received power," and "power requested to be transmitted/received." Service 2 represents, for example, a device information service. For example, service 2 has the following characteristic values: "manufacturer name," "model name," "serial No.," "hardware Rev," "firmware Rev," and "system ID." Service 3 represents, for example, a battery service. One example of a characteristic value of service 3 is "battery voltage."

FIG. 5D shows an exemplary database of a GATT server for a case in which the power receiving apparatus 201 transmits an advertising packet containing UUID 2 that designates a service other than the wireless power supply service, for example, the device information service. More specifically, the following three types of services are stored in this database.

Service 2: UUIDs of a plurality of characteristics corresponding to UUID 2, and values corresponding to the UUIDs.

Service 3: UUIDs of a plurality of characteristics corresponding to UUID 3, and values corresponding to the UUIDs.

Service 1: UUIDs of a plurality of characteristics corresponding to UUID 1, and values corresponding to the UUIDs.

For example, service 2 represents the device information service, service 3 represents the battery service, and service 1 represents the wireless power supply service. Their characteristic values are similar to, for example, the aforementioned characteristic values shown in FIG. 5C.

(Sequences of Operations Executed by Apparatuses Including Power Receiving Apparatus)

With reference to FIGS. 7A to 9D, the following describes sequences of operations that are executed by the power transmitting apparatus 101, power receiving apparatus 201, and wireless communication apparatus 301 in parallel with the aforementioned role changing processing in the power receiving apparatus 201. Note that these sequences of operations executed by the apparatuses differ among the states of arrangement of the apparatuses shown in FIGS. 6A to 6E. In the following description, FIGS. 6A to 6C according to the present embodiment will be referred to where appropriate.

(Sequence of Wireless Power Supply Between Power Transmitting Apparatus and Power Receiving Apparatus)

First, a sequence of operations to perform wireless power supply between the power transmitting apparatus 101 and the power receiving apparatus 201 will be described with reference to FIGS. 7A to 7D. The sequence of operations shown in FIGS. 7A to 7D is started in a state where the power transmitting apparatus 101 and the power receiving apparatus 201 are in proximity to each other and the wireless communication apparatus 301 and the power receiving apparatus 201 are away from each other as shown in FIG. 6A. At the start of this sequence, the voltage of the RX battery 203 of the power receiving apparatus 201 is equal to or higher than the second threshold (that is to say, the power receiving apparatus 201 serves as a central role apparatus).

In step S201, the TX control unit 102 of the power transmitting apparatus 101 wirelessly transmits auxiliary power by controlling the TX power transmitting unit A 111. In the present embodiment, it will be assumed that the auxiliary power transmitted in step S201 has a frequency of, for example, 6.78 MHz, and the transmitted power has an arbitrary wattage value, for example, 0.25 W. The power transmitting apparatus 101 transmits the auxiliary power in step S201 regardless of the presence of an apparatus that receives the auxiliary power, and thereafter continues the transmission of the auxiliary power without a break or intermittently.

In step S202, using a SET_ADV_IND_OTH command, the OTH control unit 302 of the wireless communication apparatus 301 sets an advertising packet to be transmitted from the OTH communication unit C 331. In step S203, the OTH communication unit C 331 of the wireless communication apparatus 301 advertises to a central apparatus by transmitting an advertising packet ADV_IND_OTH. It will be assumed that, at this point, the transmitted advertising packet ADV_IND_OTH does not arrive at the power receiving apparatus 201 because the wireless communication apparatus 301 is away from the power receiving apparatus 201 as in the state of arrangement shown in FIG. 6A.

Meanwhile, in step S204, the TX control unit 102 of the power transmitting apparatus 101 causes the TX communication unit C 131 to scan for the advertising packet using a GET_ADV_IND command, and to return a scan result as a SCAN_RESPONSE command to the TX control unit 102. In step S205, the TX control unit 102 of the power transmitting apparatus 101 confirms that the advertising packet cannot be received, or confirms that the advertising packet does not contain a service with which the power transmitting apparatus 101 is compatible, by obtaining values of the advertising packet from the scan result of step S204. Here, the TX control unit 102 determines that the advertising packet (ADV_IND_OTH) cannot be received because the power transmitting apparatus 101 and the wireless communication apparatus 301 are away from each other as stated earlier.

In step S206, the RX control unit 202 of the power receiving apparatus 201 causes the RX communication unit C 231 to scan for the advertising packet using a GET_ADV_IND command, and to return a scan result as a SCAN_RESPONSE command to the RX control unit 202. In step S207, the RX control unit 202 of the power receiving apparatus 201 confirms that the advertising packet cannot be received, or confirms that the advertising packet does not contain a service with which the power receiving apparatus 201 is compatible, by obtaining values of the advertising packet from the scan result of step S206. The advertising packet ADV_IND_OTH does not arrive at the power receiving apparatus 201 because the power receiving apparatus 201 and the wireless communication apparatus 301 are away from each other as shown in FIG. 6A. Therefore, the power receiving apparatus 201 determines that the advertising packet cannot be received.

In step S261, if the voltage of the RX battery 203 of the power receiving apparatus 201 falls below the second threshold, the RX control unit 202 of the power receiving apparatus 201 detects falling of the voltage of the RX battery 203 below the second threshold. In step S262, the RX control unit 202 of the power receiving apparatus 201 generates a role changing event (i.e., sets a peripheral role). In step S263, using a SET_ADV_IND command, the RX control unit 202 of the power receiving apparatus 201 sets an advertising packet to be transmitted from the RX communication unit C 231. At the same time as the setting of the advertising packet, the RX control unit 202 of the power receiving apparatus 201 also sets a database of a GATT server in the RX communication unit C 231 of the power receiving apparatus 201, which stores services and characteristics. In the following description of the sequences, a database of a GATT server will simply be referred to as a database.

If a signal shown in FIG. 5A is set as the advertising packet in step S263, the power receiving apparatus 201 sets the database as shown in, for example, FIG. 5C. On the other hand, if a signal shown in FIG. 5B is set as the advertising packet, the database is set as shown in, for example, FIG. 5D. Thereafter, in step S208, the RX communication unit C 231 of the power receiving apparatus 201 advertises to a central apparatus by transmitting the advertising packet ADV_IND. Note that the advertising packet transmitted from the power receiving apparatus 201 is not processed by the wireless communication apparatus 301 serving as a peripheral role apparatus.

In step S209, the TX control unit 102 of the power transmitting apparatus 101 causes the TX communication unit C 131 to scan for the advertising packet using a GET_ADV_IND command, and to return a scan result to the TX control unit 102 using a SCAN_RESPONSE command. In step S210, the TX control unit 102 of the power transmitting apparatus 101 receives the advertising packet ADV_IND from the power receiving apparatus 201, and obtains values of this advertising packet. It also confirms that this advertising packet contains a service with which the power transmitting apparatus 101 is compatible. In step S211, using a START_COM_C_CONNECT command, the TX control unit 102 of the power transmitting apparatus 101 starts connecting to the RX communication unit C 231 of the power receiving apparatus 201 with the aid of the TX communication unit C 131. The TX communication unit C 131 of the power transmitting apparatus 101 transmits CONNECT_REQ to the RX communication unit C 231 of the power receiving apparatus 201. Accordingly, the power transmitting apparatus 101 and the power receiving apparatus 201 start connecting to each other to transmit and receive control data for power supply. Note that the TX communication unit C 131 of the power transmitting apparatus 101 may transmit SCAN_REQ to the RX communication unit C 231 of the power receiving apparatus 201 and receive SCAN_RSP before transmitting CONNECT_REQ. Determining whether to exchange SCAN_REQ and SCAN_RSP is an ordinary operation based on a type of an advertising packet, and thus a detailed description thereof will be omitted.

Then, the TX communication unit C 131 of the power transmitting apparatus 101, which has transmitted CONNECT_REQ, transmits DATA_PACKET to the RX communication unit C 231 of the power receiving apparatus 201, and receives DATA_PACKET in response. Received DATA_PACKET may be, for example, characteristic values of the database in the RX communication unit C 231 of the power receiving apparatus 201, which is shown in FIG. 5C or 5D. Upon receiving DATA_PACKET, the TX communication unit C 131 of the power transmitting apparatus 101 sends the TX control unit 102 a COMP_COM_C_CONNECT command indicating the completion of the connection between the power transmitting apparatus 101 and the power receiving apparatus 201.

Meanwhile, in step S212, upon receiving CONNECT_REQ, the RX communication unit C 231 of the power receiving apparatus 201 sends the RX control unit 202 a START_COM_C_CONNECT command indicating that the power transmitting apparatus 101 and the power receiving apparatus 201 have started connecting to each other. The RX communication unit C 231 of the power receiving apparatus 201 receives DATA_PACKET from the TX communication unit C 131 of the power transmitting apparatus 101, and transmits DATA_PACKET to the TX communication unit C 131 of the power transmitting apparatus 101. After transmitting DATA_PACKET, the RX communication unit C 231 of the power receiving apparatus 201 sends the RX control unit 202 a COMP_COM_C_CONNECT command indicating the completion of the connection between the power transmitting apparatus 101 and the power receiving apparatus 201.

In step S251, the TX control unit 102 of the power transmitting apparatus 101 issues a request to obtain a service set contained in the database stored in the RX communication unit C 231 of the power receiving apparatus 201 using a SERVICE_DISCOVERY command with the aid of the TX communication unit C 131. The TX communication unit C 131 of the power transmitting apparatus 101 transmits DATA_PACKET (R/W Characteristic) to the RX communication unit C 231 of the power receiving apparatus 201, and then receives DATA_PACKET in response. Upon receiving DATA_PACKET, the TX communication unit C 131 of the power transmitting apparatus 101 returns a DISCOVERY_RESPONSE command as a response to the TX control unit 102.

In step S252, the RX communication unit C 231 of the power receiving apparatus 201, which has received and transmitted DATA_PACKET, notifies the RX control unit 202 of the request that was issued by the power transmitting apparatus 101 using the SERVICE_DISCOVERY command to obtain the service set contained in the database. Using a RESPONSE command, the RX control unit 202 of the power receiving apparatus 201 returns the state of the power receiving apparatus 201 to the RX communication unit C 231. The RX communication unit C 231 of the power receiving apparatus 201 updates characteristic values of services in the database stored in the RX communication unit C 231. Then, DATA_PACKET is transmitted to the TX communication unit C 131 of the power transmitting apparatus 101.

In step S253, based on the response made in step S251, the TX control unit 102 of the power transmitting apparatus 101 obtains the service set contained in the database stored in the RX communication unit C 231 of the power receiving apparatus 201, and confirms that the power transmitting apparatus 101 is compatible with the service set. This enables use of BLE-based services.

Thereafter, the TX communication unit C 131 of the power transmitting apparatus 101 and the RX communication unit C 231 of the power receiving apparatus 201 maintain the BLE-based connection by transmitting and receiving DATA_PACKET at a regular interval. The RX control unit 202 of the power receiving apparatus 201 may change characteristic values of the database stored in the RX communication unit C 231 in accordance with the operational state of the power receiving apparatus 201 during the regular interval at which DATA_PACKET is transmitted and received.

In step S213, the TX control unit 102 of the power transmitting apparatus 101 transmits a START_WPT command for starting the wireless power supply service with the power receiving apparatus 201. Upon receiving the START_WPT command, the TX communication unit C 131 of the power transmitting apparatus 101 notifies the power receiving apparatus 201 of the start of the wireless power supply service by transmitting and receiving DATA_PACKET to and from the RX communication unit C 231 of the power receiving apparatus 201. Upon receiving DATA_PACKET, the TX communication unit C 131 of the power transmitting apparatus 101 sends the TX control unit 102 a RESPONSE command indicating that the power receiving apparatus 201 has been notified of the start of the wireless power supply service.

The TX control unit 102 of the power transmitting apparatus 101 transmits a READ_WPT_STATUS command to the TX communication unit C 131 so as to issue a request to obtain parameters that are necessary for the wireless power supply service from the power receiving apparatus 201. The TX communication unit C 131 of the power transmitting apparatus 101 obtains the parameters that are necessary for the wireless power supply service (i.e., control data for wireless power supply) from the power receiving apparatus 201 by transmitting and receiving DATA_PACKET to and from the RX communication unit C 231 of the power receiving apparatus 201. Note that the parameters that are necessary for the wireless power supply service are, for example, characteristic values of service 2 in the database stored in the RX communication unit C 231 of the power receiving apparatus 201, which are shown in FIG. 5C or 5D. Upon receiving DATA_PACKET, the TX communication unit C 131 of the power transmitting apparatus 101 sends the TX control unit 102 a RESPONSE command indicating the parameters that are necessary for the wireless power supply service, which have been obtained from the power receiving apparatus 201.

Meanwhile, in step S214, the RX communication unit C 231 of the power receiving apparatus 201 sends the RX control unit 202 a START_WPT command indicating that the wireless power supply service has been started with the power transmitting apparatus 101. Upon receiving DATA_PACKET, the RX communication unit C 231 of the power receiving apparatus 201 sends the RX control unit 202 a READ_WPT_STATUS command indicating that the parameters that are necessary for the wireless power supply service are to be obtained. Upon receiving the READ_WPT_STATUS command, the RX control unit 202 of the power receiving apparatus 201 returns the state of the power receiving apparatus 201 as a RESPONSE command to the RX communication unit C 231. The RX communication unit C 231 of the power receiving apparatus 201 updates characteristic values of services in the database stored in the RX communication unit C 231. Then, DATA_PACKET is transmitted to the TX communication unit C 131 of the power transmitting apparatus 101.

In step S215, using a WPT_POWER_EN command, the TX control unit 102 of the power transmitting apparatus 101 sets power to be transmitted from the TX power transmitting antenna A 113 by controlling the TX power transmitting unit A 111. Here, the wireless power is set in accordance with the parameters obtained in step S213, that is to say, the parameters that are necessary for wireless power supply to the power receiving apparatus 201. For example, the set wireless power is lower than the "maximum received power" indicated by a characteristic value of the database shown in FIG. 5C, and matches the "power requested to be transmitted/received" of the database. While the TX power transmitting antenna A 113 is wirelessly transmitting power to the RX power receiving antenna A 213 of the power receiving apparatus 201, the power transmitting apparatus 101 continuously exchanges the parameters that are necessary for the wireless power supply service with the power receiving apparatus 201. The TX communication unit C 131 of the power transmitting apparatus 101 receives DATA_PACKET (Notification) from the RX communication unit C 231 of the power receiving apparatus 201. Then, it sends the TX control unit 102 a FULL_BATTERY_NOTIFY command indicating the completion of charging of the RX battery 203 of the power receiving apparatus 201.

In step S216, the power transmitting apparatus 101 transmits wireless power from the TX power transmitting antenna A 113 of the TX control unit 102 to the RX power receiving antenna A 213 of the power receiving apparatus 201. The wireless power transmitted in step S216 has a frequency of, for example, 6.78 MHz, and the transmitted power is higher than the auxiliary power that has been transmitted since step S201.

In step S217, the power receiving apparatus 201 receives, via the RX power receiving antenna A 213, the wireless power transmitted from the TX power transmitting antenna A 113 of the power transmitting apparatus 101, and charges the RX battery 203 using the received power. The RX control unit 202 of the power receiving apparatus 201 updates characteristic values of services in the database stored in the RX communication unit C 231 in accordance with, for example, a charged state of the RX battery 203. Upon receiving DATA_PACKET, the RX communication unit C 231 of the power receiving apparatus 201 sends the RX control unit 202 a READ_WPT_STATUS command indicating that the parameters that are necessary for the wireless power supply service are to be obtained. Upon receiving the READ_WPT_STATUS command, the RX control unit 202 of the power receiving apparatus 201 returns a response, specifically, a RESPONSE command indicating the state of the power receiving apparatus 201, to the RX communication unit C 231. Upon receiving the RESPONSE command, the RX communication unit C 231 of the power receiving apparatus 201 updates characteristic values of services in the database stored in the RX communication unit C 231. Then, DATA_PACKET is transmitted to the TX communication unit C 131 of the power transmitting apparatus 101. While the power receiving apparatus 201 is receiving wireless power from the TX power transmitting antenna A 113 of the power transmitting apparatus 101 via the RX power receiving antenna A 213, it continuously exchanges the parameters that are necessary for the wireless power supply service with the power transmitting apparatus 101. When the RX battery 203 has been fully charged, that is to say, when charging has been completed, the RX control unit 202 of the power receiving apparatus 201 sends the RX communication unit C 231 a FULL_BATTERY_NOTIFY command indicating the completion of charging of the RX battery 203. Upon receiving the FULL_BATTERY_NO-TIFY command, the RX communication unit C 231 transmits DATA_PACKET (Notification) to the TX communication unit C 131 of the power transmitting apparatus 101.

In step S218, upon receiving DATA_PACKET indicating the completion of charging, the TX communication unit C 131 of the power transmitting apparatus 101 transmits DATA_PACKET (Ack) to the RX communication unit C 231 of the power receiving apparatus 201. Upon completion of charging of the power receiving apparatus 201, the TX control unit 102 of the power transmitting apparatus 101 stops the wireless power transmission from the TX power transmitting antenna A 113 by controlling the TX power transmitting unit A 111 using a WPT_POWER_DISABLE command. Using an END_WPT command, the TX control unit 102 of the power transmitting apparatus 101 ends the wireless power supply service with the power receiving apparatus 201. The TX communication unit C 131 of the power transmitting apparatus 101 notifies the power receiving apparatus 201 of the ending of the wireless power supply service by transmitting and receiving DATA_PACKET to and from the RX communication unit C 231 of the power receiving apparatus 201. Thereafter, it obtains, from the power receiving apparatus 201, a RESPONSE command in relation to the ending of the wireless power supply service. The TX communication unit C 131 of the power transmitting apparatus 101 sends the TX control unit 102 a RESPONSE command indicating that the wireless power supply service with the power receiving apparatus 201 has been ended. In step S219, the power transmitting apparatus 101 starts transmitting auxiliary power from the TX power transmitting antenna A 113 of the TX control unit 102 to the RX power receiving antenna A 213 of the power receiving apparatus 201. Thereafter, the power transmitting apparatus 101 continues the transmission of auxiliary power similarly to step S201.

In step S220, the RX communication unit C 231 of the power receiving apparatus 201, which has received DATA_PACKET, subsequently receives another DATA_PACKET and sends the RX control unit 202 an END_WPT command indicating that the wireless power supply service has been ended. Then, the RX control unit 202 of the power receiving apparatus 201 returns a RESPONSE command as a response to the RX communication unit C 231. The RX communication unit C 231 transmits DATA_PACKET as a response to the TX communication unit C 131 of the power transmitting apparatus 101. Accordingly, the RX power receiving antenna A 213 of the power receiving apparatus 201 switches from reception of wireless power to reception of auxiliary power.

In step S221, using a START_COM_C_CONNECT command, the TX control unit 102 of the power transmitting apparatus 101 causes the TX communication unit C 131 to start terminating the connection to the RX communication unit C 231 of the power receiving apparatus 201. The TX communication unit C 131 of the power transmitting apparatus 101 transmits DATA_PACKET (Disconnect) to the RX communication unit C 231 of the power receiving apparatus 201. Then, the TX communication unit C 131 of the power transmitting apparatus 101 receives DATA_PACKET as a response from the RX communication unit C 231 of the power receiving apparatus 201. The TX communication unit C 131 of the power transmitting apparatus 101 sends the TX control unit 102 a DISCONNECT_COM-C command indicating the completion of the termination of the connection between the power transmitting apparatus 101 and the power receiving apparatus 201.

Meanwhile, in step S222, upon receiving DATA_PACKET, the RX communication unit C 231 of the power receiving apparatus 201 transmits DATA_PACKET (Command Status) to the TX communication unit C 131 of the power transmitting apparatus 101. Then, it sends the RX control unit 202 a TERMINATE_COM-C_LINK command indicating that the termination of the connection between the power transmitting apparatus 101 and the power receiving apparatus 201 has been started. In response, the RX control unit 202 of the power receiving apparatus 201 returns a RESPONSE command as a response to the RX communication unit C 231. The RX communication unit C 231 also transmits DATA_PACKET (Disconnect Completed) to the TX communication unit C 131 of the power transmitting apparatus 101. After transmitting DATA_PACKET, the RX communication unit C 231 of the power receiving apparatus 201 sends the RX control unit 202 a DISCONNECT_COM-C command indicating the completion of the termination of the connection between the power transmitting apparatus 101 and the power receiving apparatus 201.

In step S272, as the wireless power supply service has been executed between the power receiving apparatus 201 and the power transmitting apparatus 101, the voltage of the RX battery 203 is equal to or higher than the second threshold. The RX control unit 202 of the power receiving apparatus 201 clears the role changing event. Thereafter, the processes of the aforementioned steps S204 to S206 are executed again.

In the sequence shown in FIGS. 7A to 7D, when the voltage of the RX battery 203 of the power receiving apparatus 201 is sufficient, the power receiving apparatus 201 operates as a central role apparatus and scans for an advertising packet. On the other hand, when the voltage of the RX battery 203 is not sufficient (step S261 and subsequent steps), the power receiving apparatus operates as a peripheral role apparatus and transmits an advertising packet. As such, the power receiving apparatus 201 can switch among connections to other apparatuses and among executions of executable services by controlling its role (a peripheral role or a central role) based on the voltage of the RX battery 203.

In the state of arrangement shown in FIG. 6A, when the voltage of the RX battery 203 of the power receiving apparatus 201 is sufficient, as the power receiving apparatus 201 scans for an advertising packet from the wireless communication apparatus 301, BLE-based connection is not established with the power transmitting apparatus 101, and the wireless power supply service is not executed therewith. On the other hand, when the voltage of the RX battery 203 of the power receiving apparatus 201 is not sufficient, the power receiving apparatus 201 establishes BLE-based connection with the power transmitting apparatus 101 by advertising to the power transmitting apparatus 101. Accordingly, the wireless power supply service can be executed between the power receiving apparatus 201 and the power transmitting apparatus 101. When the voltage of the RX battery 203 of the power receiving apparatus 201 is not sufficient, the power receiving apparatus 201 does not scan for an advertising packet from the wireless communication apparatus 301, and does not establish BLE-based connection with the wireless communication apparatus 301. This can prevent the initiation of invalid services between the power receiving apparatus 201 and the wireless communication apparatus 301.

(Sequence of Wireless Communication Between Power Receiving Apparatus and Wireless Communication Apparatus)

Figure 8C:
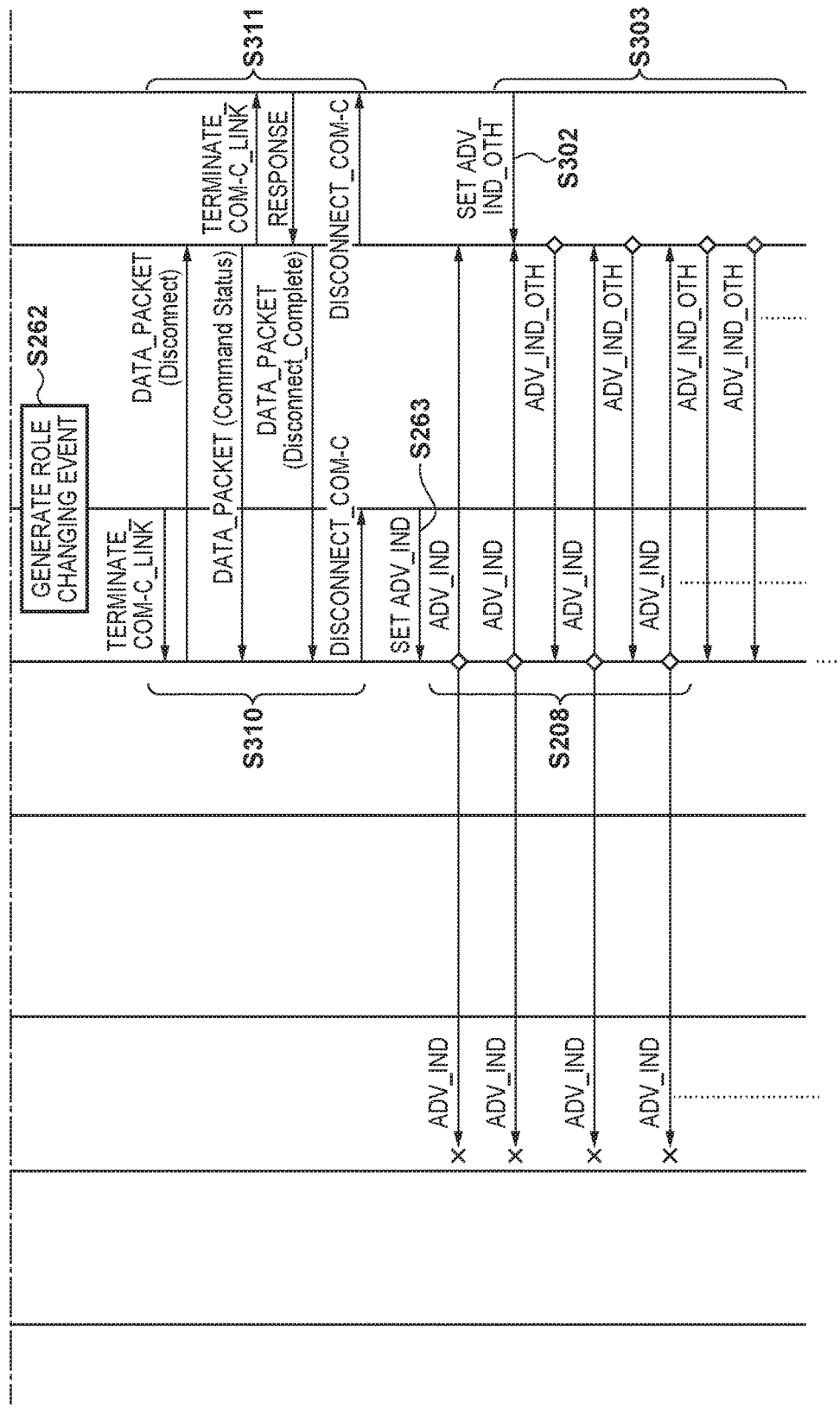
Figure 9C:
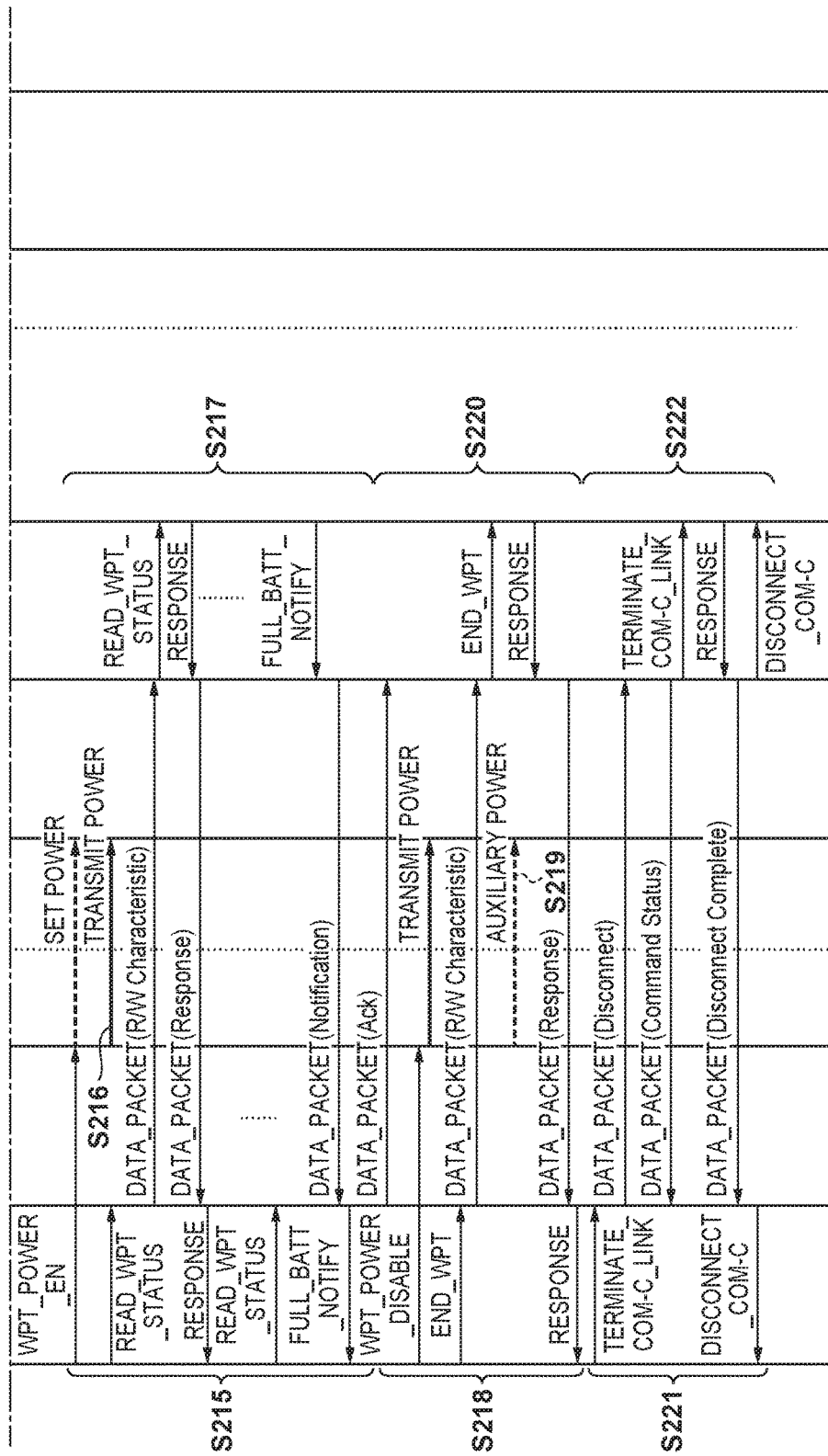
Figure 9D:
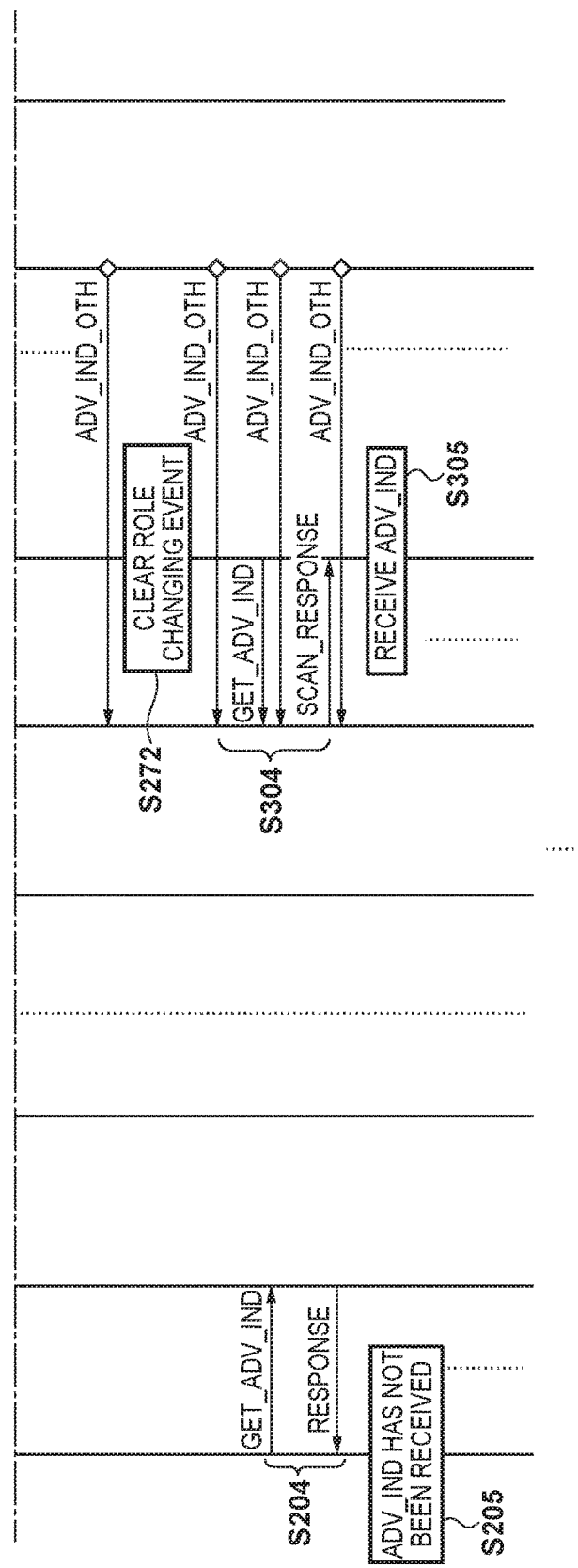

A description is now given of a sequence of wireless communication between the wireless communication apparatus 301 and the power receiving apparatus 201 with references to FIGS. 8A to 8C. It will be assumed that the voltage of the RX battery 203 of the power receiving apparatus 201 is equal to or higher than the second threshold in the sequence shown in FIGS. 8A to 8C. The operations of this sequence are started in the state of arrangement shown in FIG. 6B, specifically, a state where the power transmitting apparatus 101 and the power receiving apparatus 201 are away from each other and the wireless communication apparatus 301 and the power receiving apparatus 201 are in proximity to each other. Note that the steps that are the same as the aforementioned steps described with reference to FIGS. 7A to 7D are given the same step numbers thereas, and the description thereof will be omitted.

In step S302, using a SET_ADV_IND_OTH command, the OTH control unit 302 of the wireless communication apparatus 301 sets an advertising packet to be transmitted from the OTH communication unit C 331. In step S303, the OTH communication unit C 331 of the wireless communication apparatus 301 advertises to a central role apparatus by transmitting an advertising packet ADV_IND_OTH. In the present example, the advertising packet ADV_IND_OTH does not arrive at the power transmitting apparatus 101 because the power transmitting apparatus 101 and the power receiving apparatus 201 are away from each other as in the state of arrangement shown in FIG. 6B.

Meanwhile, in step S304, the RX control unit 202 of the power receiving apparatus 201 causes the RX communication unit C 231 to scan for the advertising packet using a GET_ADV_IND command, and to return a scan result as a RESPONSE command to the RX control unit 202. In step S305, the RX control unit 202 of the power receiving apparatus 201 confirms that the advertising packet transmitted from the wireless communication apparatus 301 has been received by obtaining values of the advertising packet from the RESPONSE command representing the scan result of step S304. The RX control unit 202 of the power receiving apparatus 201 also confirms that the advertising packet contains a service with which the power receiving apparatus 201 is compatible.

In step S306, using a START_COM_C_CONNECT command, the RX control unit 202 of the power receiving apparatus 201 causes the RX communication unit C 231 to start connecting to the OTH communication unit C 331 of the wireless communication apparatus 301. The RX communication unit C 231 of the power receiving apparatus 201 transmits CONNECT_REQ to the OTH communication unit C 331 of the wireless communication apparatus 301. Note that the RX communication unit C 231 of the power receiving apparatus 201 may transmit SCAN_REQ to the OTH communication unit C 331 of the wireless communication apparatus 301 and receive SCAN_RSP before transmitting CONNECT_REQ. Determining whether to exchange SCAN_REQ and SCAN_RSP is an ordinary operation based on a type of an advertising packet, and thus a detailed description thereof will be omitted. Thereafter, the RX communication unit C 231 of the power receiving apparatus 201 transmits DATA_PACKET (R/W Characteristic) to the OTH communication unit C 331 of the wireless communication apparatus 301, and receives DATA_PACKET. Upon receiving DATA_PACKET, the RX communication unit C 231 of the power receiving apparatus 201 sends the RX control unit 202 a COMP_COM_C_CONNECT command indicating the completion of the connection between the power receiving apparatus 201 and the wireless communication apparatus 301.

In step S307, upon receiving CONNECT_REQ, the OTH communication unit C 331 of the wireless communication apparatus 301 sends the OTH control unit 302 a START_COM_C_CONNECT command indicating that the power receiving apparatus 201 and the wireless communication apparatus 301 have started connecting to each other. Then, the OTH communication unit C 331 of the wireless communication apparatus 301 receives DATA_PACKET (R/W Characteristic) from the RX communication unit C 231 of the power receiving apparatus 201, and transmits DATA_PACKET to the RX communication unit C 231 of the power receiving apparatus 201. After transmitting DATA_PACKET, the OTH communication unit C 331 of the wireless communication apparatus 301 sends the OTH control unit 302 a COMP_COM_C_CONNECT command indicating the completion of the connection between the power receiving apparatus 201 and the wireless communication apparatus 301.

In step S351, using a SERVICE_DISCOVERY command, the RX control unit 202 of the power receiving apparatus 201 issues a request to obtain a service set contained in a database stored in the OTH communication unit C 331 of the wireless communication apparatus 301 with the aid of the RX communication unit C 231. The RX communication unit C 231 of the power receiving apparatus 201 transmits DATA_PACKET (R/W Characteristic) to the OTH communication unit C 331 of the wireless communication apparatus 301, and receives DATA_PACKET. Upon receiving DATA_PACKET, the RX communication unit C 231 of the power receiving apparatus 201 returns DISCOVERY_RESPONSE to the RX control unit 202.

Meanwhile, in step S352, the OTH communication unit C 331 of the wireless communication apparatus 301, which has transmitted and received DATA_PACKET, notifies the OTH control unit 302 of a SERVICE_DISCOVERY command. This command gives notice of the request that was issued by the power receiving apparatus 201 to obtain the service set contained in the database. The OTH control unit 302 of the wireless communication apparatus 301 returns the state of the wireless communication apparatus 301 to the OTH communication unit C 331 as a RESPONSE command. In response, the OTH communication unit C 331 of the wireless communication apparatus 301 updates characteristic values of services in the database stored in the OTH communication unit C 331. Then, the OTH communication unit C 331 of the wireless communication apparatus 301 transmits DATA_PACKET to the OTH communication unit C 331 of the power receiving apparatus 201.

In step S353, the RX control unit 202 of the power receiving apparatus 201 obtains, from the RESPONSE command of step S351, the service set of the database in the OTH communication unit C 331 of the wireless communication apparatus 301. Then, it confirms that the power receiving apparatus 201 is compatible with the service set.

Thereafter, the RX communication unit C 231 of the power receiving apparatus 201 and the OTH communication unit C 331 of the wireless communication apparatus 301 maintain BLE-based connection by transmitting and receiving DATA_PACKET at a regular interval. The wireless communication apparatus 301 may change characteristic values of the database stored in the OTH communication unit C 331 in accordance with the operational state of the wireless communication apparatus 301 during the regular interval at which DATA_PACKET is transmitted and received.

In step S308, using an R/W_CHAR_VALUE command, the RX control unit 202 of the power receiving apparatus 201 issues a request to obtain parameters that are necessary for executing an arbitrary service with the wireless communication apparatus 301. The RX communication unit C 231 of the power receiving apparatus 201 obtains the parameters that are necessary for executing the arbitrary service from the wireless communication apparatus 301 by transmitting and receiving DATA_PACKET to and from the OTH communication unit C 331 of the wireless communication apparatus 301. Upon receiving DATA_PACKET (Response), the RX communication unit C 231 of the power receiving apparatus 201 sends the RX control unit 202 a CHAR_VALUE_RESPONSE command indicating the parameters obtained from the wireless communication apparatus 301, that is to say, the parameters that are necessary for executing the arbitrary service.

Meanwhile, in step S309, upon receiving DATA_PACKET, the OTH communication unit C 331 of the wireless communication apparatus 301 sends the OTH control unit 302 an R/W_CHAR_VALUE command indicating that the parameters that are necessary for the arbitrary service with the power receiving apparatus 201 are to be obtained. Note that the parameters that are necessary for executing the arbitrary service denote characteristic values of services in the database stored in the OTH communication unit C 331 of the wireless communication apparatus 301. In the case of the database stored in the OTH communication unit C 331 of the wireless communication apparatus 301, for example, the aforementioned two types of services described with reference to FIG. 5D (service 2 and service 3) may be used as the parameters that are necessary for executing the arbitrary service. Upon receiving the R/W_CHAR_VALUE command, the OTH control unit 302 of the wireless communication apparatus 301 returns the state of the wireless communication apparatus 301 as a RESPONSE command to the OTH communication unit C 331. The OTH communication unit C 331 of the wireless communication apparatus 301 updates characteristic values of services in the database stored in the OTH communication unit C 331. Then, DATA_PACKET (Response) is transmitted to the RX communication unit C 231 of the power receiving apparatus 201.

A description is now given of a sequence for a case in which the voltage of the RX battery 203 of the power receiving apparatus 201 has fallen below the second threshold. When the voltage of the RX battery 203 of the power receiving apparatus 201 has fallen below the second threshold, the power receiving apparatus 201 executes the processes of the aforementioned steps S261 and S262 (i.e., sets a peripheral role).

Then, in step S310, the RX control unit 202 of the power receiving apparatus 201 starts terminating the connection to the OTH communication unit C 331 of the wireless communication apparatus 301 using a TERMINATE_COM_C_CONNECT command with the aid of the RX communication unit C 231. This is intended to make a transition to a state in which the power receiving apparatus 201 can connect to the power transmitting apparatus 101 serving as a central role by changing its role. The RX communication unit C 231 of the power receiving apparatus 201 transmits, to the OTH communication unit C 331 of the wireless communication apparatus 301, DATA_PACKET (Disconnect) for terminating the connection. Thereafter, the RX communication unit C 231 of the power receiving apparatus 201 receives DATA_PACKET. Upon receiving DATA_PACKET, the RX communication unit C 231 of the power receiving apparatus 201 subsequently sends the RX control unit 202 a DISCONNECT_COM-C command indicating the completion of the termination of the connection between the power receiving apparatus 201 and the wireless communication apparatus 301.

Meanwhile, in step S311, upon receiving DATA_PACKET, the OTH communication unit C 331 of the wireless communication apparatus 301 transmits DATA_PACKET to the RX communication unit C 231 of the power receiving apparatus 201. Then, it sends the OTH control unit 302 a TERMINATE_COM-C_LINK command indicating that the termination of the connection between the power receiving apparatus 201 and the wireless communication apparatus 301 has been started. The OTH control unit 302 of the wireless communication apparatus 301 returns a RESPONSE command to the OTH communication unit C 331, and the OTH communication unit C 331 transmits DATA_PACKET (Disconnect Complete) to the RX communication unit C 231 of the power receiving apparatus 201. The OTH communication unit C 331 of the wireless communication apparatus 301 sends the OTH control unit 302 a DISCONNECT_COM-C command indicating the completion of the termination of the connection between the power receiving apparatus 201 and the wireless communication apparatus 301.

Then, the power receiving apparatus 201, which has terminated the connection to the wireless communication apparatus 301, executes processes for transmitting an advertising packet to another apparatus. First, in step S263, using a SET_ADV_IND command, the RX control unit 202 of the power receiving apparatus 201 sets an advertising packet to be transmitted from the RX communication unit C 231. At the same time as the setting of the advertising packet, the RX control unit 202 of the power receiving apparatus 201 also sets a database in the RX communication unit C 231 of the power receiving apparatus 201, which stores services and characteristics. If the packet shown in FIG. 5A is set as the advertising packet in step S263, the power receiving apparatus 201 sets the database as shown in, for example, FIG. 5C. On the other hand, if the packet shown in FIG. 5B is set as the advertising packet in step S263, the database is set as shown in, for example, FIG. 5D.

In step S208, the power receiving apparatus 201 advertises to a central apparatus, similarly to the process that has been described with reference to FIGS. 7A to 7D. However, in the present example, the advertising packet ADV_IND does not arrive at the power transmitting apparatus 101 because the power transmitting apparatus 101 and the power receiving apparatus 201 are away from each other as in the state of arrangement shown in FIG. 6B.

Meanwhile, in step S302, the OTH control unit 302 of the wireless communication apparatus 301, which is no longer connected to the power receiving apparatus 201 due to the termination of the connection, sets an advertising packet to be newly transmitted using a SET_ADV_IND_OTH command. In step S303, the OTH communication unit C 331 of the wireless communication apparatus 301 advertises to a central apparatus by transmitting an advertising packet ADV_IND_OTH. Meanwhile, the power receiving apparatus 201, which is a peripheral role apparatus, is transmitting the advertising packet ADV_IND. Therefore, the power receiving apparatus 201 does not scan for the advertising packet ADV_IND_OTH transmitted by the wireless communication apparatus 301.

Thereafter, the sequence of the processes of steps S208 and S303 are repeated when the voltage of the RX battery 203 of the power receiving apparatus 201 is lower than the second threshold.

As described above, in the sequence that has been described with references to FIGS. 8A to 8C, when the voltage of the RX battery 203 is sufficient, the power receiving apparatus 201 operates as a central role apparatus and connects to the wireless communication apparatus 301 for a predetermined service, similarly to the sequence shown in FIGS. 7A to 7D. On the other hand, when the voltage of the RX battery 203 is not sufficient, the power receiving apparatus 201 operates as a peripheral role apparatus and cuts off the connection to the wireless communication apparatus 301. The power receiving apparatus 201 also transmits an advertising packet to be able to connect to the power transmitting apparatus 101. As such, the power receiving apparatus 201 can switch among connections to other apparatuses and among executions of executable services by controlling its role (a peripheral role or a central role) based on the voltage of the RX battery 203.

That is to say, in the state of arrangement shown in FIG. 6B, when the voltage of the RX battery 203 is sufficient, the power receiving apparatus 201 can execute an arbitrary service by scanning for an advertising packet from the wireless communication apparatus 301 and establishing BLE-based connection with the wireless communication apparatus 301. On the other hand, when the voltage of the RX battery 203 of the power receiving apparatus 201 is not sufficient, the power receiving apparatus 201 advertises to the power transmitting apparatus 101 (does not perform the scanning), and thus does not establish BLE-based connection with the wireless communication apparatus 301. This can prevent the initiation of invalid services between the power receiving apparatus 201 and the wireless communication apparatus 301.

(Sequence of Wireless Power Supply Between Power Transmitting Apparatus and Power Receiving Apparatus with Shortage of Battery Capacity)

A description is now given of a sequence of wireless communication between the power transmitting apparatus 101 and the power receiving apparatus 201 that has shortage of battery capacity with references to FIGS. 9A to 9D. The sequence shown in FIGS. 9A to 9D are started in a state where the voltage of the RX battery 203 of the power receiving apparatus 201 is lower than the first threshold, and the power transmitting apparatus 101, power receiving apparatus 201, and wireless communication apparatus 301 are in proximity to one another as in the state of arrangement shown in FIG. 6C. Note that the steps that overlap the aforementioned sequences are given the same step numbers as in the aforementioned sequences, and the description thereof will be omitted.

First, the apparatuses execute the processes of the aforementioned steps S201 to S205, and scan for or transmit an advertising packet. Then, in step S406, the RX control unit 202 of the power receiving apparatus 201 starts operating, for example, upon insertion of the RX battery 203. At this time, as normal operations are not guaranteed because the voltage of the RX battery 203 is not equal to or higher than the first threshold, the power receiving apparatus 201 does not scan for the advertising packet using the RX communication unit C 231. The power receiving apparatus 201 receives, via the RX power receiving antenna A 213, electromagnetic waves of auxiliary power transmitted from the TX power transmitting unit A 111 of the power transmitting apparatus 101.

In step S461, the power receiving apparatus 201 is activated using electromagnetic waves received via the RX power receiving antenna A 213 as operating power for the RX control unit 202 and the RX communication unit C 231. Then, in step S262, the RX control unit 202 of the power receiving apparatus 201 generates a role changing event (i.e., operates as a central role apparatus).

The processes of steps S263 to S222 are similar to those of the sequence that has been described with reference to FIGS. 7A to 7D. That is to say, the power receiving apparatus 201 switches its role to a peripheral role, and completes charging using power transmitted from the power transmitting apparatus 101. Then, in step S222, BLE-based connection to the power transmitting apparatus 101 is cut off.

Thereafter, in step S272, as the wireless power supply service has been executed between the power receiving apparatus 201 and the power transmitting apparatus 101, the voltage of the RX battery 203 is equal to or higher than the second threshold. The RX control unit 202 of the power receiving apparatus 201 clears the role changing event. In step S304, the RX control unit 202 of the power receiving apparatus 201 causes the RX communication unit C 231 to scan for the advertising packet using a GET_ADV_IND command, and to return a scan result as a RESPONSE command to the RX control unit 202. In the example of FIGS. 9A to 9D, the wireless communication apparatus 301 is in proximity to the power receiving apparatus 201, unlike the case of FIGS. 7A to 7D. Therefore, in step S305, the RX control unit 202 of the power receiving apparatus 201 obtains, from the RESPONSE command, values of the advertising packet transmitted from the wireless communication apparatus 301. At this time, the RX control unit 202 of the power receiving apparatus 201 confirms that the advertising packet has been received and contains a service with which the power receiving apparatus 201 is compatible. The power transmitting apparatus 101 executes the processes of steps S204 and S205 in the manner described above.

As described above, in the sequence that has been described with references to FIGS. 9A to 9D, when the voltage of the RX battery 203 is not sufficient, the power receiving apparatus operates as a peripheral role apparatus. On the other hand, when the voltage of the RX battery 203 of the power receiving apparatus 201 has become sufficient due to the execution of the wireless power supply service, the power receiving apparatus 201 operates as a central role apparatus. As such, the power receiving apparatus 201 can switch among connections to other apparatuses and among executions of executable services by controlling its role (a peripheral role or a central role) based on the voltage of the RX battery 203.

That is to say, in the state of arrangement shown in FIG. 6C, when the voltage of the RX battery 203 of the power receiving apparatus 201 is sufficient, the power receiving apparatus 201 scans for an advertising packet from the wireless communication apparatus 301. Therefore, BLE-based connection is not established with the power transmitting apparatus 101, and the wireless power supply service is not executed therewith. On the other hand, when the RX control unit 202 and the RX communication unit C 231 cannot operate normally due to the insufficient voltage of the RX battery 203 of the power receiving apparatus 201, the power receiving apparatus 201 neither scans for a peripheral apparatus, nor advertises to a central apparatus. However, when the power receiving apparatus 201 has received, via the RX power receiving antenna A 213, electromagnetic waves of auxiliary power from the power transmitting apparatus 101, it advertises to the power transmitting apparatus 101 using power derived from the electromagnetic waves of the auxiliary power. Accordingly, the power receiving apparatus 201 can establish BLE-based connection with the power transmitting apparatus 101, and execute the wireless power supply service with the power transmitting apparatus 101. Therefore, the connection between the power supply apparatus and the power receiving apparatus can be appropriately established depending on the situation.

Second Embodiment

A second embodiment will now be described. The first embodiment has been described using an example in which the roles of the power receiving apparatus (a peripheral role and a central role) are controlled in accordance with a change in the voltage of the battery of the power receiving apparatus 201. The second embodiment differs in that the roles of the power receiving apparatus (a peripheral role and a central role) are controlled in accordance with electromagnetic waves of wireless power that the power receiving apparatus 201 receives from the power transmitting apparatus 101. Note that the configurations and operations of the apparatuses according to the present embodiment are similar to those according to the first embodiment, except for some operations. Therefore, in the following description, focus will be placed on the differences while using the same reference numerals for the same constituents and omitting overlapping explanations.

(Sequence of Operations Related to Role Changing Processing in Power Receiving Apparatus 201)

Figure 10A:
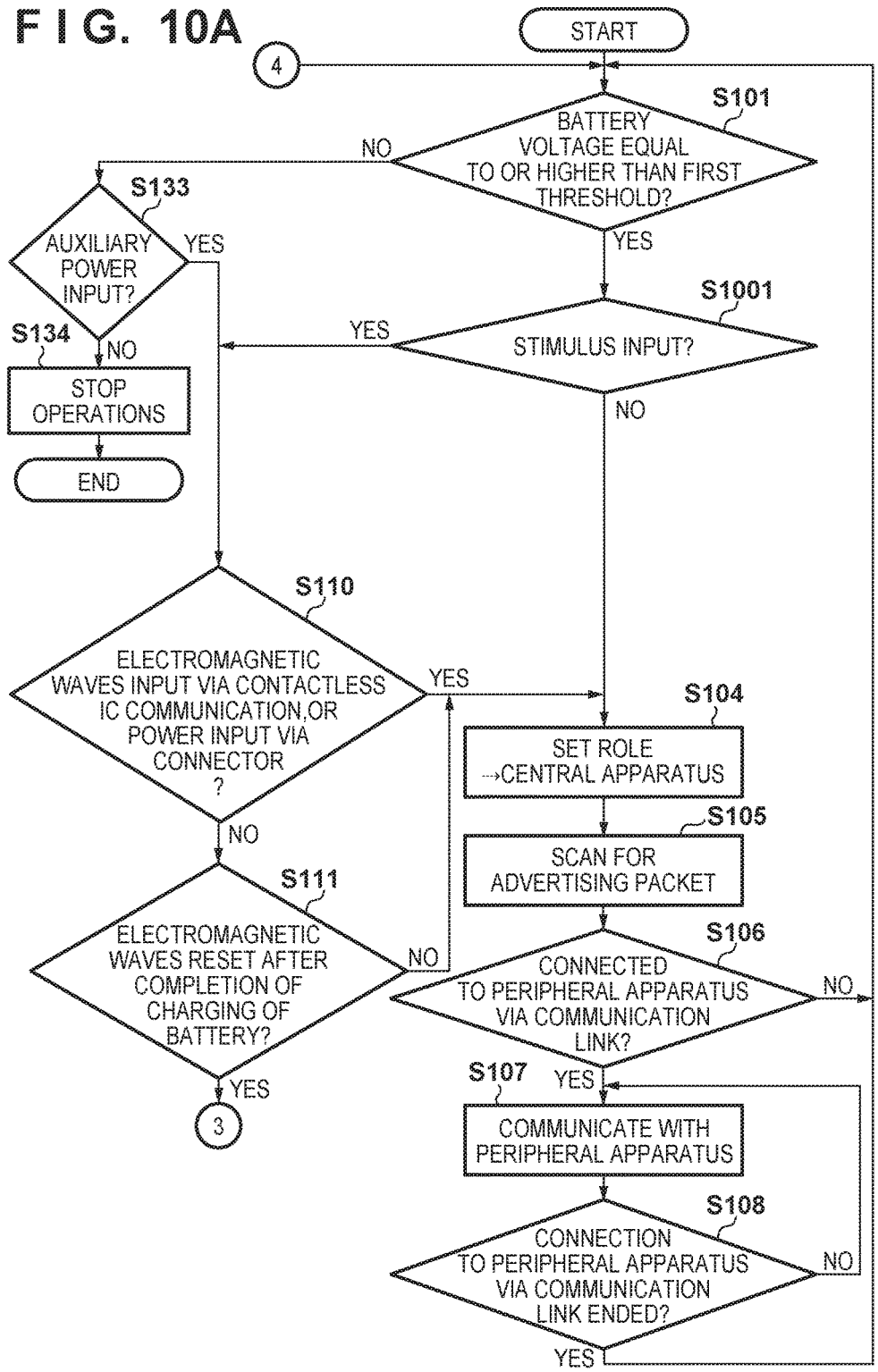
FIGS. 10A to 10B are flowcharts of a sequence of operations related to role changing processing in the power receiving apparatus according to a second embodiment.
Figure 10B:
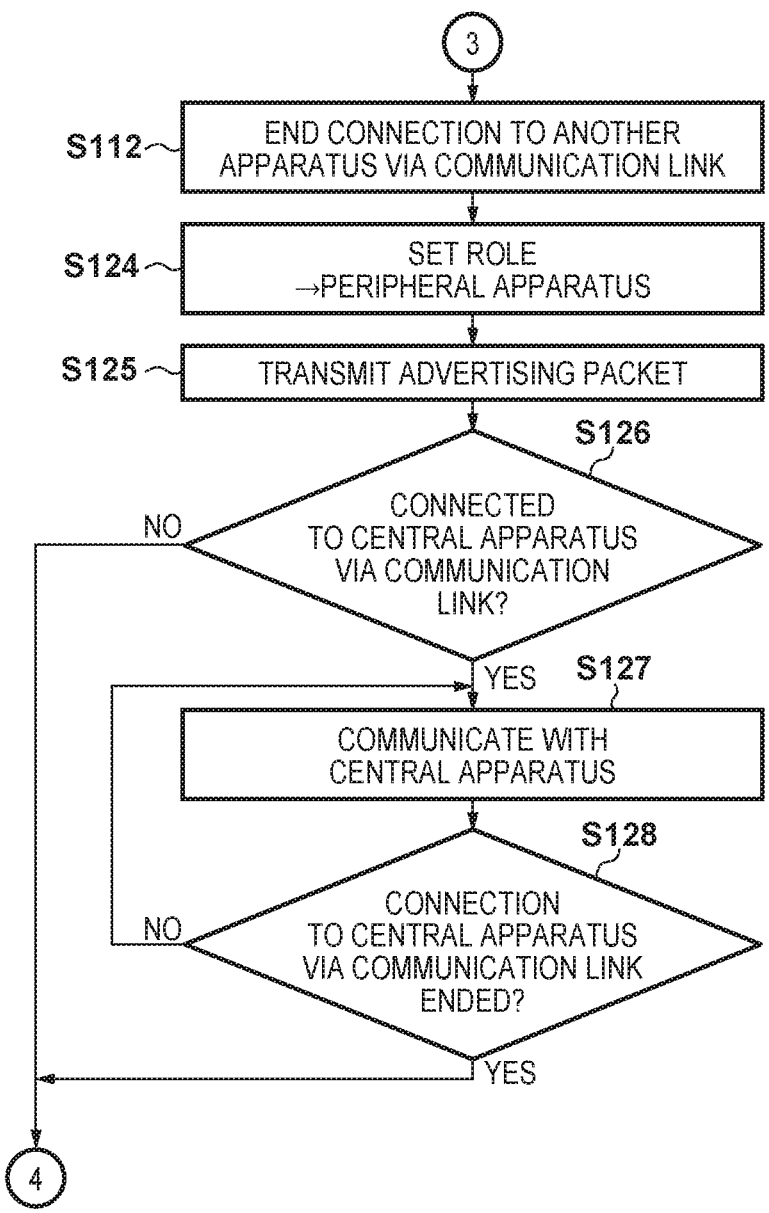
Figure 11A:
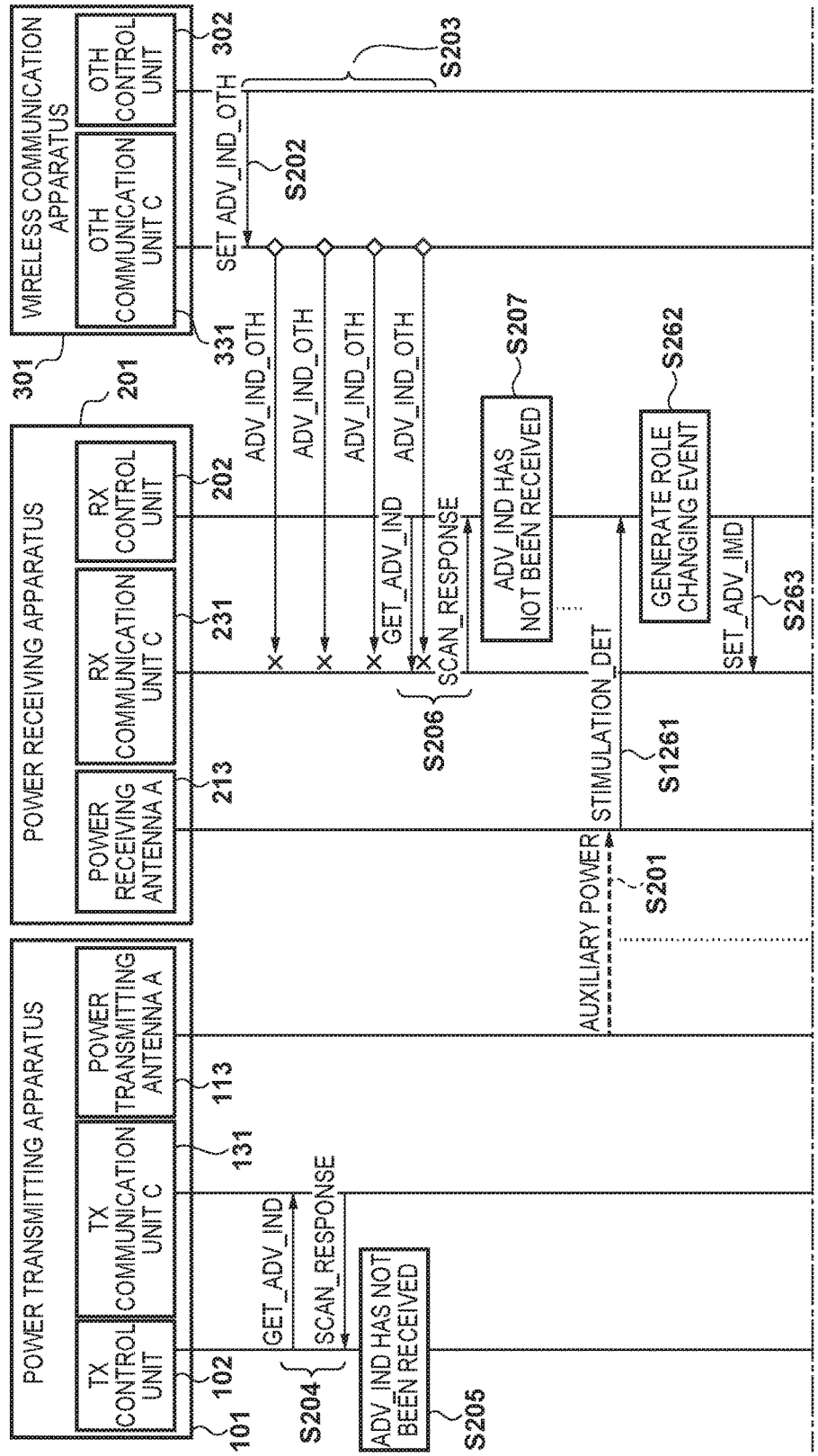

With references to FIGS. 10A to 10B, the following describes a sequence of operations related to role changing processing in the power receiving apparatus 201 according to the present embodiment. The present processing is achieved as the RX control unit 202 controls various components by deploying programs stored in the non-illustrated ROM into a working space of the non-illustrated RAM and executing the deployed programs, unless otherwise stated. Note that the present processing is started upon insertion of the RX battery 203 of the power receiving apparatus 201.

In step S101, similarly to the first embodiment, the power receiving apparatus 201 determines whether the voltage of the RX battery 203 is equal to or higher than a first threshold. The power receiving apparatus 201 proceeds to step S1001 if it determines that the voltage of the RX battery 203 is equal to or higher than the first threshold, and proceeds to step S133 otherwise.

In step S1001, the RX control unit 202 determines whether a stimulus has been input. Examples of the stimulus input in the present processing include a detection signal from the RX voltage detection circuit A 214, power input from the RX connector 260, and a detection signal from the RX detection circuit B 215. In order to prevent masking of sporadic noise and erroneous operations, the RX control unit 202 may determine that the stimulus has been input if the inputting of the stimulus has continued for a certain time period, and may determine that no stimulus has been input if the inputting of the stimulus has not continued for the certain time period. If the power receiving apparatus 201 determines that no stimulus has been input, it proceeds to step S104.

In step S104, the RX control unit 202 sets a central role as the role of the RX communication unit C 231. That is to say, if no stimulus has been input, the power receiving apparatus operates as a central role apparatus according to BLE. The RX control unit 202 communicates with other apparatuses and the like by executing the processes of the subsequent steps S105 to S108, similarly to the first embodiment.

On the other hand, if the power receiving apparatus 201 determines in step S101 that the voltage of the RX battery 203 is not equal to or higher than the first threshold, it proceeds to step S133 and executes the processes of step S133 and subsequent steps, similarly to the first embodiment. If it is determined in step S1001 that the stimulus has been input, whether communication with the RX communication unit B 221 has taken place, or power is being supplied from another apparatus via the RX connector 260, is determined in step S110. If the RX control unit 202 determines in step S110 that communication with the RX communication unit B 221 has not taken place, or that power is not being supplied from another apparatus via the RX connector 260, it proceeds to step S111. In step S111 and subsequent steps, the power receiving apparatus operates as a peripheral apparatus and, for example, communicates with a central role apparatus, similarly to the first embodiment. The RX control unit 202 ends the sequence of operations related to the present processing via step S134.

(Sequence of Wireless Power Supply Between Power Transmitting Apparatus and Power Receiving Apparatus)

With references to FIGS. 11A to 11D, the following describes a sequence of operations to perform wireless power supply between the power transmitting apparatus 101 and the power receiving apparatus 201. The sequence of operations shown in FIGS. 11A to 11D are started in a state where the power transmitting apparatus 101 and the power receiving apparatus 201 are away from each other, and the power transmitting apparatus 101 and the power receiving apparatus 201 are later brought in proximity to each other as shown in FIG. 6D. At the start of this sequence, the voltage of the RX battery 203 of the power receiving apparatus 201 is equal to or higher than the first threshold.

First, the power transmitting apparatus 101, power receiving apparatus 201, and wireless communication apparatus 301 execute the processes of steps S202 to S207, similarly to the first embodiment. Specifically, because the power transmitting apparatus 101 and the wireless communication apparatus 301 are away from each other as in the state of arrangement shown in FIG. 6D, an advertising packet ADV_IND_OTH does not arrive at the power transmitting apparatus 101. Furthermore, because the power receiving apparatus 201 and the wireless communication apparatus 301 are away from each other, the advertising packet ADV_IND_OTH does not arrive at the power receiving apparatus 201.

In step S1261, the power receiving apparatus 201 is brought in proximity to the power transmitting apparatus 101, and if electromagnetic waves of auxiliary power transmitted from the TX control unit 102 of the power transmitting apparatus 101 are input as a stimulus, the RX control unit 202 of the power receiving apparatus 201 detects the input stimulus. Then, in step S262, the RX control unit 202 of the power receiving apparatus 201 generates a role changing event. In step S263, using a SET_ADV_IND command, the RX control unit 202 of the power receiving apparatus 201 sets an advertising packet to be transmitted from the RX communication unit C 231. At the same time as the setting of the advertising packet, the RX control unit 202 of the power receiving apparatus 201 also sets a database in the RX communication unit C 231 of the power receiving apparatus 201, which stores services and characteristics. The power receiving apparatus 201 sets the database as shown in FIG. 5C if the advertising packet shown in FIG. 5A is set in step S263, and sets the database as shown in FIG. 5D if the advertising packet shown in FIG. 5B is set in step S263.

In the subsequent steps S208 to S222, the power receiving apparatus 201 and the power transmitting apparatus 101 execute the wireless power supply service, similarly to the first embodiment.

In step S272, as the wireless power supply service has been executed between the power receiving apparatus 201 and the power transmitting apparatus 101, the voltage of the RX battery 203 is equal to or higher than a second threshold. The RX control unit 202 of the power receiving apparatus 201 clears the role changing event.

In step S206, the RX control unit 202 of the power receiving apparatus 201 causes the RX communication unit C 231 to scan for an advertising packet using a GET_ADV_IND command, and to return a scan result as a RESPONSE command to the RX control unit 202. In step S207, the RX control unit 202 of the power receiving apparatus 201 obtains values of the advertising packet from the RESPONSE command representing the scan result of step S206. The RX control unit 202 of the power receiving apparatus 201 confirms that the advertising packet cannot be received, or confirms that the advertising packet does not contain a service with which the power receiving apparatus 201 is compatible. Because the power receiving apparatus 201 and the wireless communication apparatus 301 are away from each other as in the state of arrangement shown in FIG. 6D, the advertising packet ADV_IND_OTH does not arrive at the power receiving apparatus 201. Thereafter, for example, if the inputting of the stimulus to the power receiving apparatus 201 ceases in the present sequence, the processes of steps S206, S207, S204, and S205 are repeated until the stimulus is input again.

As described above, in the sequence that has been described with references to FIGS. 11A to 11D, when no stimulus has been input, the power receiving apparatus 201 operates as a central role apparatus and scans for an advertising packet. On the other hand, when a stimulus has been input, the power receiving apparatus operates as a peripheral role apparatus and transmits an advertising packet. As such, the power receiving apparatus 201 can switch among connections to other apparatuses and among executions of executable services by controlling its role (a peripheral role or a central role) based on whether a stimulus has been input to the power receiving apparatus 201.

Specifically, when the power transmitting apparatus 101 and the power receiving apparatus 201 are away from each other, electromagnetic waves from the power transmitting apparatus 101, that is to say, a stimulus is not input to the RX power receiving antenna A 213 of the power receiving apparatus 201. In this case, as the power receiving apparatus 201 operates as a central role apparatus, it does not advertise to the power transmitting apparatus 101, does not establish BLE-based connection with the power transmitting apparatus 101, and does not execute the wireless power supply service therewith. On the other hand, when the power transmitting apparatus 101 and the power receiving apparatus 201 are brought in proximity to each other, electromagnetic waves from the power transmitting apparatus 101, that is to say, a stimulus is input to the RX power receiving antenna A 213 of the power receiving apparatus 201, and the role of the power receiving apparatus is changed to a peripheral role. Accordingly, the power receiving apparatus 201 can execute the wireless power supply service with the power transmitting apparatus 101 by advertising to the power transmitting apparatus 101 and establishing BLE-based connection with the power transmitting apparatus 101. Note that when the voltage of the RX battery 203 of the power receiving apparatus 201 is not sufficient, the power receiving apparatus 201 does not scan for an advertising packet from the wireless communication apparatus 301, and does not establish BLE-based connection with the wireless communication apparatus 301. This can prevent the initiation of invalid services between the power receiving apparatus 201 and the wireless communication apparatus 301.

(Sequence of Wireless Communication Between Power Receiving Apparatus and Wireless Communication Apparatus)

Figure 12B:
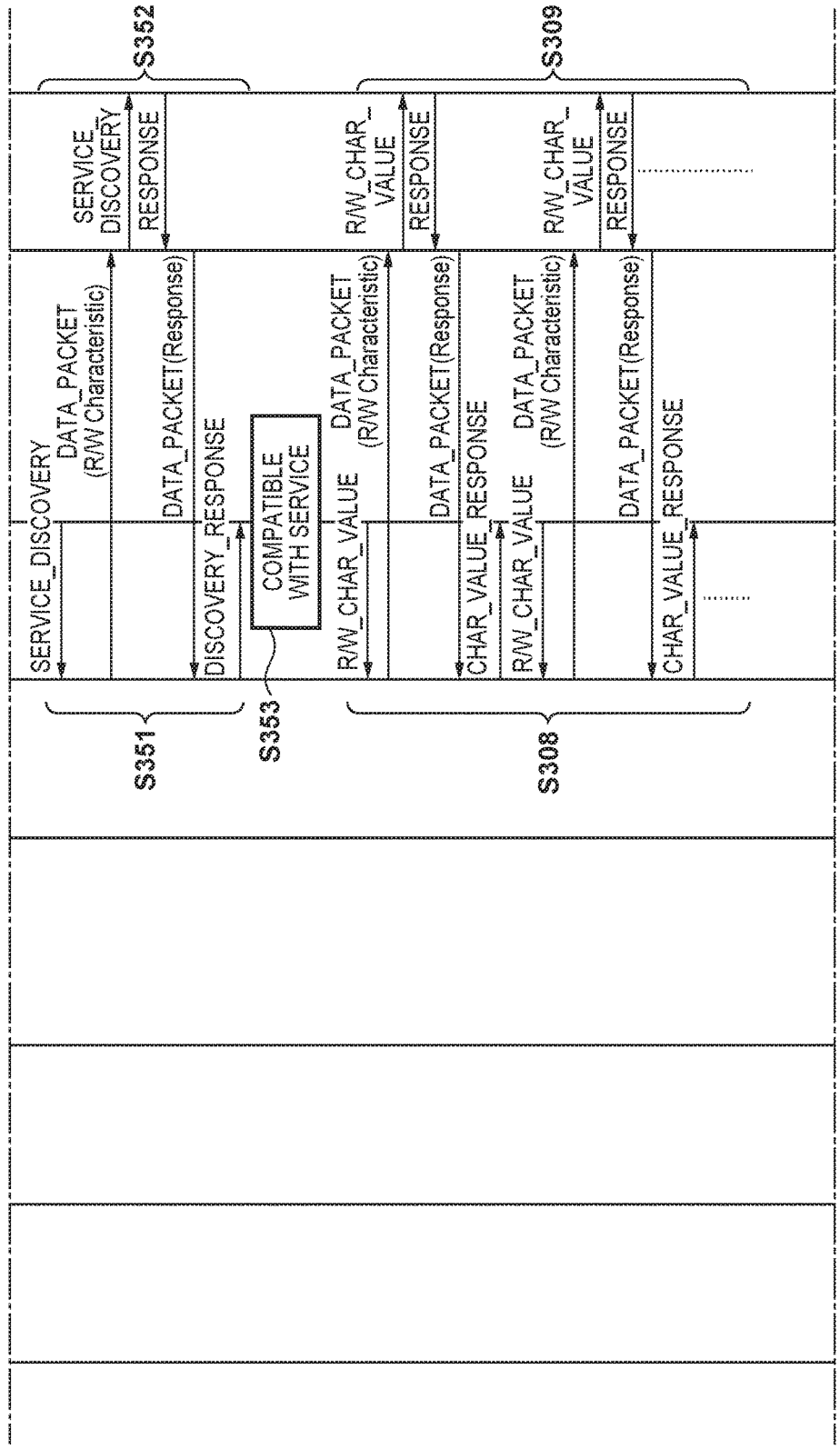
Figure 12C:
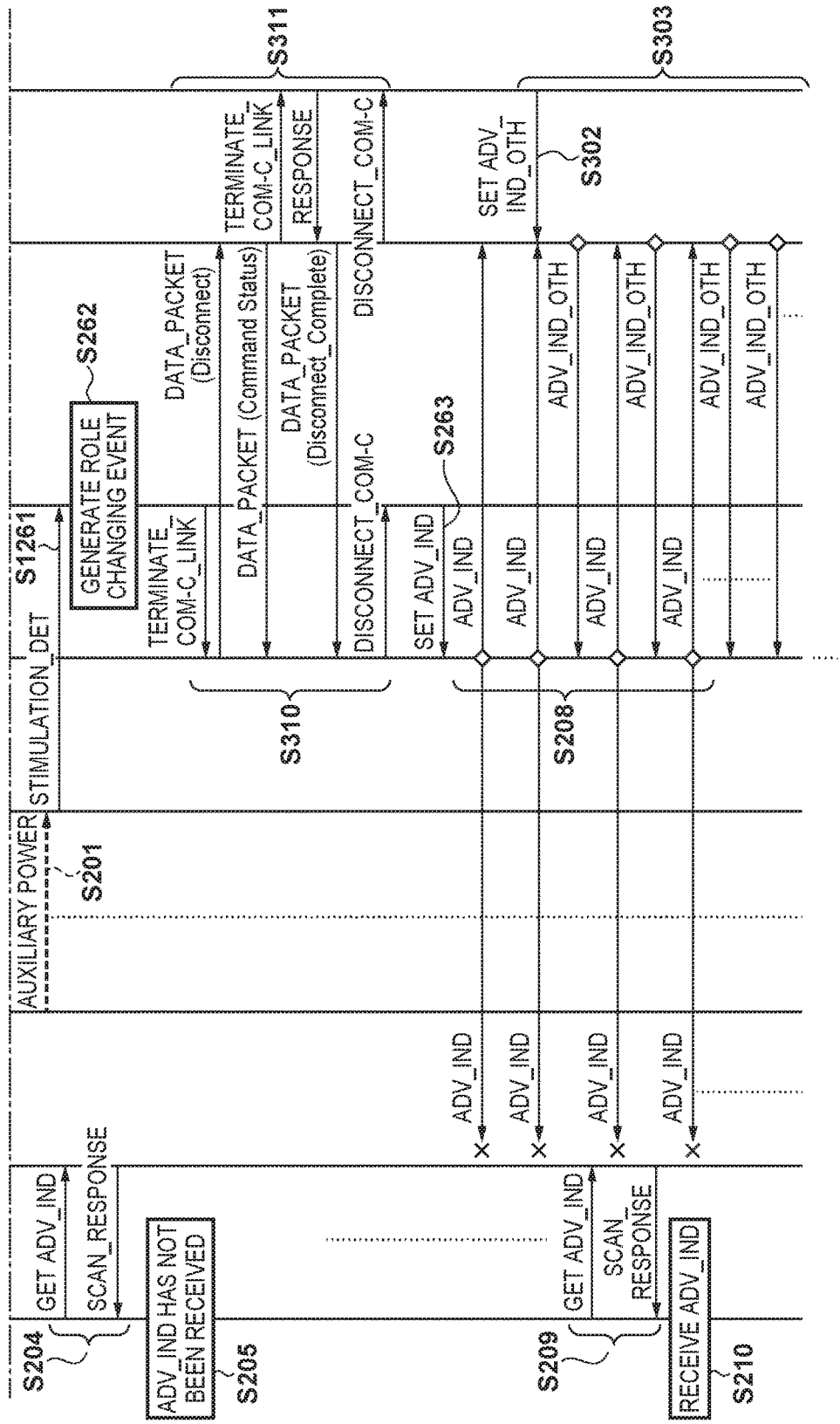

A description is now given of a sequence of wireless communication between the power receiving apparatus 201 and the wireless communication apparatus 301 with references to FIGS. 12A to 12C. In the sequence shown in FIGS. 12A to 12C, the voltage of the RX battery 203 of the power receiving apparatus 201 is equal to or higher than the first threshold. The operations are started in a state where the power transmitting apparatus 101 and the power receiving apparatus 201 are away from each other while the power receiving apparatus 201 and the wireless communication apparatus 301 are in proximity to each other, and the power transmitting apparatus 101 and the power receiving apparatus 201 are later brought in proximity to each other as in the state of arrangement shown in FIG. 6E.

First, similarly to the first embodiment, the power receiving apparatus 201 and the wireless communication apparatus 301 establish BLE-based communication by executing the processes of steps S302 to S309, and the power receiving apparatus 201 obtains parameters that are necessary for executing an arbitrary service from the wireless communication apparatus 301.

Then, in step S201, the TX control unit 102 of the power transmitting apparatus 101 wirelessly transmits auxiliary power by controlling the TX power transmitting unit A 111. In step S1261, the power receiving apparatus 201 is brought in proximity to the power transmitting apparatus 101. If electromagnetic waves of auxiliary power transmitted from the TX control unit 102 of the power transmitting apparatus 101 are input as a stimulus, the RX control unit 202 of the power receiving apparatus 201 detects the input stimulus. In step S262, the RX control unit 202 of the power receiving apparatus 201 generates a role changing event (i.e., operates as a peripheral role).

Once the power receiving apparatus 201 has started operating as a peripheral role, the power receiving apparatus 201 and the wireless communication apparatus 301 terminate the BLE-based connection by executing the processes of the aforementioned steps S310 and S311. In step S263, the power receiving apparatus 201 sets an advertising packet and a database similarly to the first embodiment, and in step S208, the RX communication unit C 231 of the power receiving apparatus 201 advertises to a central apparatus by transmitting an advertising packet ADV_IND.

Meanwhile, in step S209, the TX control unit 102 of the power transmitting apparatus 101 causes the TX communication unit C 131 to scan for the advertising packet using a GET_ADV_IND command, and to return a scan result as a RESPONSE command to the TX control unit 102. In step S210, the TX control unit 102 of the power transmitting apparatus 101 obtains values of the advertising packet ADV_IND based on the RESPONSE command representing the scan result of step S204, and confirms that the advertising packet contains a service with which the power transmitting apparatus 101 is compatible. Thereafter, the processes of the steps of the sequence shown in FIGS. 12A to 12C are repeated.

As described above, in the sequence that has been described with references to FIGS. 12A to 12C, when no stimulus has been input, the power receiving apparatus 201 operates as a central role apparatus and scans for an advertising packet, similarly to the sequence shown in FIG. 11A to 11D. When a stimulus has been input, the power receiving apparatus 201 operates as a peripheral role apparatus and transmits an advertising packet. As such, the power receiving apparatus 201 can switch among connections to other apparatuses and among executions of executable services by controlling its role (a peripheral role or a central role) based on whether a stimulus has been input to the power receiving apparatus 201.

Specifically, when the wireless communication apparatus 301 and the power receiving apparatus 201 are in proximity to each other and the power transmitting apparatus 101 and the power receiving apparatus 201 are away from each other, electromagnetic waves from the power transmitting apparatus 101, that is to say, a stimulus is not input to the RX power receiving antenna A 213 of the power receiving apparatus 201. Therefore, the power receiving apparatus 201 can execute an arbitrary service by scanning for an advertising packet from the wireless communication apparatus 301 and establishing BLE-based connection with the wireless communication apparatus 301. On the other hand, when no stimulus is input due to a far distance between the power transmitting apparatus 101 and the power receiving apparatus 201, BLE-based connection is not established with the power transmitting apparatus 101, and the wireless power supply service is not executed therewith. When the power transmitting apparatus 101 and the power receiving apparatus 201 are brought in proximity to each other, electromagnetic waves from the power transmitting apparatus 101, that is to say, a stimulus is input to the RX power receiving antenna A 213 of the power receiving apparatus 201. Accordingly, the power receiving apparatus 201 can execute the wireless power supply service with the power transmitting apparatus 101 by advertising to the power transmitting apparatus 101 and establishing BLE-based connection with the power transmitting apparatus 101. Therefore, the connection between the power supply apparatus and the power receiving apparatus can be appropriately established depending on the situation.

Note that when the voltage of the RX battery 203 of the power receiving apparatus 201 is not sufficient, the power receiving apparatus 201 does not scan for an advertising packet from the wireless communication apparatus 301, and does not establish BLE-based connection with the wireless communication apparatus 301. This can prevent the initiation of invalid services between the power receiving apparatus 201 and the wireless communication apparatus 301.

In a case where the operations are started in the state of arrangement shown in FIG. 6C while the voltage of the RX battery 203 of the power receiving apparatus 201 is lower than the first threshold, the sequence of operations shown in FIGS. 9A to 9D is executed in the present embodiment. Therefore, the description of such a case will be omitted.

Third Embodiment

A third embodiment will now be described. The first embodiment has been described using an example in which the roles of the power receiving apparatus 201 are controlled in accordance with a change in the voltage of the battery of the power receiving apparatus, and the second embodiment has been described using an example in which the roles are controlled in accordance with electromagnetic waves of wireless power that the power receiving apparatus receives from the power transmitting apparatus. The third embodiment differs in that the roles of the power receiving apparatus 201 are controlled in accordance with a change in the voltage of the battery of the power receiving apparatus and with electromagnetic waves of wireless power that the power receiving apparatus receives from the power transmitting apparatus. Note that the configurations of the apparatuses according to the present embodiment are similar to those according to the first embodiment, and the operations of the apparatuses according to the present embodiment are similar to those according to the first or second embodiment, except for some operations. Therefore, in the following description, focus will be placed on the differences while using the same reference numerals for the same constituents and omitting overlapping explanations.

(Sequence of Operations Related to Role Changing Processing in Power Receiving Apparatus 201)

Figure 13B:
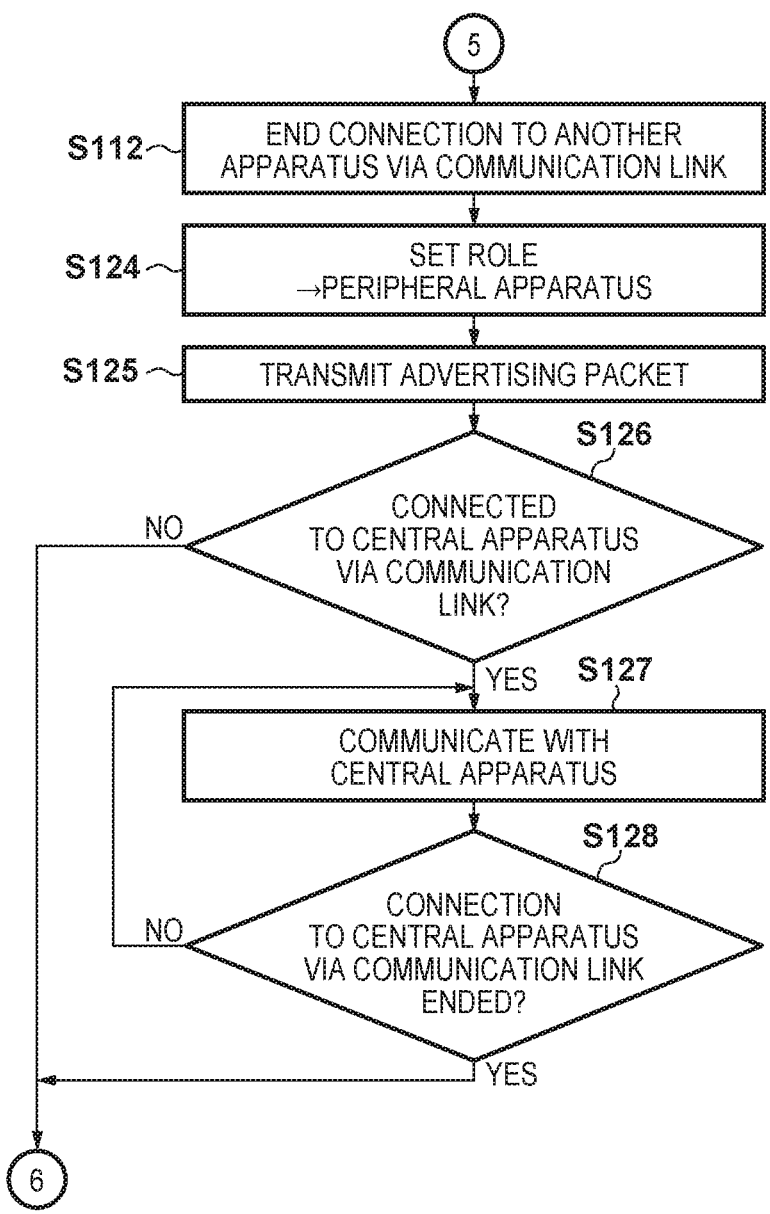

With references to FIGS. 13A to 13B, the following describes a sequence of operations related to role changing processing in the power receiving apparatus 201 according to the present embodiment. The present processing is achieved as the RX control unit 202 controls various components by deploying programs stored in the non-illustrated ROM into a working space of the non-illustrated RAM and executing the deployed programs, unless otherwise stated. Note that the present processing is started upon insertion of the RX battery 203 of the power receiving apparatus 201.

In step S101, the power receiving apparatus 201 determines whether the voltage of the RX battery 203 is equal to or higher than a first threshold. If the power receiving apparatus 201 determines that the voltage of the RX battery 203 is equal to or higher than the first threshold, the power receiving apparatus 201 proceeds to step S1301 and determines whether the voltage of the RX battery 203 is equal to or higher than a second threshold in step S1301. Similarly to the first embodiment, the first threshold for the RX battery 203 has a value that guarantees normal operations of at least the RX control unit 202 and the RX communication unit C 231 of the power receiving apparatus 201. The second threshold for the RX battery 203 has a value that is greater than the value of the first threshold and that guarantees normal operations of a part or all of the functions of the power receiving apparatus 201.

If the power receiving apparatus 201 determines in step S1301 that the voltage of the RX battery 203 is equal to or higher than the second threshold, the power receiving apparatus 201 proceeds to step S1302 and determines whether a stimulus has been input in step S1302. Examples of the stimulus input in step S1302 include a detection signal from the RX voltage detection circuit A 214, power input from the RX connector 260, and a detection signal from the RX detection circuit B 215. In step S1302, in order to prevent masking of sporadic noise and erroneous operations, the power receiving apparatus may determine that the stimulus has been input if the inputting of the stimulus has continued for a certain time period, and may determine that no stimulus has been input if the inputting of the stimulus has not continued for the certain time period. If the power receiving apparatus 201 determines in step S1302 that no stimulus has been input, the power receiving apparatus 201 proceeds to step S104 and sets a central role as the role of the RX communication unit C 231 in step S104. Setting the central role as the role of the RX communication unit C 231 in step S104 makes the power receiving apparatus 201 operate as a central apparatus according to BLE. The power receiving apparatus 201 executes the processes of step S105 and subsequent steps similarly to the first embodiment.

On the other hand, if the power receiving apparatus 201 determines in step S101 that the voltage of the RX battery 203 is not equal to or higher than the first threshold, it proceeds to step S133 and executes the processes of step S133 and subsequent steps similarly to the first embodiment.

(Sequence of Wireless Power Supply Between Power Transmitting Apparatus and Power Receiving Apparatus)

A description is now given of a sequence of operations to perform wireless power supply between the power transmitting apparatus 101 and the power receiving apparatus 201. When the power receiving apparatus 201 executes the role changing processing that has been described with references to FIGS. 13A to 13B, the sequences according to the first embodiment and the sequences according to the second embodiment are executed in combination in any of the states of arrangement of the power transmitting apparatus 101, power receiving apparatus 201, and wireless communication apparatus 301 shown in FIGS. 6A to 6E. Specifically, characteristics steps of the operation sequences that have been described with reference to FIGS. 7A to 9D according to the first embodiment and of the sequences that have been described with references to FIGS. 11A to 11D and 12 are combined. The characteristic steps involve events that trigger controlling of the roles, such as detection of falling of the voltage of the RX battery 203 below the second threshold in step S261, activation caused by electromagnetic waves received via the RX power receiving antenna A 213 in step S461, and detection of inputting of a stimulus in step S1261. Furthermore, in order to control the roles, the characteristic steps include the generation of an advertising packet changing event in step S262, clearing of the advertising packet changing event in step S272, and setting of an advertising packet in step S263.

As described above, in the present embodiment, when the voltage of the RX battery 203 is equal to or higher than the second threshold or when no stimulus has been input, the power receiving apparatus 201 operates as a central role apparatus and scans for an advertising packet. On the other hand, when the voltage of the RX battery 203 is lower than the second threshold or when a stimulus has been input, the power receiving apparatus 201 operates as a peripheral role apparatus and transmits an advertising packet. As such, the power receiving apparatus 201 can switch among connections to other apparatuses and among executions of executable services by controlling its roles based on the voltage of the RX battery 203 and on whether a stimulus has been input. Therefore, the connection between the power supply apparatus and the power receiving apparatus can be appropriately established depending on the situation.

Fourth Embodiment

A fourth embodiment will now be described. The fourth embodiment incorporates the first to third embodiments in combination, and the following description of the fourth embodiment relates to a method that, in accordance with a change in the voltage of a battery of a power receiving apparatus, reduces usable power generated by electromagnetic waves of wireless power that the power receiving apparatus receives from a power transmitting apparatus. Note that the configurations and operations of the apparatuses according to the present embodiment are similar to those according to the above-described embodiments, except for some configurations and operations. Therefore, in the following description, focus will be placed on the differences while using the same reference numerals for the same constituents and omitting overlapping explanations.

Figure 14:
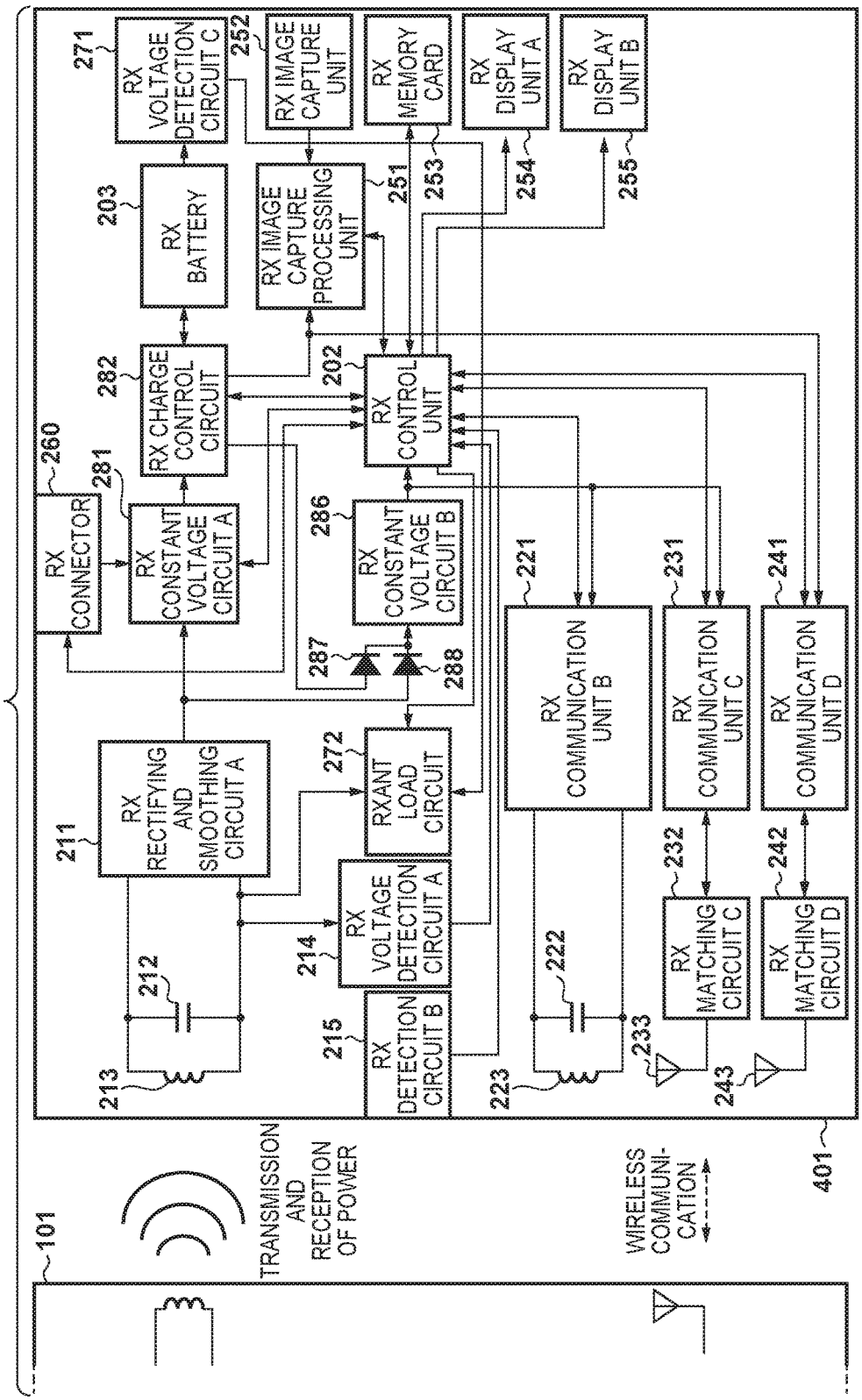
FIG. 14 is a block diagram showing an exemplary functional configuration of a power receiving apparatus according to a fourth embodiment.

FIG. 14 is a block diagram showing an exemplary configuration of a power receiving apparatus 401 according to the present embodiment. The power receiving apparatus 401 can wirelessly receive power from a power transmitting apparatus. An RX voltage detection circuit C 271 is a voltage detection circuit that detects the voltage of the RX battery 203; it outputs no detection signal when the detected voltage is lower than a voltage detection threshold Vth2, and outputs a detection signal when the detected voltage is equal to or higher than the voltage detection threshold Vth2. Note that the value of the voltage detection threshold Vth2 for the RX voltage detection circuit C 271 may be the same as a first threshold, or may be equal to or greater than the first threshold.

An RXANT load circuit 272 is a load circuit connected between the voltage generated in the RX power receiving antenna A 213 and GND, and can control ON/OFF of a load based on a detection signal from the RX voltage detection circuit C 271 and the RX control unit 202. The RXANT load circuit 272 is a normally-ON load that is ON when there is no detection signal from the RX voltage detection circuit C 271 and no control signal from the RX control unit 202, and that is OFF when there are a detection signal from the RX voltage detection circuit C 271 and a control signal from the RX control unit 202.

(Sequence of Operations Related to Role Changing Processing in Power Receiving Apparatus 401)

Figure 15A:
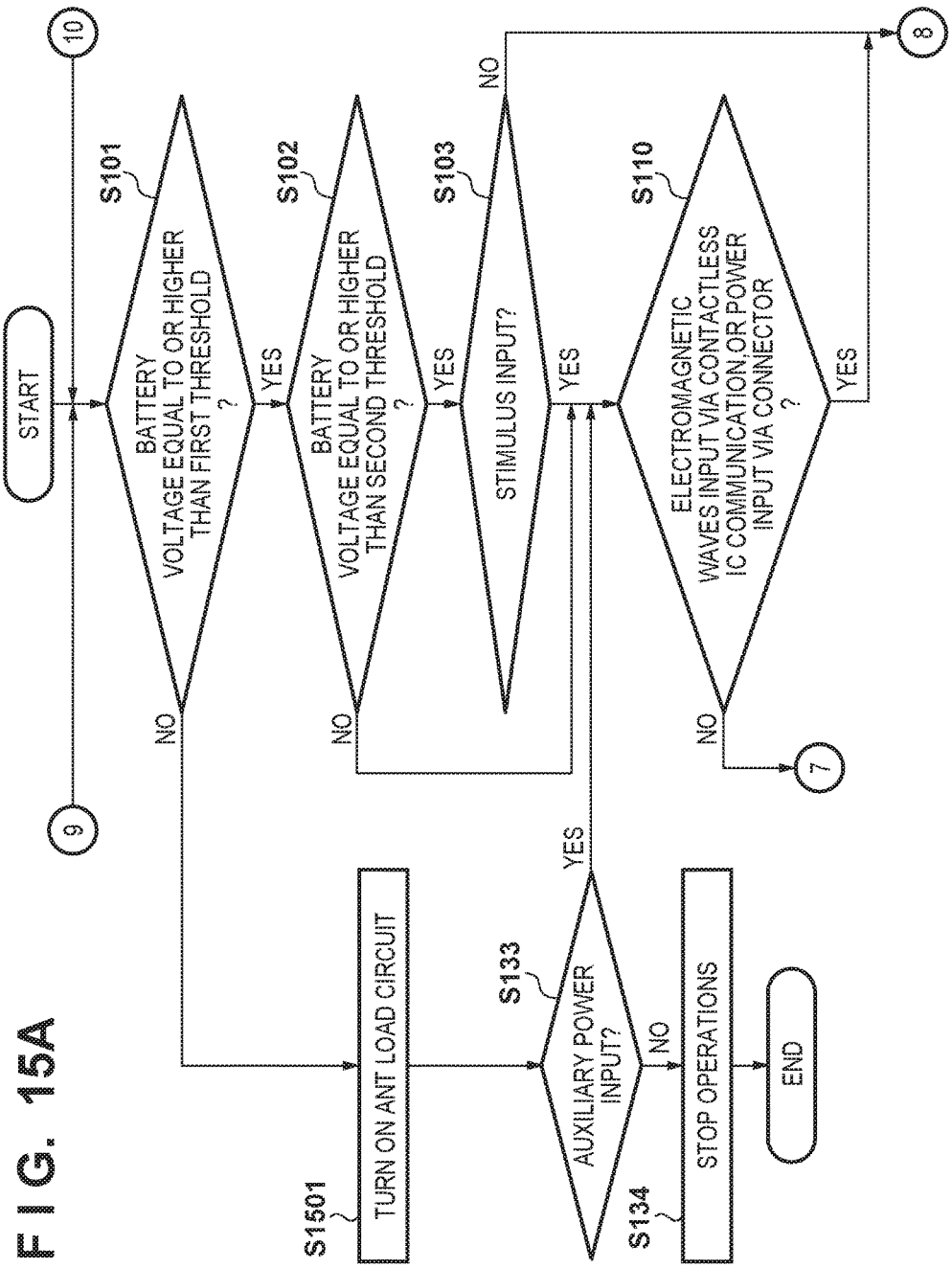
Figure 15C:
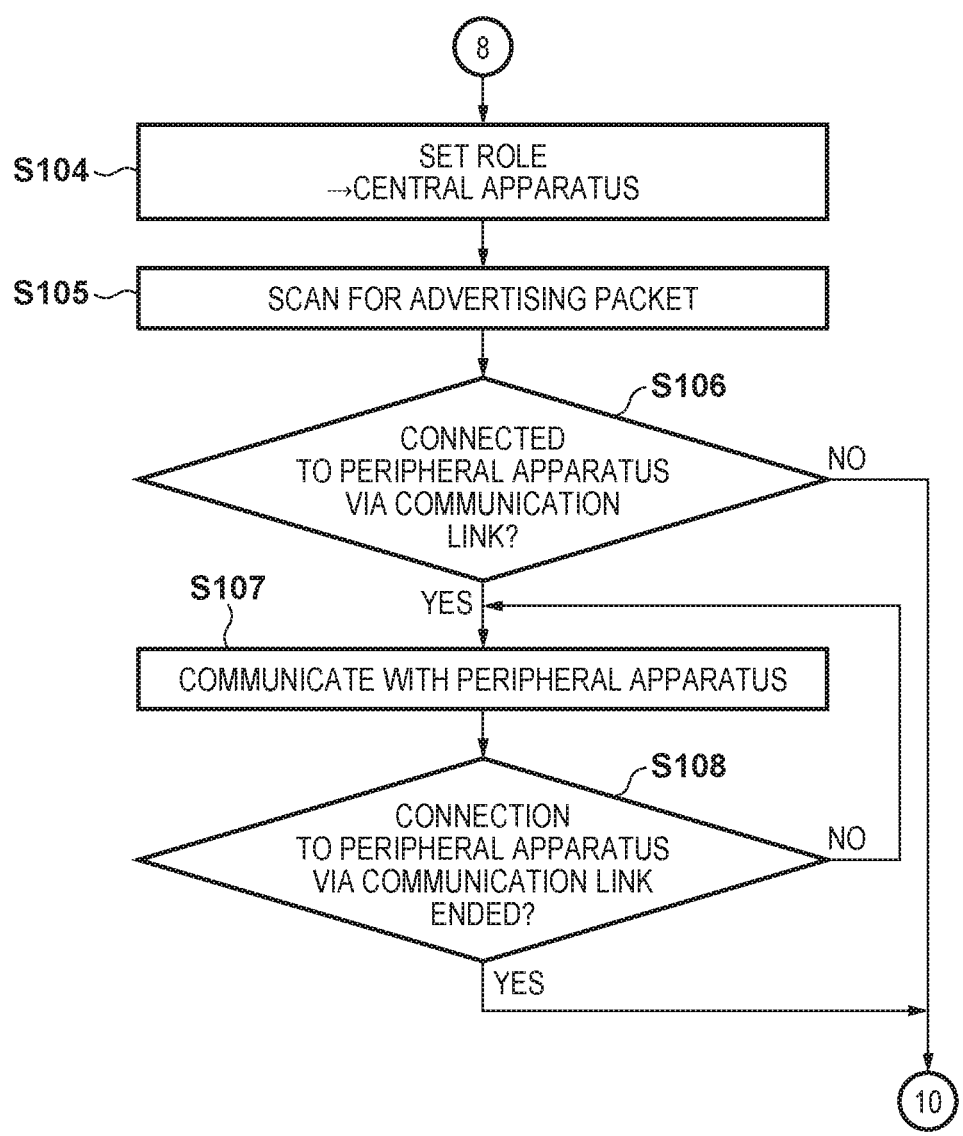

With references to FIGS. 15A to 15C, the following describes a sequence of operations related to role changing processing in the power receiving apparatus 401 according to the present embodiment. Flowcharts of FIGS. 15A to 15C are similar to the flowcharts of FIGS. 4A to 4B, 10A to 10B, and 13A to 13B that have been described in the first to third embodiments, but includes additional processes. Although the following describes an example in which the flowchart of FIG. 15 is achieved by adding processes to the flowcharts of FIGS. 13A to 13B, the processes can also be added to the flowcharts of FIGS. 4A to 4B and 10A to 10B. The present processing is achieved as the RX control unit 202 controls various components by deploying programs stored in the non-illustrated ROM into a working space of the non-illustrated RAM and executing the deployed programs, unless otherwise stated. Note that the present processing is started upon insertion of the RX battery 203 of the power receiving apparatus 401.

In step S101, the power receiving apparatus 401 determines whether the voltage of the RX battery 203 is equal to or higher than a first threshold. If the power receiving apparatus 401 determines that the voltage of the RX battery 203 is not equal to or higher than the first threshold, it proceeds to step S1501, turns ON the RXANT load circuit 272 in step S1501, and then proceeds to step S133. The processes of step S133 and subsequent steps are executed similarly to the third embodiment, up to step S127.

In step S127, the power receiving apparatus 401, which operates as a peripheral role, communicates with a central role apparatus, and then proceeds to step S1502. In step S1502, the power receiving apparatus 401 determines whether to start a sequence of the wireless power supply service with the power transmitting apparatus 101, which is a central role apparatus. If the power receiving apparatus 401 determines that the sequence of the wireless power supply service is to be started, it proceeds to step S1503, turns OFF the RXANT load circuit 272 in step S1503, and then proceeds to step S128. On the other hand, if the power receiving apparatus 401 determines that the sequence of the wireless power supply service is not to be started, it leaves the state of the RXANT load circuit 272 unchanged in step S1503, and proceeds to step S128. Note that in the present embodiment, the RXANT load circuit 272 functions in step S461 of the sequences according to the first to third embodiments. Specifically, in step S461, if the voltage of the RX battery 203 is not equal to or higher than the first threshold, the power receiving apparatus is activated using electromagnetic waves received via the RX power receiving antenna A 213 as operating power for the RX control unit 202 and the RX communication unit C 231. When the power transmitting apparatus 101 and the power receiving apparatus 401 are in proximity to each other, the power transmitting apparatus 101 and the power receiving apparatus 401 execute the wireless power supply service, and the power receiving apparatus 401 can charge the RX battery 203 using wireless power received from the power transmitting apparatus 101.

Depending on the state of arrangement of the power transmitting apparatus 101 and the power receiving apparatus 401 (specifically, the conditions of coupling and resonance between the TX power transmitting antenna A 113 and the RX power receiving antenna A 213), the power receiving apparatus 401 may not be able to receive wireless power transmitted from the power transmitting apparatus 101 with high efficiency. The cause of the failure to receive wireless power with high efficiency often lies in misalignment of the TX power transmitting antenna A 113 included in the power transmitting apparatus 101 and the RX power receiving antenna A 213 included in the power receiving apparatus 401. It is thus necessary to guide the power transmitting apparatus 101 and the power receiving apparatus 401 so that their arrangement reduces such misalignment.

In view of this, in the present embodiment, the RXANT load circuit 272 is turned ON when the voltage of the RX battery 203 is not sufficient, for example, when the voltage of the RX battery 203 is lower than the voltage detection threshold Vth2 for the RX voltage detection circuit C 271 or lower than the first threshold. Turning ON the RXANT load circuit 272 will reduce usable power that is generated in the RX power receiving antenna A 213 of the power receiving apparatus 401 due to electromagnetic waves of wireless power. In a state where usable power has been reduced by turning ON the RXANT load circuit 272, if the power receiving apparatus 401 is arranged in such a manner as to receive a small amount of electromagnetic waves of wireless power from the power transmitting apparatus 101, it is not activated due to a shortage of operating power necessary for the RX control unit 202 and the RX communication unit C 231. That is to say, as the RX control unit 202 and the RX communication unit C 231 are not activated, the power receiving apparatus 401 does not advertise to the power transmitting apparatus 101. Therefore, BLE-based connection is not established with the power transmitting apparatus 101, and the wireless power supply service is not executed with the power transmitting apparatus 101.

On the other hand, in a state where usable power has been reduced by turning ON the RXANT load circuit 272, if the power receiving apparatus 401 is arranged in such a manner as to receive a large amount of electromagnetic waves of wireless power from the power transmitting apparatus 101, it is activated because operating power necessary for the RX control unit 202 and the RX communication unit C 231 is reliably obtained. That is to say, as the RX control unit 202 and the RX communication unit C 231 are activated, the power receiving apparatus 401 can advertise to the power transmitting apparatus 101. Accordingly, BLE-based connection is established with the power transmitting apparatus 101, and the wireless power supply service can be executed with the power transmitting apparatus 101.

As described above, in a state where usable power has been reduced by turning ON the RXANT load circuit 272, the power receiving apparatus 401 can be guided and arranged in such a manner as to receive a large amount of electromagnetic waves of wireless power from the power transmitting apparatus 101. That is to say, it can be naturally guided and arranged in such a manner as to receive wireless power with high efficiency in excellent coupling and resonance conditions. In other words, even if the power transmitting apparatus 101 does not include a display and the RX display unit A 254 cannot display arrangement guidance, the power receiving apparatus 401 can be guided and arranged in an efficient manner. After the power receiving apparatus 401 has established BLE-based connection with the power transmitting apparatus 101 and started the wireless power supply service with the power transmitting apparatus 101, the wireless power supply service will not be affected as long as the RXANT load circuit 272 is turned OFF under control of the RX control unit 202.

Other Embodiments

The above embodiments have been described using an example in which a scan request SCAN_REQ can be issued for an advertising packet ADV_IND transmitted from the RX communication unit C 231 to a central apparatus. However, the embodiments are not limited to being implemented using this advertising packet. For example, the present invention can be embodied using a direct advertising packet ADV_DIRECT_IND that does not require a scan request (SCAN_REQ) as long as connection has been established with a central apparatus using the RX communication unit C 231 at least once. In this case, when advertising to the power transmitting apparatus 101, the power receiving apparatus 201 transmits a direct advertising packet ADV_DIRECT_IND1 containing UUID 1 that specifies the executable nature of service 1.

Furthermore, in the above-described embodiments, a contactless IC reader/writer compliant with ISO/IEC 21481, which is a near field wireless communication standard, is used as an example of the RX communication unit B 221. However, the embodiments are not limited to being implemented using such near field wireless communication. For example, the present invention can be embodied using contactless IC reader/writers that use protocols of ISO/IEC 14443 and ISO/IEC 15693, which are other near field wireless communication standards. When these communication standards are used, for example, the RX communication unit B 221 operates as a contactless IC reader/writer, and the OTH communication unit B 321 of the wireless communication apparatus 301 has a contactless IC function.

The above embodiments have been described using an example in which the RX communication unit C 231 performs communication using Bluetooth Low Energy®, which is a short distance wireless communication standard. However, the embodiments are not limited to being implemented using such wireless communication. For example, IEEE 802.11 and IEEE 802.15.1, which are a WLAN standard and a short distance wireless standard respectively, may be used. When these communication standards are used, the RX communication unit D 241 has a communication function compliant with these communication standards. That is to say, the embodiments may use any form of wireless communication units to wirelessly transmit and receive power, as long as the power receiving apparatus is configured to transmit a packet for advertising to the power transmitting apparatus, and the power transmitting apparatus is configured to establish communication by exchanging a connection request with the power receiving apparatus. Similarly, the embodiments may use any form of wireless communication units to perform wireless communication, as long as the power receiving apparatus is configured to scan for an advertising packet from the wireless communication apparatus, and to establish communication with the wireless communication apparatus by exchanging a connection request with the wireless communication apparatus.

The above embodiments have been described using an example in which the resonant frequency of the TX power transmitting antenna A 113 of the power transmitting apparatus and the RX power receiving antenna A 213 of the power receiving apparatus 201 is around 13.56 MHz or 6.78 MHz in the HF band. However, the embodiments are not limited to being implemented using this resonant frequency. For example, any resonant frequency may be used as long as the TX power transmitting antenna A 113 and the RX power receiving antenna A 213 enable wireless transmission and reception of power between the power transmitting apparatus and the power receiving apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-139694, filed Jul. 14, 2016, which is hereby incorporated by reference herein in its entirety.

What is claimed is:

1. A power receiving apparatus that is capable of communicating with a power transmitting apparatus with wireless power transmission capability, the power receiving apparatus comprising:
   a battery;
   a power receiving unit configured to wirelessly receive power from a power transmitting apparatus;
   a communication unit configured to communicate with the power transmitting apparatus; and
   a control unit configured to control a first mode for transmitting a signal for notifying surrounding apparatuses of an own existence using the communication unit and for receiving a connection request transmitted in response to the signal, and a second mode for detecting existence of an external apparatus by receiving the signal transmitted for notifying surrounding apparatuses of own existence from the external apparatus and for transmitting a connection request to the external apparatus,
   wherein the control unit controls the power receiving apparatus in the first mode in a case where the control unit detects, through the power receiving unit, power induced by an electromagnetic wave emitted from the power transmitting apparatus for detecting an other party to which the power transmitting apparatus provides power in a state where the control unit controls the power receiving apparatus in the second mode.

2. The apparatus according to claim 1, wherein
   when a remaining amount of the battery is above a predetermined amount, the control unit does not control the power receiving apparatus in the first mode.

3. The apparatus according to claim 1, wherein
   when a voltage of the battery is above a first threshold, the control unit does not control the power receiving apparatus in the first mode.

4. The apparatus according to claim 3, wherein
   the first threshold is a voltage that enables the control unit and the communication unit to operate using power from the battery.

5. The apparatus according to claim 1, wherein
   the control unit has a function for controlling a third mode in which the control unit invalidates the communication unit; and
   when a remaining amount of the battery is less than a second threshold value that is further below a predetermined value, the control unit controls the power receiving apparatus in the third mode.

6. The apparatus according to claim 1, wherein
   the predetermined state is a state in which the induced power has been continuously detected for a predetermined time period or longer.

7. The apparatus according to claim 1, wherein
   in a case where the control unit detects, through the power receiving unit, power induced by an electromagnetic wave emitted from the power transmitting apparatus for detecting an other party to which the power transmitting apparatus provides power while connection to another apparatus different from the power transmitting apparatus is being established, the control unit further controls the communication unit to cut off connection to the another apparatus.

8. The apparatus according to claim 7, wherein the control unit controls the communication unit to cut off connection to the another apparatus before switching from controlling in the second mode to controlling in the first mode.

9. The apparatus according to claim 1, wherein when connection to the power transmitting apparatus has been established, the control unit communicates, via the communication unit, information for receiving power transmitted from the power transmitting apparatus.

10. The apparatus according to claim 1, wherein after the control unit has communicated, via the communication unit, information for receiving power transmitted from the power transmitting apparatus, the control unit further performs control to receive power from the power transmitting apparatus using a near field wireless communication unit.

11. The apparatus according to claim 1, wherein the control unit switches from controlling in the second mode to controlling in the first mode by switching between roles that are defined in communication with which the communication unit complies.

12. A control method of a power receiving apparatus that is capable of communicating with a power transmitting apparatus and includes a battery, a power receiving unit, and a communication unit, the power transmitting apparatus having wireless power transmission capability, the power receiving unit configured to wirelessly receive power from a power transmitting apparatus, the communication unit configured to communicate with the power transmitting apparatus, the control method comprising:

controlling a first mode for transmitting a signal for notifying surrounding apparatuses of an own existence using the communication unit and for receiving a connection request transmitted in response to the signal, and a second mode for detecting existence of an external apparatus by receiving the signal transmitted for notifying surrounding apparatuses of own existence from the external apparatus and for transmitting a connection request to the external apparatus, wherein the controlling controls the power receiving apparatus in the first mode in a case where the controlling detects, through the power receiving unit, power induced by an electromagnetic wave emitted from the power transmitting apparatus for detecting an other party to which the power transmitting apparatus provides power in a state where the controlling controls the power receiving apparatus in the second mode.

13. A non-transitory computer-readable storage medium storing a program for causing a computer to function as a power receiving apparatus that is capable of communicating with a power transmitting apparatus with wireless power transmission capability, the power receiving apparatus comprising:

a battery;
a power receiving unit configured to wirelessly receive power from a power transmitting apparatus;
a communication unit configured to communicate with the power transmitting apparatus; and
a control unit configured to control a first mode for transmitting a signal for notifying surrounding apparatuses of an own existence using the communication unit and for receiving a connection request transmitted in response to the signal, and a second mode for detecting existence of an external apparatus by receiving the signal transmitted for notifying surrounding apparatuses of own existence from the external apparatus and for transmitting a connection request to the external apparatus, wherein the control unit controls the power receiving apparatus in the first mode in a case where the control unit detects, through the power receiving unit, power induced by an electromagnetic wave emitted from the power transmitting apparatus for detecting an other party to which the power transmitting apparatus provides power in a state where the control unit controls the power receiving apparatus in the second mode.

* * * * *